(12) United States Patent
Atanda

(10) Patent No.: US 10,904,261 B2
(45) Date of Patent: Jan. 26, 2021

(54) INTELLIGENT PERSONAL INFORMATION MANAGEMENT SYSTEM

(71) Applicant: Dele Atanda, London (GB)

(72) Inventor: Dele Atanda, London (GB)

(73) Assignee: Dele Atanda, London (GB)

( * ) Notice: Subject to any disclaimer, the term of this patent is extended or adjusted under 35 U.S.C. 154(b) by 594 days.

(21) Appl. No.: 15/774,249

(22) PCT Filed: Nov. 5, 2015

(86) PCT No.: PCT/GB2015/053360
§ 371 (c)(1),
(2) Date: May 7, 2018

(87) PCT Pub. No.: WO2016/063092
PCT Pub. Date: Apr. 28, 2016

(65) Prior Publication Data
US 2019/0253431 A1 Aug. 15, 2019

Related U.S. Application Data

(60) Provisional application No. 62/067,673, filed on Oct. 23, 2014.

(51) Int. Cl.
*G06F 21/00* (2013.01)
*H04L 29/06* (2006.01)
(Continued)

(52) U.S. Cl.
CPC ............ *H04L 63/105* (2013.01); *G06F 21/62* (2013.01); *G06F 21/6218* (2013.01); *G06Q 30/0201* (2013.01); *H04L 63/08* (2013.01)

(58) Field of Classification Search
CPC ................................ H04L 63/105; G06F 21/62
(Continued)

(56) References Cited

U.S. PATENT DOCUMENTS 8,271,894 B1   9/2012  Mayers
8,595,857 B2   11/2013 Donfried et al.
(Continued)

FOREIGN PATENT DOCUMENTS

WO   2005045705   5/2005

OTHER PUBLICATIONS

PCT; International Search Report and Written Opinion dated Jan. 27, 2016 in Application No. PCT/GB2015/053360.
(Continued)

*Primary Examiner* — Anthony D Brown
(74) *Attorney, Agent, or Firm* — Thorpe North & Western, LLC

(57) ABSTRACT

The invention comprises a personal data sharing system comprising an aggregator for aggregating data from a plurality of disparate sources and for categorising said aggregated data into discrete groups of data, a platform configured to enable the assignment of an access permission level for each one of said discrete groups of data by allowing the user to configure said access permission level or by automatically assigning said access permission level from a number of pre-determined access permission levels; said platform being further configured to permit access to a discrete group of data dependent upon said access permission level. The invention also comprises a method of sharing personal data comprising the steps of aggregating data from a plurality of disparate sources and categorising said aggregated data into discrete groups of data, assigning an access permission level for each one of said discrete groups of data by allowing the user to configure said access permission level or by automatically assigning said access permission level from a number of pre-determined access permission levels; and permitting access to a discrete group of data dependent upon said access permission level.

34 Claims, 64 Drawing Sheets

(51) Int. Cl.
    *G06F 21/62*       (2013.01)
    *G06Q 30/02*       (2012.01)

(58) Field of Classification Search
    USPC ............................................................. 726/4
    See application file for complete search history.

(56) References Cited

U.S. PATENT DOCUMENTS

| | | | |
|---|---|---|---|
| 2002/0091947 A1* | 7/2002 | Nakamura | G06F 21/31 726/17 |
| 2008/0133716 A1* | 6/2008 | Rao | G06Q 30/08 709/220 |
| 2013/0298187 A1 | 11/2013 | Black et al. | |
| 2014/0108210 A1* | 4/2014 | Chelst | G06Q 20/023 705/30 |
| 2014/0143886 A1 | 5/2014 | Eversoll | |
| 2014/0172917 A1 | 6/2014 | Coroy et al. | |
| 2014/0282852 A1 | 9/2014 | Vestevich | |
| 2016/0065608 A1* | 3/2016 | Futty | H04L 63/1433 726/25 |

OTHER PUBLICATIONS

PCT; International Preliminary Report on Patentability dated Jan. 23, 2017 in Application No. PCT/GB2015/053360.

\* cited by examiner

| | Sub Domain 1 | Sub Domain 2 | Sub Domain 3 | Sub Domain 4 | Sub Domain 5 | Sub Domain 6 | Sub Domain 7 | Sub Domain 8 |
|---|---|---|---|---|---|---|---|---|
| Domain 1 | | | | | | | | |
| Domain 2 | | | | | | | | |
| Domain 3 | | | | | | | | |
| Domain 4 | | | | | | | | |
| Domain 5 | | | | | | | | |
| Domain 6 | | | | | | | | |
| Domain 7 | | | | | | | | |
| Domain 8 | | | | | | | | |

Figure 6

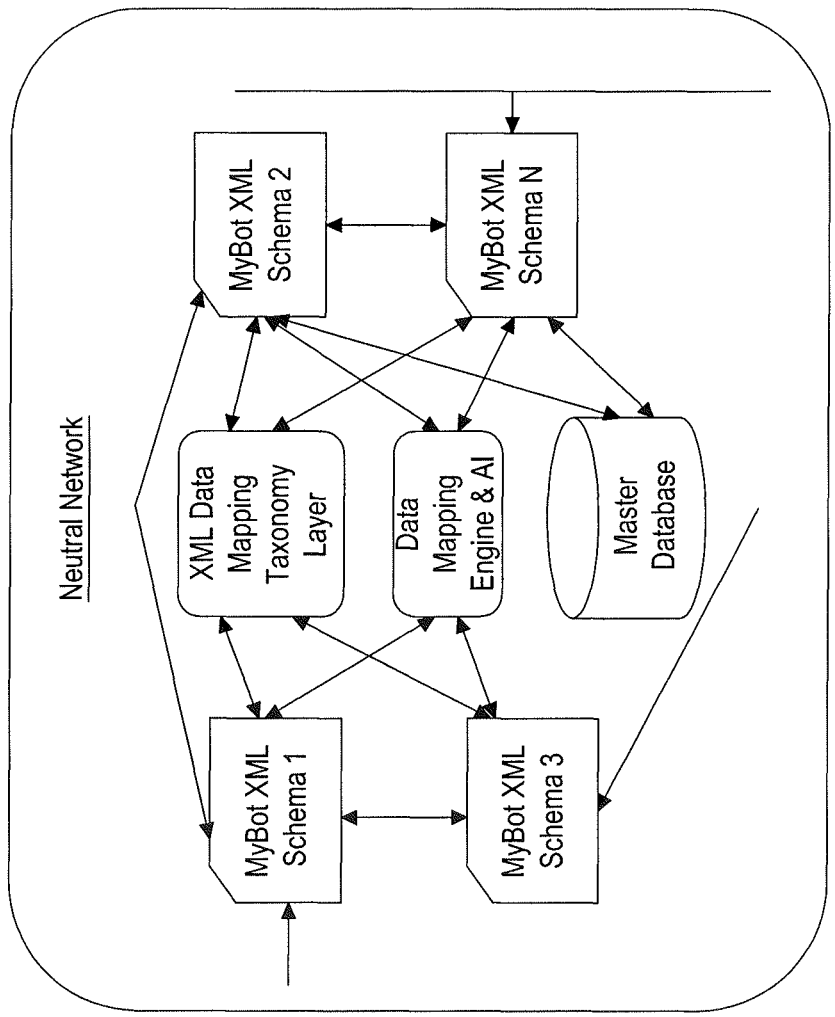
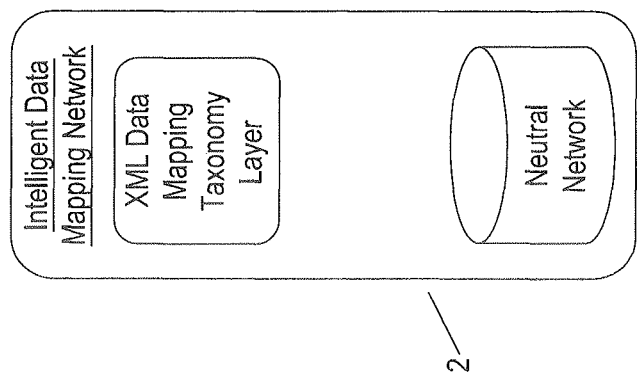
Figure 20

DATA TYPES
All user data (both aggregated + generated) is segmented into one of these 5 data groups. The data exists in various locations and forms but is unified via meta data tags. For instance, myBot offers a default data set that the user completes via the app. The user can then expand their data by adding both custom and standard data nuggets e.g. tailor measurements. Data can also exist in the form of contacts, files, emails, logs and reports - all existing in their relevant domains. The user is able to specify which groups can 'see' what
data.

SHARING DATA
All user data can be shared in 2 ways:
1. Active sharing where the user manually selects contact(s), entities or groups the data is to be shared with. For example, deciding who to share a file with or who can see a particular status update.
2. Passive sharing where data is automatically generated based on the user's activities and online behaviour. User is likely to be rewarded for sharing this data.

USER MODE
User can define as many personas as they wish. myBot offers some default personas but these can be removed. If all personas are removed, user defaults to the 'real them'. Personas allow user to represent themselves in a certain light to specific people/entities.
Once a persona is selected, user can select 1 of 3 modes: Identified, Anon or Stealth. Stealth mode shares no data therefore the persona is not necessary.
Identified mode represents the user as per their selected persona, but only sharing data specified for that persona.
Anon mode allows user to simply anonymise their activities with the added option of removing ad and digital service/site tracking.

EXTENT OF DATA SHARED
Here you can see what data is exposed as a result of:
1. Sharing method (active or passive)
2. Persona selected
3. Mode selected
4. Trackability (Identified or Anon mode)
It also illustrates what communication features are available to the user in Stealth mode.

Figure 21 Continued

| Narration: | | | | |
|---|---|---|---|---|
| ① | ② | ③ | ④ | ⑤ |
| User is checking his work email under his 'Identified' / 'Work' persona: 'Identified' mode, associated with his 'Work' profile, and with data transmission set to 'On'. He would now like to create a fake account on a competitor's website to see how it works. For this reason he wants to switch to remain in his 'Work' profile, but create the account in a persona that is in 'Anonymous' mode with data transmission turned off. | All personas are shown with a coloured badge representing the mode, and the name of the associated profile directly below the badge. The user can easily switch between these personas by simply selecting them, as well as swipe left and right to see more available personas. As this is a work-related activity, the user selects a persona with a yellow badge, signifying 'Anonymous' mode, which says 'Work' below. | As the user is currently using a persona in 'Identified' mode and using his 'Work' profile, the identity persona button in the bottom navigation shows a green 'Identified' badge and below this, the name of the profile he is using, 'Work'. The user clicks this and his other available identity personas appear next to the current persona in the bottom navigation. These personas are different combinations of modes (i.e. 'Identified', 'Anonymous', and 'Stealth'), and user profiles (e.g. 'Work', 'Friends', 'Family', etc.). | Each persona has a default data transmission setting which the user sets when creating the persona. This setting can be toggled on and off from either the secondary navigation in the bottom of the screen by selecting the identity persona button and swiping up; or from the Personas section in the main menu in the app (upper left-hand side corner). The user re-selects the primary identity persona button to hide the available personas. | When creating the persona, the user sets its data transmission to off, as the persona is in 'Anonymous' mode. Nevertheless, the user now wants to double-check that no data is transmitted while he is using this persona. He selects the primary identity persona button and swipes up, revealing the secondary navigation menu. To the far right, the 'Transmit' toggle is deactivated, confirming to the user that data transmission is off. |

Figure 23 (Continued)

OR 'Client'
TOR Design Note:
To create and transmit an onion, the following steps are taken:
1) The sender picks nodes from a list provided by a special node called the directory node- owned by TOR Network (traffic between the sender and the directory node may also be encrypted or otherwise anonymised or decentralised); the chosen nodes are ordered to provide a path through which the message may be transmitted; this ordering of the nodes is called a chain or a circuit.
2) Using asymmetric key cryptography, the sender uses the public key of each chosen node to wrap the plaintext message in the necessary layers of encryption: The public keys are retrieved from an advertised list or by on-the-spot negotiation for temporary use, [1] and the layers are applied in reverse order of the message's path from sender to receiver; with each layer, the client includes information for the corresponding node regarding the next node to which the onion should be transmitted.
3) As the onion passes to each node in the chain, a layer of encryption is peeled away by the receiving node (using the private key that corresponds to the public key with which the layer was encrypted), and then the newly diminished onion is transmitted to the next node in the chain.
4) The last node in the chain peels off the last layer and transmits the original message to the intended recipient.

TOR Design Note:
Simple decryption mix net. Messages are encrypted under a sequence of public keys. Each mix node removes a layer of encryption using its own private key. The node shuffles the message order, and transmits the result to the next node. Messages travel from source to destination via a sequence of proxies ("onion routers"), which re-route messages in an unpredictable path.

Reply onions
Onion routing also includes a technique allowing recipients to send responses back to the sender without compromising the identity of either party. This is embodied in the concept of a reply onion, which is similar to a normal onion, except that a reply onion encodes a path from the receiver back to the sender of the normal onion.
To initiate a two-way conversation, a sender generates both an onion and a reply onion. The reply onion is transmitted to the last node of the chain, which then uses the reply onion to initiate the return chain for the recipient's response. Because the reply onion is multiply encrypted, it provides little information that might compromise the sender.

Figure 27 Continued

INTELLIGENT PERSONAL INFORMATION MANAGEMENT SYSTEM

CROSS REFERENCE TO RELATED APPLICATIONS

This application is a U.S. national stage entry under 35 U.S.C. § 371 of International Application No. PCT/GB2015/053360 entitled "INTELLIGENT PERSONAL INFORMATION MANAGEMENT SYSTEM", filed Nov. 5, 2015. PCT/GB2015/053360 claims priority to and the benefit of U.S. Provisional Application No. 62/067,673 filed Oct. 23, 2014. Each of the foregoing applications are hereby incorporated by reference in its entirety.

FIELD OF THE INVENTION

The invention comprises a system for sharing data and in particular personal data. The invention also comprises a method of sharing data and in particular personal data. The specification is in the field of personal information management and relates to a system and method for managing and organising multiple units of personal data of a user acquired from multiple sources allowing them to be combined and shared in a controlled and secure way. In particular, the specification relates to a system that creates distinct groups of combined personal data units that can easily be identified and distinguished and which contain permission rules and Artificial Intelligence (AI) that govern how visible these data groups are to others and whether or not they can be shared with third parties in different circumstances and situations.

BACKGROUND

The rate of increase in the amount of data generated and collected in today's digital society is astounding. Beyond its sheer volume, data is becoming a new type of tradable asset class. As the 'Big Data' revolution era begins, the impact on all aspects of society will be profound. However many citizens around the world regard this collection of information with deep suspicion, seeing the data flood as nothing more than an intrusion of privacy. On the other hand there is strong evidence that Big Data can play a significant economic role to benefit not only private commerce but also national economies and their citizens.

Privacy and data security are issues whose importance, particularly to consumers, is growing as the ubiquity and everyday use of Big Data becomes more apparent. The links between Big Data, Social Media, Cloud Computing and the Mobile Internet is bringing disruptive opportunities and challenges in the handling of personal, private and sensitive data.

The applicant has identified an opportunity within the nascent online Personal Identity and Data Management market for new technologies and applications which enable individuals and organizations to manage, use, and share personal data and identity with other individuals and organisations. These new technologies will be of mutual benefit to both web users and online.

service providers; actively managing the balance between privacy and personalisation, authenticated identity and anonymity, and regulation and openness. As a result web participation will broaden and will promote the image and practice of eMarketing eCommerce, eHealth and eGovernance services. For consumer-facing organisations in both the private and public sectors, earning a position as customers' trusted information sharing partners will become a priority as fairness and transparency, value and trust become critical issues.

Drivers for Personal Identity and Data Management for web users include:
- Protect private and personal information
- Securely store, view and/or communicate personal or third-party private data
- Ease of use of web services (e.g. single sign-on and data portability)
- Pursue legal activities and express peaceable opinions without fear of reprisals
- Create trusted online identity and reduce identity fraud risk
- Easily create, separate and configure digital identities (e.g. to separate business and personal use, to use multiple personas)
- View digital footprint and control what is seen by whom
- Realise value from sharing data (e.g. better service, discounts, vouchers etc)

Drivers for Personal Identity and Data Management for service providers include:
- Build trust with users
- Obtain 'clean data' with consent to provide better services
- Reduce fraud, cybercrime and reputation risk
- Meet increasingly stringent regulatory requirements
- Enable cross-system data access, interoperability, and data portability to improve user experience, improve customer intelligence and tailor services with consent
- Single, trusted source of identity and authentication information for access to secure networked services The aim is therefore to provide a trusted loyalty Personal Data Ecosystem (PDE) providing mutual reward, which both protects the privacy and digital rights of users and improves and manages risk in online services. This will establish a foundation for the user-centric management of digital rights and personal identity that will be core to the next generation of Internet services.

Personal Data Ecosystems are core to the emerging Personal information Management Services or PIMS that are forecast to revolutionize the way users access services and information via the web. PIMS create value for individuals in a new way: by deploying information as a tool in the hands of the individual and by helping individuals manage their own information, including exercising more control over who they share theft data with and for what purposes. They do this in three interconnected ways. Each way is becoming a significant new market in its own right:

1. The market for better decisions:

Services that help individuals gather, sift, analyse, deploy and share information to help them make (and implement) better decisions. Price comparison and peer review sites are just the first wave. Moving forward, decision-support services will be driven increasingly by personal specifications (my goals, circumstances, priorities and preferences), and their biggest added value will revolve around helping individuals construct these specifications ('to work out what's best for me').

2. The market for life management services:

Services that help individuals manage events and episodes like 'move home' and ongoing activities like 'manage a health condition' or 'manage my money'. To do their job properly these services need to bring information from many different suppliers and activities together, making the individual the point of integration of information about their own lives. Personal Finance Managers, which help individuals aggregate and analyse data from many accounts, are a current focus of innovation.

3. The market for personal data management:

Tools and services that helps individuals store, manage and share their personal data better and in ways they can control. Personal data stores or 'lockers', permission brokers and identity verification services are examples of the new services in this arena.

Privacy and security in online digital data and transactions are major issues in both the work and private life of today's citizens. Every click as we browse the internee is monitored by over 50 companies, mostly without our knowledge or informed consent. A huge amount of data is now stored and traded without our explicit consent. The average Web page visit to sites owned by Google, Microsoft, Facebook, Amazon, Wikimedia, Apple, Yelp and Netflix now triggers 56 instances of data collection. Real-Time Bidding exchanges trade our data on the fly as we browse, and decide who gets to serve us an advert (e.g. using Google Doubleclick ad-serving technology). The data is usually in the form of behavioural data gathered from tracking cookies and linked to IP address and other identity information. Further customer data is collected via social channels, e.g. in tweets, posts and blogs. Over 1,200 companies specialize in trading our personal data. Whilst this has led to large profits for some companies, citizens are awakening to the fact that companies (for example Facebook) are using this data for financial gain, and are increasingly concerned over the collection and inappropriate use of identity, digital transaction and private data. This use of data is often regarded as the 'price' of free-to-use services and a way to deliver more personalised services, however attitudes are changing as the power of Big Data becomes more apparent and as we conduct more and more of our lives online. Regulatory bodies across the World are already looking at ways to protect the rights of citizens in a digital information age, and marketers face increased scrutiny of how they capture and apply this information. The European Commission's Digital Agenda for Europe maintains that the right to privacy and to the protection of personal data are fundamental rights in the EU which must be—also online—effectively enforced using the widest range of means'[1]. This includes the wide application of the principle of "Privacy by Design" i.e. privacy and data protection are embedded throughout the entire life cycle of technologies, from the early design stage to their deployment, use and ultimate disposal.

In the era of "anywhere, anytime" connectivity, more people connect to the Internet now in more ways than ever before. One recent estimate projects that in the next 10 years, more than 50 billion devices may connect to the Internet, many wirelessly. Global traffic on mobile networks is expected to double each year through 2014. The variety and volume of digital records that can be created, processed and analysed will continue to increase dramatically. By 2020, IDC estimates that the global amount of digital records will increase more than 40-fold. As these devices and software continue to come online, they will generate an increasing amount of personal data. This data is increasing being stored and transacted in the cloud. In 2011 the European market for cloud computing services had a value of €3.5 billion for software products and €1.1 billion for hardware products. Estimates for 2014 predict that this market will grow to €11 billion.

There is a clear need for better ways for individuals to manage their digital identities and address their growing privacy concerns. This could pay dividends for the individuals and service providers—for example a survey also found that consumers who are able to manage and protect their privacy are up to 52% more willing to share information than those who aren't. The ability to port personal data from application to application—without having to endlessly fill in forms or remember passwords and log-ons would be a significant benefit to many users.

Traditionally the focus for data protection and security has been aimed at corporate business systems. Sophisticated network security solutions have been developed to protect data flow in and out of firewalls. However with up to 80% of an organisation's partners and customers existing outside of their corporate firewall, controlling the security and privacy of data is an increasingly complex job. The number of entry/exit points is increasing hugely due to:

Advances in mobile technology,
Global enterprise operations and supply chains,
Increase in home and in-transit working,
Increase in 'own device' use for business purposes
The convergence of social and business networks, and
The widespread use of business apps and services accessed via the cloud.

For years, organisations have strictly policed the "edge" of the enterprise in order to impose the required levels of security control and governance. With so much changing in technology it's time for businesses to update their approach to security. Many of today's businesses are now at breaking point, struggling to meet the security needs and associated demand from their workforce to extend data out to these new access points. Identity and Access Management (IAM) within corporate systems and between enterprise systems and third parties is a primary concern for IT organizations today. The convergence of major media trends such as big data, cloud computing, mobility and social networking mean that business and private identities and data are increasingly being combined and held on servers without the ability to monitor what data is being held, separate business from private data, or control who has access to the data or how the data is being used. Organizations today face two seemingly contradictory imperatives. In order to boost performance and revenues, they must expand their reliance on the Internet and web applications that connect them with their customers, partners, and employees. On the other hand, an organization that opens up its systems to potentially millions of users inside and outside the enterprise also exposes its applications, networks, and data to significant risks, which can jeopardize the whole organization. Many organizations are reluctant to take advantage of the business growth benefits that can accrue from such approaches as identity federation and service-oriented identity because of security concerns. There is therefore a need within commercial enterprises to improve the way identity is managed and to find more secure ways to collaborate over cloud networks.

Providing the opportunity for anonymity is one thing, however often the problem comes in actually proving real identity when using certain online services. Proper online IDs would curb fraud, keep young people off sites meant for adults, boost e-commerce (especially across borders) and cut the cost of public administration by putting government services online. Digital authenticated credentials could authenticate your identity, nationality, age, address or whatever else was required—without having to hand over the actual original documents. Such a system would enhance safety by reducing the risk of people entrusting personal information to many sites, some of them poorly protected. Providing a photocopy of a physical document such as a passport hands over a lot of information and may do so irretrievably. An online system supplies (or verifies) only the data requested—and thus does so more securely. Governments have set up ID schemes that often work well (e.g. Finland, Estonia) but this is not the only way to do it. An alternative is to allow private firms to compete to provide secure digital identities, and for the state to rely on them for its online dealings with its citizens. Using the private sector has many advantages. Many people prefer it, since they already willingly hand over so much information to companies. They may also feel the state already knows too much about them. Commercial ID expertise would save the government from spending money on developing its own ID checks. Customers can withdraw data from private providers that prove easy to penetrate: they cannot flee state databases that spring leaks. However if private providers want to offer IDs secure enough for state agencies to use, they have to create far more rigorous security systems.

A nascent industry is forming in response to a growing concern by individuals, social groups, enterprises and Governments over digital data use. This industry is focused on giving consumers and enterprises more control over their own data, and rebalancing the value proposition between generators and users of digital data A recent report by Forrester has identified this new market, which it calls "personal identity management," (PIDM) defined as: The rules, standards and processes by which individuals and organizations manage, use, and share personal data and identity with other individuals and organizations.

Personal identity management encompasses the technologies that consumers and organizations use to store and manage personal data as well as the technologies that marketers and third party organizations use to access that data. Through this new data paradigm, consumers will control the customer-marketer relationship and force customer intelligence teams to build smarter and better strategies. In the corporate sphere PIDM overlaps with IAM and includes technologies to control identity and access within and between enterprises—and particularly the security and protection of private data by organisations (e.g. private health records) and the ability of users to view and manage their own data within corporate systems.

There is a need for new user-centric tools and services for personal data storage, handling and authorization that can be used by individuals, organizations and service suppliers in a new loyalty-based web ecosystem.

Current personal information management systems require a significant investment from users to bring various elements of data from different sources into a common repository and make it very difficult for users to organise these various elements of data into an order that is easily navigated, accessed, used or understood. Additionally the rules and structures around the operation and use of current personal information management systems tend to be highly organisational as opposed to user centric making it very difficult for users to adopt and embrace them for use in managing their personal information and putting it to use for them in their daily lives. Furthermore as the current systems are so organisation centric, should a person wish to change providers or stop using a particular service providers' system they are faced with the prospect of losing their data and having to recreate all the rules around the use of their data again with a new provider. The current models do not provide the levels of granularity required to make data sharing safe and controlled for users and rarely accommodate or take into consideration the changing context and circumstances of information requests from third parties.

Furthermore they do not provide people and organisations with the means for learning from others which sets of data to share with whom, when and which sets of data can bring which types of value, utility and reward to users or enterprises. Also most personal data sharing systems require users to share large amounts of their data with third parties in order for these third parties to sift through these data sets and determine which of them are valuable and which are not. As such there is a higher level of exposure and security vulnerability for users when sharing their personal data with third parties than necessary. There is also more risk for enterprises in collecting and maintaining more detailed consumer personal data than needed for operations. Additionally there is also a significant waste of resources used in storing and collecting data sets of which only a small fraction of collected data proves useful or valuable to enterprises.

PRIOR ART

The essence of privacy relates to the ability of individuals to have control and freedom of choice about the collection, use and disclosure of information about themselves i.e. our personal data flows. The lack of transparency and accountability regarding data flows is a major factor contributing to consumer privacy concerns. Much of this data is under the control of service providers and other third parties who seek to create value in the age of Big Data. At the same time, data capture methods have not only proliferated, they've become exceptionally sophisticated. Tactics like Flash-based cookies and deep packet sniffing surreptitiously collect behavioural data about online consumers, while loyalty and membership cards provide more insight into consumers' purchasing habits at the line item level than ever before. The challenge is protecting and promoting individual privacy while at the same time allowing for the socio-economic opportunities and benefits derived from the permissioned contextual use of our personal information.

The term personal data can be broadly defined as data (and metadata) relating to an identified or identifiable person or persons. Personal data would therefore include the digital record of "everything a person makes and does online and in the world." The term 'digital identity' is also used in this context where 'digital identity' is the sum of all digitally available data about an individual, irrespective of its degree of validity, its form or its accessibility. The wide variety of forms that such data assumes for storage and communication evolves constantly, but an initial list of categories encompasses:

Volunteered data—created and explicitly shared by individuals, e.g., social network profiles.

Observed data—captured by recording the actions of individuals, e.g., location data when using cell phones, purchase history.

Inferred data—data about individuals based on analysis of volunteered or observed information, e.g., credit score, interests, hobbies etc.

The current approach to personal data handling is mainly organization-centric: data about individuals are collected, managed, processed, and aggregated in the IT systems of service providers, enterprises, and public administrations. People have a limited involvement in the management of theft data, and, in order to protect them, their personal data has to be treated according to privacy policies agreed among the involved parties (e.g., enabling the processing required for delivering the services required by the persons or for performing legitimate operations). The current privacy protection agreements and consent methods used by service providers are coming under increased scrutiny. Often there is a 'take-it-or-leave-it' approach to consent, and public understanding of what is being agreed to and what use is being made of the data is very limited. When offered to agree to privacy policies, these are often very complex and users are given little option but to agree to everything.

Determining whether the data is identifiable or anonymous is not always straightforward, and lines can become blurred. Different types of data collected can include:

Anonymous data. Data that is collected without any identifier and was never linked to an individual. An example of anonymous data would be a questionnaire returned by mail with no name or return address.

Anonymised data. Previously identifiable information that has been de-identified: Anything that could link the information back to a specific individual—such as an ID code, a credit card number, even a serial number for a mobile phone—has been removed and a third party possessing the information would be unable to reconstruct it (if done properly, see below).

Pseudonymous data. Data records that contain no clear ID, but an explicit identifier that can be used to link the data directly to a specific individual. Examples of such an identifier are a taxpayer ID or a customer account number. Pseudonymous data thus provides protection of personal data to the extent that the translation of the identifier into a clear ID is protected.

Clear personal data. Information that is most easily traceable to an individual, as the data record contains a clear ID.

Federated Identity systems attempt to solve the growing dilemma among computer users sometimes referred to as "password fatigue".

The time is right for technological solutions to be developed for the market that enables legislation and offers right balance between data protection and innovative services that will benefit consumers. Market winners will be organisations and entrepreneurs developing technologies and solutions that meet the needs of both individuals and enterprises in a new web ecosystem which is transparent, secure and personalised.

Prior art considered relevant by the application includes the following references.

U.S. Pat. No. 8,271,894 B1: "Social computing personas for protecting identity in online social interaction". The Applicant considers that in many ways the present application comprises the antithesis of what Google is trying to achieve with their patent, since the Applicant's aim is the giving of ownership and control of online identity to agents and consumers and only allowing enterprises to have access to identity data information on terms that consumers agree to and of which they are in control.

Also of note are the following documents: US20130298187A1, WO 2005045705 A1, U.S. Pat. No. 8,595,857 B2 and US 20130185412 A1.

It is the problems identified in the foregoing sections, amongst others, that the inventor seeks to solve.

SUMMARY OF THE INVENTION

In a first broad, independent aspect, the invention comprises a personal data sharing system comprising an aggregator for aggregating data from a plurality of disparate sources and for categorising said aggregated data into discrete groups of data, a platform configured to enable the assignment of an access permission level for each one of said discrete groups of data by allowing the user to configure said access permission level or by automatically assigning said access permission level from a number of pre-determined access permission levels; said platform being further configured to permit access to a discrete group of data dependent upon said access permission level.

Preferably, said aggregator is configured to aggregate discrete groups of data in a personal single data store.

Preferably, said discrete groups of data comprises one or more data clusters and/or one or more data elements; and said discrete groups of data are tagged and/or mapped by assigning a description to at least one data duster and/or at least one data element.

Preferably, said discrete groups of data comprises one or more data dusters.

Preferably, said data clusters comprise one or more data elements.

Preferably, said aggregator is configured to dynamically connect to disparate sources of data in order to push data notifications.

Preferably, said aggregator is configured to wrap a shell of encryption around a discrete group of data.

Preferably, the personal data system further comprises a tool for allowing a user or third parties to curate the data; and means for recording a level of data curation; whereby said aggregator aggregates said data dependent at least in part on said level of data curation.

Preferably, the personal data sharing system further comprises means for notifying third parties of changes to a discrete group of data.

Preferably, the personal data sharing system further comprises a record of an event of access when a third party has accessed a discrete group of data.

Preferably, the personal data sharing system further comprises means for automatically assigning an access permission level taking into account at least one of the following: the changing context of the user of the discrete group of data; the changing circumstances of the subject of the data; and a characteristic of the particular user.

Preferably, the personal data sharing system further comprises means for automatically assigning a level of authenticity and/or reliability to a discrete group of data.

Preferably, the personal data sharing system further comprises means for allowing a user to assign a level of authenticity to a discrete group of data.

Preferably, the personal data sharing system further comprises means for importing data relating to contacts from a plurality of sources; and only enabling access to a discrete group of data if a user grants access for contacts to said discrete group of data.

Preferably, the personal data sharing system further comprises a user interface for presenting during the process of adding data a plurality of options to a user to allow a user to select which third party or third party grouping can access said data.

Preferably, said discrete groups of data are categorised in two or more of the following categories: confidential, personal, contextual, user generated, and third party generated.

Preferably, the personal data sharing system further comprises a user interface which presents the user with a plurality of N user profiles and allows the user to select one of said user profiles; and any data transmission from and/or to said system is affected by said selection.

In a second broad, independent aspect, the invention comprises a method of sharing personal data comprising the steps of aggregating data from a plurality of disparate sources and categorising said aggregated data into discrete groups of data, assigning an access permission level for each one of said discrete groups of data by allowing the user to configure said access permission level or by automatically assigning said access permission level from a number of pre-determined access permission levels; and permitting access to a discrete group of data dependent upon said access permission level.

Preferably the method comprises the additional step of aggregating discrete groups of data in a personal single data store.

Preferably, the method comprises the additional step of providing one or more data dusters and/or one or more data elements; and tagging and/or mapping by assigning a description to at least one data cluster and/or at least one data element.

Preferably, said discrete groups of data comprises one or more data dusters.

Preferably, said data clusters comprise one or more data elements.

Preferably, the method comprises the additional step of configuring said aggregator to dynamically connect to disparate sources of data in order to push data notifications.

Preferably, the method comprises the additional step of wrapping a shell of encryption around a discrete group of data.

Preferably, the method comprises the additional step of recording a level of data curation; and aggregating data dependent at least in part on said level of data curation.

Preferably, the method comprises the additional step of notifying third parties of changes to a discrete group of data.

Preferably, the method comprises the additional step of comprising the further step of recording an event of access when a third party has accessed a discrete group of data.

Preferably, the method comprises the additional step of automatically assigning an access permission level taking into account at least one of the following: the changing context of the user of the discrete group of data; the changing circumstances of the subject of the data; and a characteristic of the particular user.

Preferably, the method comprises the additional step of automatically assigning a level of authenticity and/or reliability to a discrete group of data.

Preferably, the method comprises the additional step of allowing a user to assign a level of authenticity to a discrete group of data.

Preferably, the method comprises the additional step of importing data relating to contacts from a plurality of sources; and only enabling access to a discrete group of data if a user grants access for contacts to said discrete group of data.

Preferably, the method comprises the additional step of presenting during the process of adding data a plurality of options to a user to allow a user to select which third party or third party grouping can access said data.

Preferably, the method comprises the additional step of categorising said discrete groups of data in two or more of the following categories: confidential, personal, contextual, user generated, and third party generated.

Preferably, the method comprises the additional step of presenting the user with a plurality of N user profiles and allowing the user to select one of said user profiles; and any data transmission is affected by said selection.

The present invention is a Personal Information Management System (PIMS) for users that enables them to aggregate data from various different sources and combine it in ways that are granular, contextually specific, logical, easily understood and intuitively found white being useful and valuable to them and other third parties. The system enables users to benefit from group social intelligence and AI to transform disparate units of data collected from different sources into discrete groups of information that are useful and valuable to users, organisations and machines in a new personal information ecosystem which the invention also enables and underpins. The invention described creates a platform with which entities can share information of varying degrees of sensitivity with other entities efficiently, safely and securely according to dynamic and contextual permission authentication rules. Finally the invention underpins a marketplace which enables users to extract value from their information by making it available to third parties for, discounts, rewards, remuneration and products or services on the user's terms.

BRIEF DESCRIPTION OF THE FIGURES

The invention will now be described in detail, with reference to the preferred embodiments, of which:

FIG. 6 is a representation of a personal information sorting and navigation map.

FIGS. 7-55 are diagrammatic views of respectively seventh through to fifty seventh aspects of preferred embodiments of the system of the invention.

DETAILED DESCRIPTION OF THE PREFERRED EMBODIMENTS

Overview

Figure 1:
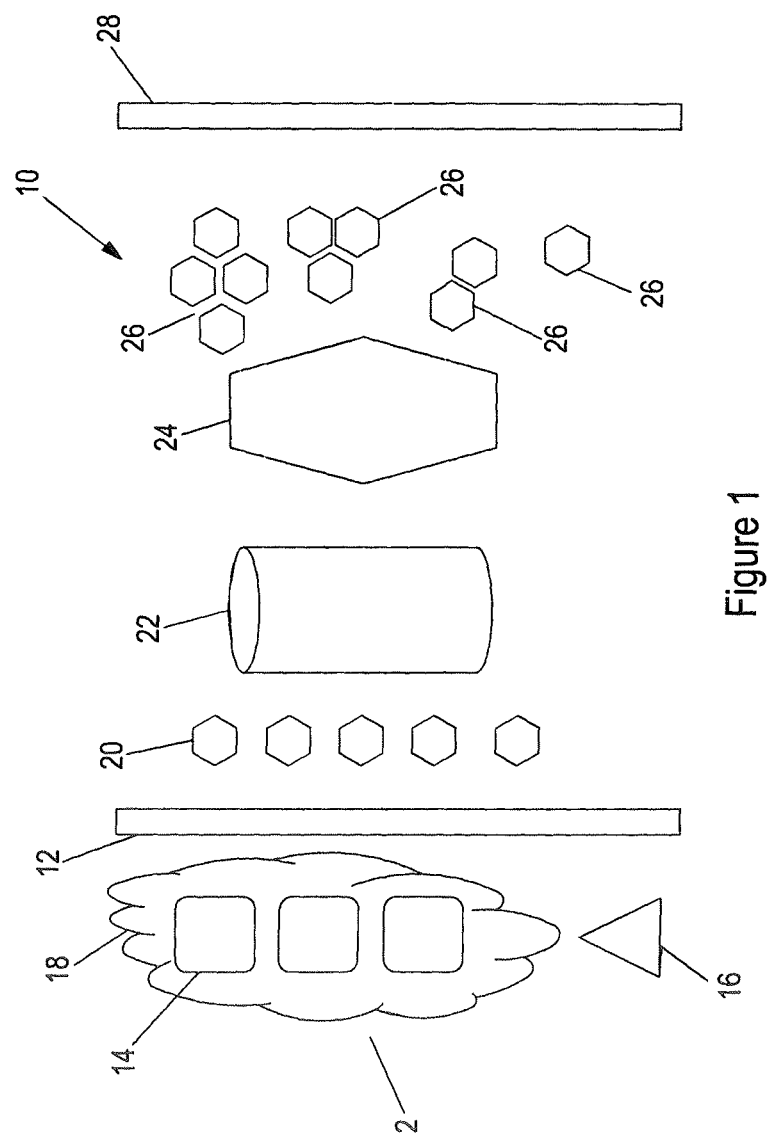
FIG. 1 is a high level representation of the personal information management system.

Referring in particular to FIGS. 28 to 51, the system 2 comprises five elements:

The first element is an identity mode 4. There are in preferred embodiments envisaged to be three different identity modes, namely identified 4a, anonymous 4b and stealth 4c.

The second element of the system 2 is file tracking 6. Profile tracking 6 gives the user the option to block or enable third party tracking/data sharing at any time during any activity. Profile tracking 6 is not available as an option when in the stealth 4c identity mode.

The third element of the system 2 is contacts and entities 8. This comprises the list of contacts available to the user which can be placed in customisable contact groups or circles 110. Entities 8a are the list of partner companies and organisations who want to access user data 112.

The fourth element of the system 2 is user data 112. This comprises all data associated with the user. Data will usually fall into one of five categories; confidential 112a, personal 112b, contextual 112c, self-generated 112d and third party generated 112e.

The fifth essential element of the system 2 is activities 114. Activities 114 are the key activities the user undertakes within the system 2, i.e. browsing 114a, communicating 114*b* (whether by phone, email, SMS, chat or any other appropriate form of communication), sharing 114*c*, creating 114*d*, transacting 114*e*.

Examining the first key element of the system 2 in detail there are three identity modes 4 the user can switch between these identity modes 4 at any time depending on what they feel is most suitable for the activity they are currently undertaking. Identify mode 4*a* has the characteristics that the user presents him or herself as who he or she is and could be used when accessing internet banking for example. The second identity mode 4, anonymous mode 4*b* is used when the user wants to remain completely anonymous but still be seen as human as opposed to a computer (bot). This could be used for political expression or online voting for example. The third identity mode for stealth mode 4*c* is when the user wants the highest level of security and this mode makes external tracking surveillance virtually impossible, it is also impossible to tell if activities in this mode are human or computer (bot) generated. It could be used by state activists to smuggle out sensitive information for example. Individual modes 4 may be reserved for those who qualify for an enhanced version of the system 2. With regard to the profile tracking 6 element of the system, profile tracking 6 determines whether or not the user's online behaviour is exposed during various activities. Profile tracking 6 has two states, namely tracking on 6*a* and tracking off 6*b*. The tracking setting can be set at the same or different time as setting an identity mode 4.

With regard to profile tracking on 6*a* here data generated from any online activities (predominantly browsing) is exposed to the user's contacts and entities 8 groups in accordance with the permissions the user has set up for those various contact and entity groups 110. This is most relevant to the passage of sharing of data and includes advertising and digital services tracking (e.g. browsing behaviour, interests, site preferences, etc).

With regard to profile tracking off 6*b* this setting overrides any data permission set up for the user's various contact and entity groups 8. For instance, if the user is browsing a questionable website, they would set their profile tracking 6 to off 6*b* to prevent any actions of the user or related data being exposed to anyone—regardless of their otherwise pre-set data access permissions. Optionally ad-related and digital services tracking does not take place.

With regard to context and entities 8 there the user is able to import their contacts and place them into a number (which may be unlimited) of user specified contact groups 110 and a list of partner entities 111 is also generated by the user based on his or her specific specified interests. The features of this element are: multiple sources 116—contacts can be imported and grouped from across multiple sources 116 (such as Facebook, Twitter, LinkedIn, the carrier phones 118 address book etc.). All contacts that are imported have no access to any user data until explicitly granted by being placed into an appropriate contact group. Linking contacts 120—with the same contacts being imported from different sources, there is likely to be duplication of contacts. The system 2 needs to facilitate the linking of these duplicate groups and does so in an intelligent, semi-automated way.

Contact groups 110—each contact can be associated with one or more contact groups 1110. The user is able to set up data visibility levels for each group 10. The system 2 can provide four initial default contact groups, namely confidential, family, friends and professional. The user will be able to create new groups 110 and remove/edit any existing groups 110.

Automated data exposure 122 with the contacts placed in their relevant groups 110, any data the user wishes to expose will only reach those groups when they are allowed it. For example, if the user wanted to broadcast its location to its family only, no other contact would see the location data if that data had not been allowed. This has particular relevance to passive data showing, in which a user may manually select contacts and entities 8 for active sharing—e.g. sending a file.

Entities 111—the system 2 will comprise a list of partner entities 111 that is subscribed to the ethical data charter. These are likely to be companies and organisations that have an interest in the user data generated by the system 2. A list of these entities 111 will be generated when the user specifies his or her interests when populating his or her profile 122. From the list the user can add these entities to existing contact groups 110 or place them in a new one.

With regard to user data 112 the following further features are noted: with regard to default data 124 as is a minimum requirement, the user will need to complete default data fields in their relevant profile sections, e.g. their name, age, address, gender, etc.

Data can be grouped into nuggets 126; as the data for a particular user can become somewhat granular, there is an option for the user to create and use additional data nuggets 126 as necessary which would allow the user to record data at a desired level of granularity. As these data nuggets 126 are generated and named by the user, the system 2 will need to scan the key words and metadata for each data nugget 126 in order to match up similar data nuggets 126 across the many user profiles and identity modes 4, for example for reporting or statistical purposes.

Third, when adding data to a profile 122, the user has the option of selecting which contact groups 110 can have access to that data, should it be required for a certain activity. By default, all data is to be hidden, so the user would have to purposely make that content available to the selected groups.

With regard to activities 114, the following points are noted: with regard to browsing 114*a* this is done using a dedicated browser 128 within the system 2. With regard to communication 114*b* forms of communicating are known, namely phone calls, emails, SMS, chat and so on. With regard to sharing 114*c* this simply means the sharing of files with other system 2 users, as well as optionally also non-users. With regard to creating 114*d* this refers to user-generated content such as "liking", commenting, social media status updates and so on. With regard to transacting 114*e* this refers to selling and trading of user data in exchange for discounts, money, rewards and so on.

The following comprises a summary of the user interface. First off the user launches the system 2 which can comprise an App. There will in particularly preferred embodiments be a user sign-in 130 which may beneficially comprise an API which may be chosen from extant API. From there the user will be directed to the default home screen 132 which may comprise a web browser 133 filling part or all of this screen of the host device. Primary navigation is overseen by the mode control which may be a button and may be overlaid on a transparent bar 135 over the web browser 133. This allows the browser 133 content to be shown through the mode button 134 and is persistently visible throughout the application. The selected persona 136 is shown on this home screen also and preferably below the mode icon 137. The user may interact with mode button 134 and when he or she does so the primary navigation control 138 and the top navigation bar 139 are activated pushing the web browser 133 content down the screen of the host device. The top bar navigation 139 comprises the main menu button 139a over its button 139b this latter taking the user to a screen with bookmarked sites and social network shortcuts. The user can change mode or persona when the primary navigation control 138 is selected. Available modes 4 and personas 136 appear and the user can select and swipe through to see more. Once a mode 4 or persona 136 is selected the navigation bars 138, 139 (top and bottom) minimise to revert back to default browsing state.

There is also a secondary navigation control 14. The secondary navigation control 140 contains options for opening the browser, sharing content, communicating with contacts and toggling on and off data transmission. The user reveals the secondary navigation control 140 by swiping up from the bottom of the screen of the host device, as indicated by the arrow cue 141 below the mode button 134. This cue 141 changes orientation depending on whether or not the secondary navigation control 140 is active. When the secondary navigation control 140 is active the tertiary navigation 142 slides up from the bottom of the screen of the host device.

There is a multiple sharing feature—a share button 144 may be pressed once the user is selected from multiple social network icons or email. Once all selections are made the user presses the share button 144. The share button is only activated when at least one of the social options have been selected. When the user opts to share a URL via email the subject field of the email may advantageously be auto-populated with the article title, although that it editable by the user in a standard fashion. With regard to communication 114b the iteration communication is similar to the sharing activity 114c discussed above with options for making a phone call, sending an email, sending a text message and entering a chat.

Whenever the user wishes to transmit or stop transmitting there is the option to toggle a transmit button 145 on or off a stop confirmation prompt appears. This is to make sure that the user has not inadvertently to toggled this transmission functionality on or off. The prompt asks the user to confirm data transmission. Once the user has confirmed data transmission and the transmit button 145 is toggles off this will be indicated by a change of colour of the web browser 133 as well as the label 133a on it.

With regard to the favourites icon 146 which is situated on a web browser 133 selecting the favourites icon from the top navigation bar 139 takes the user their bookmarked website. The icons corresponding to these can be re-ordered via a drag and drop action. Amongst the bookmarks there will also be an icon allowing the user to add a new favourite 147. To add a new favourite, the user enters the site's URL and the label they want to appear below the site's icon. With regard to social networks, they are listed in a similar menu layout to favourites. Additional social networks may be added in a similar way to the manner described for adding favourites; when adding a new social network, the user enters the URL for the network as well as their username or profile link. The username/profile link field may be autocompleted if the system 2 detects the user's account based on their email address.

The main menu is reached from the menu button 149 which may in preferred embodiments be in the upper left hand corner of many or all of the screens of the system 2 embodied in an application.

There is a persona screen 148 which acts as a detail page listing the attributes of a persona 136. The following features are listed: name of persona 150; save button 151 which may be used to save any changes made to the persona 136; persona edit button 152 allowing the user to edit the name of the persona 136; mode toggle button 153 allowing the user to switch the associated identity mode 4; personal information field and edit button 154. It also has the option to add an remove social network accounts that are linked to the persona 136 having functionality as the same as when adding social network to favourites 146, i.e. a light box appears and allows the user to make the changes. Further there is a field which allows the user to see which contacts the persona 136 is available to. As the number of associated contacts can potentially be very large depending on both user and persona 136 a summary representation of a contact's count (similar to a like count on a leading social network) is used. The user can alter the view to see more or all of the contacts.

In preferred embodiments an info icon may be provided which when pressed or hovered upon provides information describing the identity mode 4 at the persona 136 is attached to. Any of the identity modes 4 can be selected to view their respective descriptions—however the identity mode 4 selection is not finalised until the user saves the changes by selecting the save button 151. A mode info box may therefore be opened or closed by selecting the info icon. Likewise a personal info control may be provided which when pressed allows the user to see the persona information thus stored.

Further in a given persona the user may have control to edit their personal info; such as first and last names, address, phone number(s) and email address(es). This info may be edited with a selection of provided icons. Optionally whenever a change is made the user is given feedback with messaging facility. Optionally, there may be the possibility of toggling on and off the data sensitivities of the persona 136, e.g. the persona 136 may be attached to user data sensitivity "personal" 112b—personal 112b may be toggled on and off meaning that data elements set at a personal sensitivity level will not be available to contacts viewing/interacting with this particular persona 136. Further the user can toggle the default data 124 transmission as either on and off for a given persona 136. This setting can be overridden by toggling on and off the data transmission 124 button in the primary navigation 138 section. However, once a persona 136 is re-selected, the default data transmission setting will adhere to the parts specified on the screen.

Optionally there may be a button allowing an individual to view all contacts and when pressed the list of contacts will appear. Contact icons are associated with individual contacts and may refer to the contact type, such as person, group or organisational thing. Changes to a persona 136 will be saved by selecting a save button 151. Optionally there may be a save changes prompt if somebody prematurely navigates away from the given persona 136. Regarding the contacts page it is split into four tabs 155, namely people 155a, groups 155b, organisations 155c and things 155d. The default tab is people 155a. The user can also search for contacts which will be listed, for example, alphabetically. A search icon may be provided which when pressed may allow for a search field to be expanded and searching may be predicted in a known way. There is also in the system 2 a contacts page 157 which comprises a number of fields containing detail, information and functionality about the given contact at the top of said contacts page the heading which may be the name of the person or entity to which the page refers there may be a profile picture and contact details. Further there may be a field detailing the groups that the contact belongs to. Or if the contacts themselves are groups then the field is omitted. An icon may be included on the contacts page 157 to allow editing. An icon will also be displayed on the contacts page 157 indicating the user's identity mode 4 and persona 136 relative to this contact. This will in some preferred embodiments be changeable on this page. Likewise an indication will be given of the default data transmission for this particular contact, preferably via an icon. The icon will toggle the data transmission on and off. This page may also comprise a number of shortcuts to communication options, namely call, email, message and chat. One field of the contacts page 157 may comprise the user's data clusters 158 that he or she has chosen to make available to this contact.

Functionality may include the ability to add new clusters, a summary means summarising the data clusters 158 which are accessible and means to examine an individual data cluster 158 in detail by selecting one or more of them. Likewise functionality may be added to allow for the removal or deletion of a cluster from a contact page 157. During the edit function of the contacts page 157 the profile picture can be removed or replaced. Contact info fields can be updated or removed in place if the remove button is selected the field no longer appears on the profile, however, still appears as an empty field in editing mode such that the user knows it can be filled in. The user can be assigned to or removed from groups. Optionally a list of groups can be summoned to see which groups this contact is a member of or which groups he or she may be added to, as well as the ability to create a new group. There will be means supplied to save changes and edit.

When data transmission is toggled on or off a fading feedback message may confirm the selection. The system 2 comprises a separate messaging screen 159. In preferred embodiments it will comprise some or all of the following features: a heading announcing that it is the messaging page 159; means to identify which messages are new; means to identify the difference between read messages and unread messages, which may be a different colour to one another; a new message counter; the number of messages in the given thread; the ability to send the message to several contacts; the last message in a group message to have sent a message to the group may be listed; when the last message in the thread is a reply the user is sent means to denote that; when the last message in a thread is a message the user is sent a recipient has read it may also be denoted; when the last message in a thread is a message the user has sent and the recipient has not yet read it may either be denoted or not. Draft messages may also comprise a different colour and/or be labelled draft".

Messages can be deleted. When a message delete option is selected choices to delete all or delete selected may be given.

Means to add attachments may also be added to the messaging functionality. A saved draft feature may also be added to the messaging functionality. Messages can be sent with attachments that the user can save locally to theft device. In the message delete option the user may be given the option to either delete the entire message thread or select individual messages to delete. It may be that tick boxes may provide a means to select multiple messages to delete. A further option to undo a deletion may also be given.

There will also be a message compose option and this will comprise a display of relevant contacts as the user types in to a recipient field of a new message and once the recipient has been added it may be possible to add further recipients. Multiple recipient messages may be constructed via a contacts list which may have tick boxes for selecting multiple recipients. The message compose option will also comprise a text box for putting the message in may also comprise an attachment icon for adding attachments which may be listed in the conventional manner via tick boxes selection of file names or other known means. The message compose option will also likely comprise the option to attach data clusters 158, again via a known means of selection and attachment.

The system 2 also comprises a chat feature 162 in preferred embodiments. The chat feature comprises a page which itself comprises a heading denoting that it is the chat feature 162. The chat feature shows a list of all conversations by a default in preferred embodiments, preferably with the most recent at the top. There may be indications next to the contacts that are online denoting that they are online and there may be icons for read, replied to and sent messages in chat which are the same as for messages. In preferred embodiments as which messages, unread chat messages have a different colour and there may also be a new chat messages counter. Chat messages cannot be saving in drafts, however. In addition the chat feature will comprise a new icon or button allowing the user to select one or more contacts from the chat list which is equivalent to a select recipient screening the messenger in the message composition option 161 in order that a new conversation might be started. Where the chat with a group indication may be made as to whether a member of the group is online or whether constituents are on line. It may be possible to toggle between looking at individuals only, groups only or organisations only.

During an individual chat members can potentially be added or removed from the conversation in some embodiments where a member's button subsists which can be used to make those additions or subtractions.

In group conversation mode if members are not currently online a time stamp for when they were last online may be shown. In group conversation mode the following features may be apparent: a list of members of the conversation; the identity of the conversation admin who may be imbued with administrator's powers, i.e. to add or remove members. Alternatively all members can leave the conversation or add new members.

There is also an email feature 163 screen on the system. The email feature 163 follows common email functionality including inbox, sent, drafts and drafts tab with read/unread icons and subject fields, emails with attachments that are flagged as important are labelled as such.

Regarding the individual email the format is as follows: sender's name, individual address and picture are shown first on an individual email. A field is reserved for listing recipients and may comprise means to link to a contacts detail page if the recipient is also a contact of the user. The individual email will have room for the subject and time of receipt data and further functionality related to flagging or unflagging of the email may further be included. There may be an option within the email feature 163 for the user to save all the text to their device which may comprise an icon; further a preview function for previewing attachments may be provided. The new email functionality is similar to the new message functionality in that it will have a subject field and a settings menu as well as a field for populating with the email itself. The email settings function when selected via an icon will bring up a sub-menu allowing the toggling on or off a number of typical features including direct replies, reply all, email forwarding read receipt and expiry date function and means to toggle those features on and off. There is also a phone call feature 165 with the ability to add and save number to contacts, a keypad, a back button, a call cancelation button, a video conference button enable video conferencing functionality, a contact button and a call button.

When a contact is named it will appear below a number, this will happen likewise when a contact is saved. When a call is made an overlay comprising information about the contact and comprising information about the nature of the call will be brought up. It will comprise the user's currently active mode and persona, a speaker button and add contacts button, and an end call button. There is also a data vault feature 167 comprising a data vault screen. When users select the data fault feature 167 from main menu without having logged into any social networks or other data sources before they will be shown the screen prompting them to select which sources they want to import data from. The data vault feature will comprise icons representative of the data source. The user can select one or more data sources to import data from. Once at least one data source is selected, a select button with a counter appears for the user to proceed to a separate log-in screen. The separate log-in screen allows a user to log-in to his or her user account on a single screen once at least one account has been logged into, a continue button will appear on the screen enabling the user to proceed to data import of only the logged in accounts if they wish not to log into all of their accounts. This way they don't have to return to the previous screen to deselect data sources. When data is being imported the user is kept informed of what happens as the system 2 imports the data.

Once the user has imported data from at least one data source the data vault 168 screen changes to show data groups 169 and dusters 158 of data. Data groups contain all of the user's imported data automatically grouped into sixteen pre-determined groups, which are: identities, locations, connections, influencing, influencers, events, health and fitness, created media, created text, interests, tastes, consumed media, finance, psychometrics, digital inventory and miscellaneous. The user can search for data elements or data clusters, the search functionality behaves in the same manner as with the contacts section. When a data group 169 is selected the group's 169 feed of data elements, in other words, individual data nuggets 126 are listed from the access data sources with the most recent at the beginning. The user may be given the ability to drag the screen down to refresh the feed in a well-known manner. A given data source icon will be colour-coded with the sensitively level of the data (either automatically set or edited by the user). Such colour-coding may be green for behavioural, blue for personal and red for confidential. The user can add the data element or nugget 126 to an existing or new data cluster 158. The user can view the full nugget 126 in the data source, i.e. by opening the relevant Apple website within the system 2. The user will also have the option to remove the data element 126 from the data group 169. Sensitivity levels may be adjustable via the provision of requisite buttons and icons.

The user can customise on a data vault 167 settings page, the time interval which they import data elements 126 (this can be different for each data group 169 depending on the nature of the data—e.g. health-related data may be more sporadic and be relevant over longer periods of time. The user can also import or create new data elements 126 to be added to given data group 169. Data groups 169 will be of varying shapes and sizes due to the fact that the data elements 126 wilt be quite different. With regard to the "influencing" data group elements will be of the sort of likes, re-tweets, followers, re-flags, etc. Another example of a data group 169 is "tastes" which aggregates the different types of activities the user engages in under similar tags which form the user's tastes or personality preferences.

The user can change the sensitivity of each data element 126. When adding (creating or importing) a data element 126 the sensitivity level is automatically set based on the data type, which could be one of personal behavioural or confidential for example. The user can change this if required.

Where applicable, more detail about a data element 126 can be revealed in an overlay when the highlighted items (e.g. a list of music genres, as in this wire frame) on the element 126 are also selected. The list format for data element 126 is also applicable to e.g. followers, likes, sharers and similar.

Text content e.g. tweets, blog posts and similar, are shown in full in an overlay where there is space or as truncated text for longer content.

Within the data vault 167 there is a data clusters page 172. The page contains representations of user generated clusters 58 each represented with the name of the cluster 158 as well as an icon with a pie chart of the different sensitivity levels represented in the data elements 126. On the data clusters page 172 the user can create a new cluster 158 and view trending clusters.

A further data cluster detail page 173 provides a pie chart overview of the data groups 169 and the number of data elements 1126 represented in a given cluster 158. The user can navigate between or filter the data groups 169 to see the different data elements 126 by selecting from a provided menu. All data elements 126 are shown by default. Data elements 126 may be listed elsewhere on the data cluster detail page 172 and may be grouped accordingly to data group 169. The user can therefore select a given data group 169 here and then filter to view only specific data elements 126 of that group 169. For file-type data elements 126 the user can open a file directly from this screen 173, they can also view the data elements 126 in that data source itself. An info icon may be provided to reveal more detail about a given cluster 158. If the user is the one who created the cluster 158, they have permission to change the name of the cluster 158. Likewise if the user is the one who created the cluster 158 they can delete it. Other information that may be provided about the cluster 158 including its creation date and the number of users using it. A menu may be provided to allowing the user access to more detail.

The user can also here select and deselect personas 6 that the cluster 158 is associated with.

Users who did not create the cluster 158 will be identified as such by the system 2 and the details of the creator of the cluster (profile picture, name and potentially a see more button to view their contact detail page) will be provided. Users who did not create the given cluster 158 can remove it from their data vault 157 but they cannot delete the cluster 158 altogether.

The user can add data elements 126 by importing them from existing social network accounts. Selecting this option brings up social networks/data sources grid screen from which the user selects one or more data sources 126 logs into them, or to import all of the new data elements 126 and then select the data elements 126 from the now updated data groups 169.

A second option that may be offered is to add data elements 126 from already imported data. Selecting this takes the user to the data group's summary page from which they select a data group 169 and then one or more data elements 126 within that group 169, before selecting a done button. The user can also create data elements 126 manually within the system 2.

The user can share a data cluster 158 by social networks, bring up the sharing function of the secondary navigation 140 and within the sharing action the summary graphic of the data cluster 158 is shared along with an optional user-generated comment.

From the data vault 167 for both data groups 169 and data clusters 158 the user can add data by importing data elements 126 from new data sources or creating a data element 126 manually; they can also create a data cluster 158.

With regard to the data element 126 pertaining to location, for example these data groups 169 will follow a specific type of template. Manual creation of such data elements 126 will therefore have a specific form of layout related to that form of data group 169. It is envisaged that data group 169 pertaining to events will be the same. In creating a templated data element 126 the user first selects the relevant data group 169; this selection determines the form layout of the creation template. The user may specify an optional name for the element 126. Location elements, for example, will always ask the user to input a city, address, place name or postcode. This may be GO located on a map. The system 2 will detect the type of data element 126 and automatically set the sensitively level appropriately, however the user can change this. An optional info button can explain what each of the sensitivity levels are. Once the location has been entered, the area may be pinned on a map.

Once the pin has been placed on the map the user is taken to the relevant data group's 169 elements feed where the newly added element 126 is divisionalised such that it is clearly the most recently added data element 126.

Generally, data elements 126 follow a similar general form template which comprises options to specify text, file or media type of data element 126. When the type has been selected a done button 176 appears for selection by the user.

To create a data cluster 158 the user selects the created data cluster option from the data vault 167. In creating the cluster 158 the user first specifies the cluster's 158 name and then can add data elements 126 to the cluster's 158 data element field. The data cluster 158 creator data cluster option comprises an option to allow the addition of a data element 126. This takes the user to a screen allowing for the selection of a data group 169 from which they want to add a given data element 126. The user may select one or more elements 126 from the chosen data group 169 via an add function. When selected elements 126 have been added the user can continue to add new elements 126 or complete the cluster 158 creation.

Via a given feed trending clusters 158 are arranged such that they may be monitored in a visually appealing fashion and are listed under relevant group headings.

Referring now to the invention in more detail in the aforementioned range of figures there is shown a Personal Information Management System 10 having an Application Programming Interface (API) engine 12 used to pull in disparate units of data 20 from multiple data feeds acquired from multiple sources 14 such as applications, social networks, government record systems, medical record systems, bank accounts, mobile devices, automobiles, intelligent and dumb devices, sensors, connected devices, smart buildings, smart environments and other such enabled system and devices deemed relevant whether these sources are connected to an open computer network 18 such as the Internet or if they are operating outside of it being pulled into the system directly from stand alone devices or machines 16, into discrete units of data 20 that can be defined and distinguished from one another. These units of data 20 are tagged and mapped either automatically or manually on a personal data map by assigning a minimum of 1 data domain and 1 data sub domain as shown in the aforementioned range of figures to the metadata (descriptive information) of the imported unit of data 20.

The invention stores all imported units of data 20 in a Personal Data Store 22 which functions as the user's primary repository for all of their units of data 20. The API 12 also enables dynamic and persistent connections to multiple data feeds/sources in order to push data notifications including metadata associated with the manipulation and restructuring of said data. Additionally the system has a Data Grouping Engine 24 which is used to combine disparate units of data 20 into useful groups of data 26 that transform the disparate fragmented units of data 20 into useful and valuable units of information 26 that can be processed by the user or a third party entity. An entity can be another user, organisation, system, application or machine.

A data group 26 has a shell of encryption and (AI) 36 wrapped around it, which serves the dual purpose to protect it from being accessed by unauthorised third party entities and also provide an inherent learning ability within the data group 26.

The figures show that each data group 26 contains one and many data units 20 or groups of data units 26. Meaning that each data group 26 can contain between one and many elements where an element can be a unit of data 20 or a group of data 26 as shown in the figures. This means that a group of data 26 can contain data components of different 'densities' ranging from a single unit of data 20 to combinations of units of data 26 to complex combinations of data groups 26. The figures show a simple group of data referred to as a 'cluster' 30 alongside complex combinations of groups of data referred to as 'compound clusters' 32 and a 'nested compound cluster' 34 group of data. The different levels of complexity for data groups 26 shown in the figures ranging from a simple data cluster 30 to a nested compound cluster 34 is referred to as group or cluster density and the process of collapsing compound data clusters 32 into a single encrypted data group 26 which can be used as a single data unit 20 is referred to as nesting.

When a data group 26 is shared with a third party entity outside of the user's PIMS it is 'wrapped' in a shell of encryption 36 as shown in the figures.

Each encryption shell 36 in the figures requires that an entity has the necessary access rights before being granted access to the contents of the data group. So while an entity may be able to identify the structure of a compound cluster 32 i.e. which groups of data 26 are contained in that compound cluster 32, the entity will not be able to access the contents of those sub groups without the required level of authorisation. This would also be the case for the simple cluster 30 where an entity would not be able to identify the data units 20 within the sub group without the requisite access rights. Also with the nested cluster 34 a third party entity would not be able to identify any of the sub groups or data units within the encryption shells 36 without the requisite access rights.

As shown in the figures encrypted data groups 35 are made available to third parties external to the system via an outbound data API layer 28. This means data groups 26 can be shared outside of the system securely as encrypted data groups 36 enabling data to be shared between entities on open networks safely and securely without needing to secure the connections between the personal information management system and the applications and devices consuming the data groups exported by the system. This provides content level security per encrypted data group package in addition to maintaining secure network connections. The system uses a combination of machine artificial intelligence and group social intelligence to organise data units 20 into data groups 26 and to create clusters 30, compound clusters 32 and nested clusters 34 that are useful and valuable to entities. Artificial intelligence is used in the form of algorithms and a self-learning neural network comprised of multiple Threshold Learning Units (TLU's) used to create and combine data groups that are valuable and useful to entities. Social intelligence is enabled by way of providing people with tools to curate data groups 26 created using social utilities such as rating, ranking, voting, sharing, liking and following functions or otherwise that can be used to appraise data groups 26 for their utility and value by large numbers of people. Data groups 26, compound data groups 32, nested data groups 34, nesting and cluster density configurations can be created and configured manually by people as individuals, groups and organisations or automatically by the system's Data Grouping Engine 24 and by machines using MachinetoMachine (M2M) capabilities in the service of entities with access rights to an entity's Data Groupin Engine 24 or with a data group creating engine of similar capability. The invention allows for the creation of data groups 26 that can be defined and then wrapped in a layer of encryption 36 provided by multiple forms of cryptography, which enables them to be shared in open computer networks such as the Internet 18, securely without their content being able to be accessed by unauthorised third parties.

Similarly the system also allows for data groups 26 to be shared as clusters of data units whereby third parties are able to securely access the data units 20 (i.e. the actual content) within the structure of the data group 26 being shared by the sharing entity. The system also allows for data groups 26 to be securely shared with third parties enabling others to adopt the structure of the data group 26 being shared and to build on it further by adding other data units 20 or data groups 26 to the structure and storing the modified structure as a new data group 26 which can be used or shared as per other data groups 26. The system described also enables entities to dynamically track the data groups 26 of other entities and receive updates to changes to the structure, contents or data units 20 of the tracked entity's data feeds within those data groups 26 when they are updated assuming the tracked entity has granted the third party the requisite access rights to such updates.

The system can be used to create data groups 26 that have varying levels of sensitivity and security wrapped with encryption layers 36 that enable different entities to have access or be restricted from accessing the data groups depending on the third party's access rights and the context of their access requests. Different people 54, organisations 56 and machines 58, have differing levels of access to the different sub groups of data, i.e. clusters 42, 44 and 46 of the nested cluster 40 depending on their access rights and the context of their access requests even though the whole nested cluster 40 may have been shared with all people 54, organisations 56 and machines 58 shown.

The system 2 enables entities to create data groups 26 with encryption wrappers 36 which can be shared with or sold to third parties with controls and restrictions on the use of their data in return for some form of payment or reward. The system described enables users to organise all of their personal data units extracted from all of their personal information sources into a minimum of one of numerous data domains and one of numerous data sub domains, enabling it to be easily found, identified and catalogued. The invention also allows for a mapping of multiple alternative numbers of domains and sub domains. The invention is a system that self-learns how to dynamically create, organise and share data groups 26 by combining artificial intelligence through a neural network, algorithms or some other form of machine intelligence with social intelligence, as outlined above along with contextual awareness to design and create data groups 26 that are most valuable, relevant and useful to them.

The invention is a system for assigning data groups 26 to different identity states of an entity which may take the form of a realtime, dynamically changing authentication framework using different persona states to manage the access rights of third parties to the data groups 26 structure and content that can also change dynamically in realtime based on changes to the context of the identity persona and/or changes to the context of the sharing rules of the data group 26.

The system can be used to underpin an ecosystem where third party application providers 64 can design applications that consume data groups 26 with encrypted wrappers 36 where the data groups 26 are accessed across the open computer networks 18 such as the Internet to deliver sophisticated services to entities that rely on rich and complex data groups 26 provided by the system. The system will enable such application providers to deliver richer services and experiences to end users than the current siloed data approach to application development allows for.

Such an envisaged ecosystem also allows for entities to use the system to generate data groups 26 which they can securely trade with third parties for rewards, remuneration or discounts on products and services in a Consent Driven Data Marketplace 66 that the system enables through which they can make their data groups 26 available safely and securely in a trusted environment.

The advantages of the invention include that it requires a low level of time and cognitive investment from users to bring various data sets into a common repository and it makes it easy for them to organise disparate data elements into an order that is easily navigated, accessed, used and understood. The rules, structures and processes for the operation and use of this Personal Information Management System are highly user centric making it easier for people to embrace and use it to manage their personal information putting it to use for them in their daily lives.

The system uses algorithms, artificial intelligence and social intelligence to transform disparate units of data into useful clusters of information that resonate with how people think of themselves and their information making it easier for them to use this information in meaningful ways. The invention does not require users to share large amounts of sensitive data with third parties in order for third parties to sift through these data sets and determine which of them are valuable and which are not. It enables a high level of granularity and specificity in personal data management making data sharing much more safe and controlled for users. As such there is a much lower level of exposure and vulnerability for users when sharing their personal data with third parties than with current systems. There is also less risk for enterprises as the system enables them to specify exactly which data they need and only collect consumer personal data needed for operations as and when they need it. This means they need to allocate much less resources to storing and collecting consumer data which ultimately means less costs, vulnerability and exposure for them.

The system also provides a means by which entities can learn from others which sets of data should be shared with whom and which data sets can bring which types of value, utility and reward to users and enterprises alike. The system enables entities to benefit from group social intelligence and artificial machine intelligence to transform disparate units of data into discrete groups of information that are useful and valuable to users, organisations and machines in a new personal information ecosystem which it also enables and underpins. The system creates a platform with which entities can share information of varying degrees of sensitivity with other entities efficiently, safely and securely according to dynamic and contextual identity authentication rules. Finally the invention underpins a marketplace that enables users to extract value from their information by making it available to third parties for, discounts, rewards, remuneration and products or services on their terms.

There are rights attached to personal information that should be respected by other individuals, enterprises and Governments in the digital domain. A core pillar of these rights is that users should be at the heart of the management, use and sharing of the data they create. Users should be free to carry out their work and private activities online with the trust that the data they choose to share is handled appropriately and the data they choose to keep private is protected from exposure.

The current ad-hoc service-centric approach to personal data protection is not matched to the current and future needs of users. This leaves users increasingly distrustful of online service-providers, and uncertain of engaging with new services where they need to reveal more personal data.

At FIG. 1, there is therefore envisaged a user-centric web ecosystem, or system 2 where personal data services are provided by a competitive private sector, which allows users to manage their digital identities and act as personal data management hubs when accessing cloud services. To realize this vision new products are required which treat identity, data privacy and security as core values that are embedded within the applications themselves.

The system 2, enables citizens and organisations to use online tools and cloud-based services secure in the knowledge that they are in control of their personal information and digital identity. This product will operate within the complex world of mobile, cloud-based applications (both social and business) and have the ability to provide links to both open and closed systems (e.g. web applications and secure corporate networks).

The system 2 secures information (content) and personal identity data in the cloud, allowing enterprises and users to control who sees what when. The system 2 creates a secure, trusted personal data eco system, that puts its users in control—providing them relevance, reward and personalized services and content.

Figure 2:
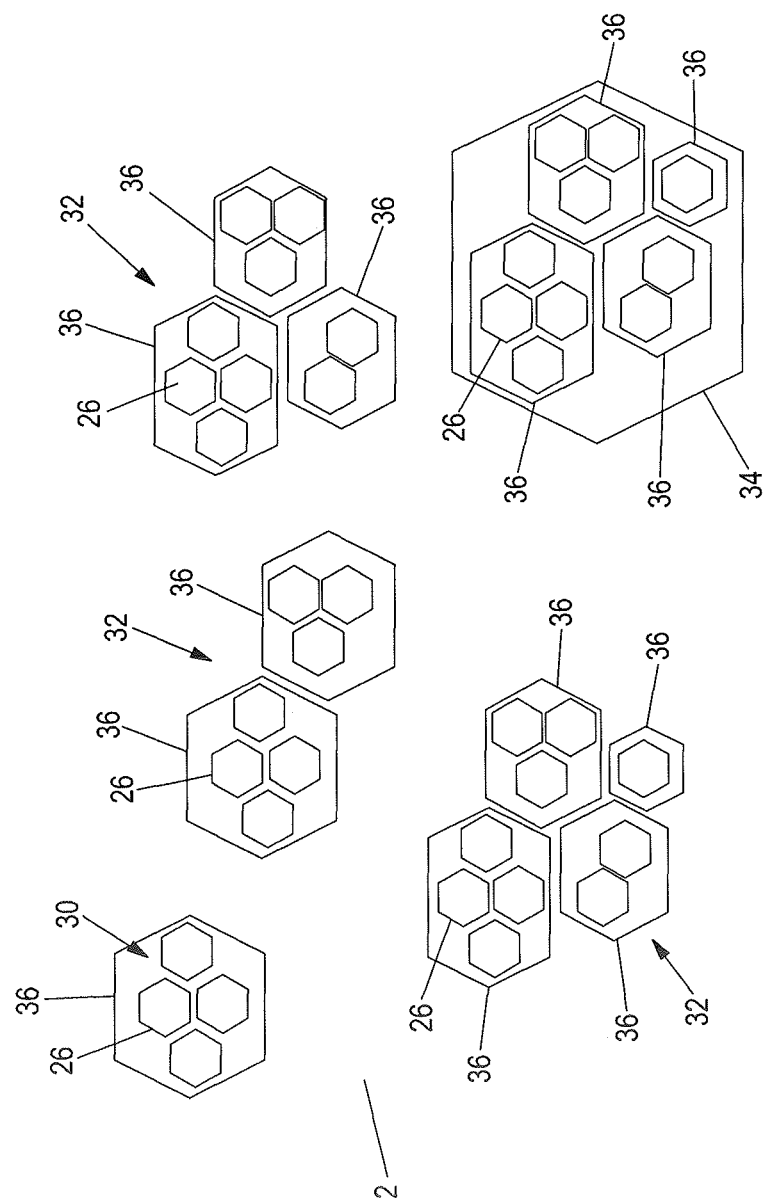
FIG. 2 is a representation of the data groupings created with the system shown in FIG. 1.
Figure 3:
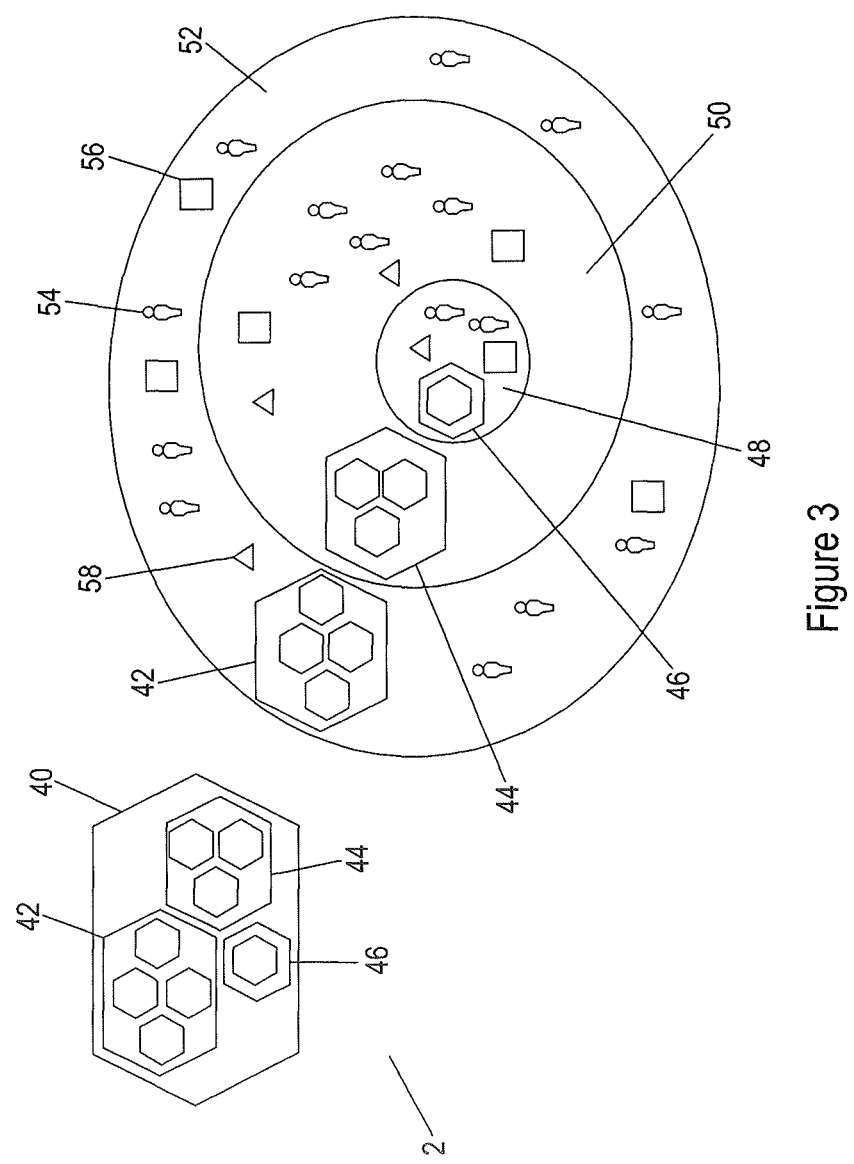
FIG. 3 is a representation of how the data groupings in FIGS. 1 & 2 restrict access to their content.

In preferred embodiments, core Features of the the system 2 shown at FIG. 2 include:
  Secure Personal Data Vaults (Personal Data Stores)—
    Store entire digital identities
  Configurable Intelligent Personas—Create multiple identities with differing privacy attributes
  Highly Secure Footprint and Data Shield—Secure communication, controlled data push, informed data pull
  Consent-driven Real-Time-Bidding exchange (offering clean data and rewards)
  Further, in preferred embodiments, core features include:
  Personal Data Store
  Secure messaging,
  Secure content,
  Secure storage,
  Secure browsing,
  Big data analytics
  Persona filters
  Context aware security As shown at FIG. 3, in preferred embodiments, this personal data ecosystem or system 2 puts the user in control and gives the user has the ability to manage his or her personal information; create a single, integrated view of one's behaviours and activities; provide identity and claims verification; selectively share this view with the organizations of one's choice; better use one's information as a tool; receive personal information handed back from organizations; use analytics applied to one's information to spot trends; communicate and share opinions and views with others (e.g. P2P product reviews); and set priorities and planning for different aspects of one's life (e.g. health and wealth planning, getting married, planning for retirement). In summary, individuals will be able to analyse and set priorities or constraints based on their own behaviour, life goals and events, rather than having to accept analysis and priorities based on indirect data from third party data aggregators—which is often misdirected, incorrect or out-of-date. The aggregated data will reside in the PDS, rather than dispersed amongst organisational silos.

In known data system models, the organisation controls customers' data, that data is dispersed amongst the organisations and information is collected, used and disclosed by organisations for their own purposes and according to the organisation's own privacy policy. In contrast, in the proposed system, individuals control their own data, individuals are the point of data integration and information is collected used and disclosed by individuals for their own purpose and according to the individual's own personal privacy settings.

The adoption of a user-centric approach to personal data management could improve the current situation, by providing to individuals greater possibilities in controlling and exploiting their personal data. This could be achieved by delivering to users "Personal Data Services" through which they can collect, store, organize, share, process, and, possibly, trading, all their personal data.

In some preferred embodiments, the system may offer;
  Easy to use, persona controlled, identity management
  Data cleansing and filtering
  Privacy-by-design with persistent context-aware security
  A digital ecosystem that increasingly rewards consumers as it grows via a mutually beneficial, clean data marketplace.

These personal data management services are underpinned by the addition of semantic intelligence which provides the ability to optimise and personalise the services and build mutually beneficial, deep, granular relationships between consumers and content across websites, applications and devices. Semantic intelligence gives the product the ability to process data and information-based semantic patterns and rules in order to add value to the product offering.

In certain preferred embodiments, the client of the system 2 offers users the ability to create and use multiple personas with differing levels of anonymity and permissions attached. These can then be used for multiple social and/or business tools and applications as well as profiles for secure email communications. Whilst this can be done manually already by users, the application will use a simple user interface and store persona details in the PDS, so the data is organised and easy to set up and operate. Switching between personas wilt be a simple touch of a button. The project will research and develop the optimum user experience for both individuals and enterprises. An example use case would be where an employee wants separate Digital identity for work and personal use. Using the persona-controlled identity management aspects of the system 2, these can easily be set up. Having established a persona, the permissions and security levels for each can be set appropriately. Each persona will have a related digital footprint, which will be stored and accessed via the system 2.

Figure 4:
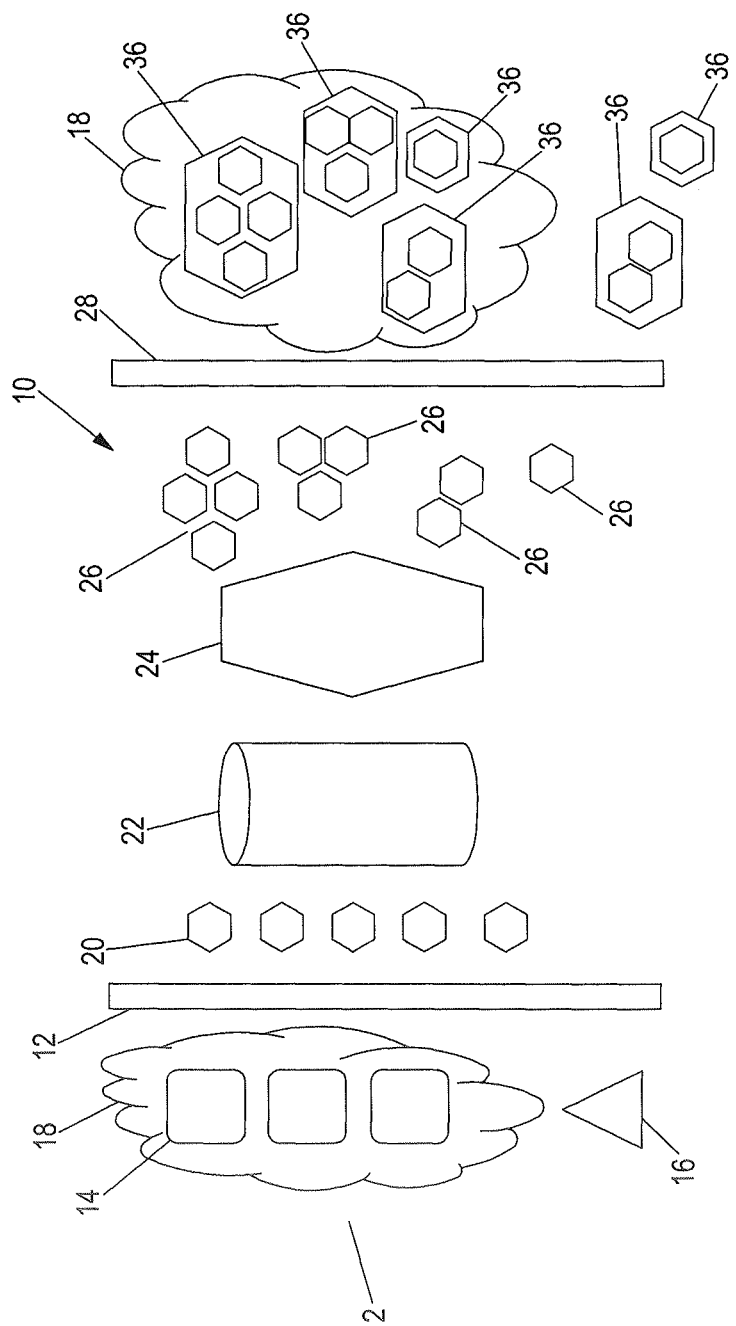
FIG. 4 is a representation of the system shown in FIG. 1 being used to share the data groupings shown in FIG. 2 with external parties to the system.

In some preferred embodiments, the system's 2 server side includes a semantic intelligence engine using neural network methods that will build 'rich persona' i.e. adding interests and preferences etc based on digital behaviour and transactions of the specific persona. This self-learning is used to improve the user experience. Where authenticated (real) personas are required, the system is designed to work with a variety of authentication methods used globally and will provide application interfaces to provide needed data to third parties. The benefits to users is they wilt be able to securely store authenticated persona details in their PDS and use this central store to access secure services. At present there is no global authentication standard accepted by every service provider or web site. Many service providers, especially big firms in the financial or insurance industry have set up a own PKI (Public Key Infrastructure) to provide every user a unique means to access IT systems. New technologies are also being developed, such as Information Cards, that aim to provide an interoperable architecture for digital identity (identity metasystems), however these have yet to be widely adopted. Instead of choosing a single method, the system client will be designed to work with various multifactor authentication methods like SSL certificates, SuisseID, YubiKey, TiQR, One Time Password—OTPs (RFC2289, RFC4226, OATH, Google Authenticator), and others. In effect the system 2 will provide orchestrated authentication as a service. This is depicted at FIG. 4.

The system 2 is a multi-threaded OS level mobile and cloud application that provides a suite of services to the user and enterprise that includes:

A secure personal data store (PDS) with centralised control over access
Secure messaging,
Secure content,
Secure storage,
Secure browsing,
Big Data analytics and
Persona filters (supports multiple identities and attribute authorities)

The system 2 also intelligently monitors all system processes in order to provide deep insights into user behaviour and provide above military grade security.

A Personal Data Store (PDS) gives the user a central point of control for their personal information (e.g. interests, contact information, affiliations, preferences, and friends), including structured or unstructured data, such as text, images, video or sound. The information that a person chooses to put into a PDS may be general in nature, can relate to a specific topic, such as health or education information, or can be information relating to a particular objective, such as managing one's online presence. A key concept behind PDS is 'controlled push' and 'informed pull' i.e. the customer engages in a controlled pushing out of their personal information out, but they can also pull information in by requesting data from different sources, based on the customer's own criteria (e.g. best price for car insurance).

Additional PDE technologies, services and tools include information logistics platforms and services that can be used for efficient information delivery and exchanges. Also, personal information management services (PIMS) can assist individuals in researching and coordinating life processes and episodes, such as getting married, moving or retiring. Analytics tools can monitor one's patterns, examine variances, set personal targets and goals, and visualize data. Targeted personal data services, such as to manage one's online reputation, function to enhance PDVs and could eventually integrate with PDV.

In some preferred embodiments, the architecture of the system can be compartmentalised into 6 distinct layers in order to maximize the advanced security model. Each layer represents a logical separation of the system components. The interface, network, service, application, and data layers are all protected by a persistent security layer that includes active system monitoring using artificial intelligence. These provide Host intrusion detection systems (HIDS) and network intrusion detection systems (NIDS). The interface layer resides on the client side (device) whereas the network, service, application and data layers reside on the server side (cloud).

Key aspects of the system 2 include, first a user authenticator which provides transactional and communication based user authentication for all gateways. This enables single sign on (SSO), auto fill and one click financial transaction processing using TLS and advanced session based encryption standards.

Second a Personal Data Store (PDS)—Using an approach based on the Higgins PDS, all personal data is stored in one secure location and is encrypted to AES 256 for users protection. This enables auto fill and one click financial transaction processing. The data stored is categorized into 5 different data types:

1. Confidential (E.g. Medical records),
2. Personal (E.g. Address),
3. Contextual (E.g. Location),
4. User generated (E.g. Messaging),
5. 3rd Party (E.g. Analytics)

Third, a Profile Manager—Customized profiles, E.g. Professional, Personal and Political profiles enable you to share only the specific information you allow within your professional, personal and political circles. You are able to set up groups and assign specific contacts to these groups in order to securely share relevant data and protect sensitive information. Most open social networks (E.g. Facebook, Twitter, etc) now accept account registrations based on the details you enter without validation as to whether your details are in fact real or not, system 2 will enable users to create and manage multiple profiles across multiple social networks. This will further protect your identity and the anonymity of your digital communication when desired.

Fourth, a Footprint Shield—This enables users to manage who has the right to access and use their data. This will also enable users to trade data for financial reward via system 2's 'Clean Data Exchange'. (system 2's Clean Data Exchange will not be provided until after the alpha and beta releases.) Stealth and anonymous mode settings can be applied to any of a users' profiles in order to protect emails and prevent any online activity from being tracked back to the user. This gives users an invisible digital footprint in relation to organizations and people with whom they don't want to share your data. Active spam filters shield users from unwarranted messaging. Using the TOR Network user anonymity becomes protected in a way that is untraceable and untraceable.

Fifth a Content Shield—Another key element is the ability for system 2 to protect user content. This means that any content uploaded via system 2 will only be accessible via an authorised system 2 client. This enables individuals and organisations to control access to their content.

Sixth, Artificial Intelligence—A neural network tracks user behaviour and provides valuable insights into all online activity. This in turn enables a personalized online experience that is mapped directly to the users individual browsing behaviour, preferences and profile traits.

Seventh, clean Data Exchange—A real time bidding data exchange wilt be developed post beta launch. This will enable users to trade/sell access to their data to third parties that assure they will use this data ethically in line with the principles outlined in Digitteria's Clean Data Charter.

Eighth secure Messaging—This service allows registered system 2 users to send, receive and reply to messages securely to each other or to groups of people that have been setup as specific recipients of these messages. These messages do not use standard SMTP so cannot be intercepted by usual intrusion techniques. Messages can be further restricted to only allow certain users or user groups to send, receive and reply to these messages based on the personas setup by the user.

Figure 5:
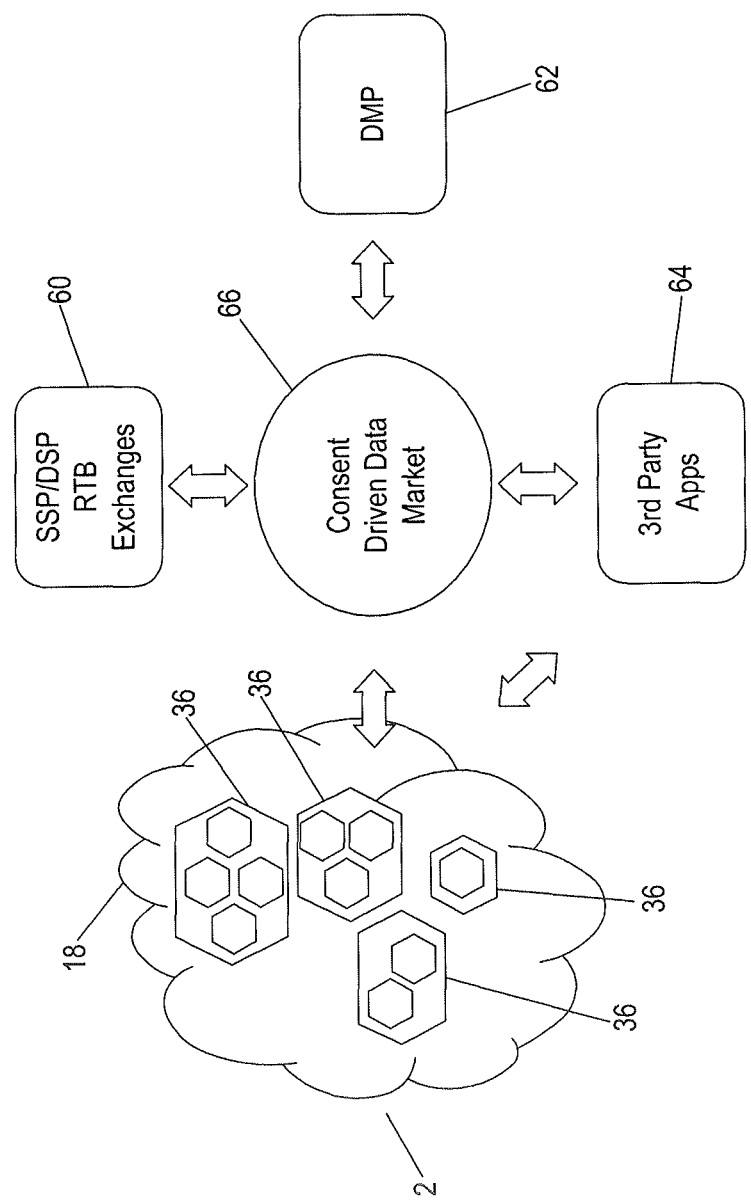
FIG. 5 is a representation of the data groupings in FIG. 2 being used to underpin a data market place and operating framework for use by third parties.
Figure 7:
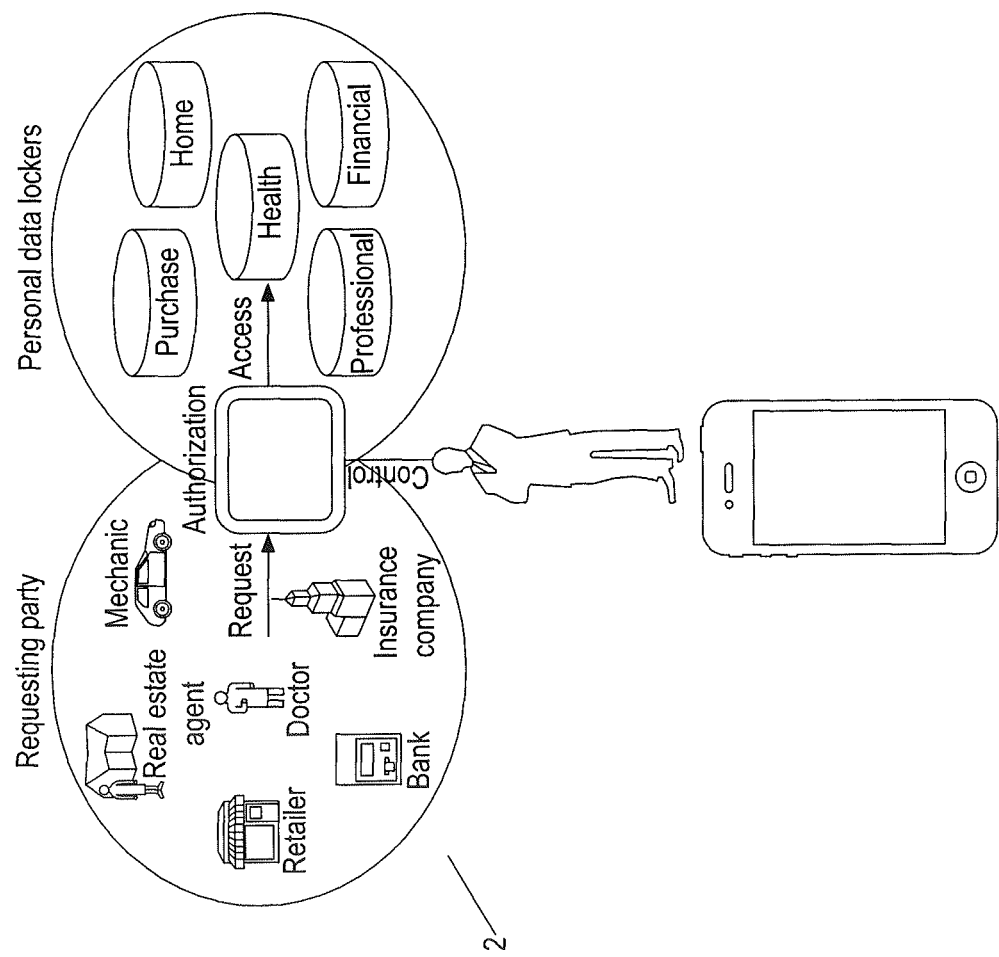
Figure 7A:
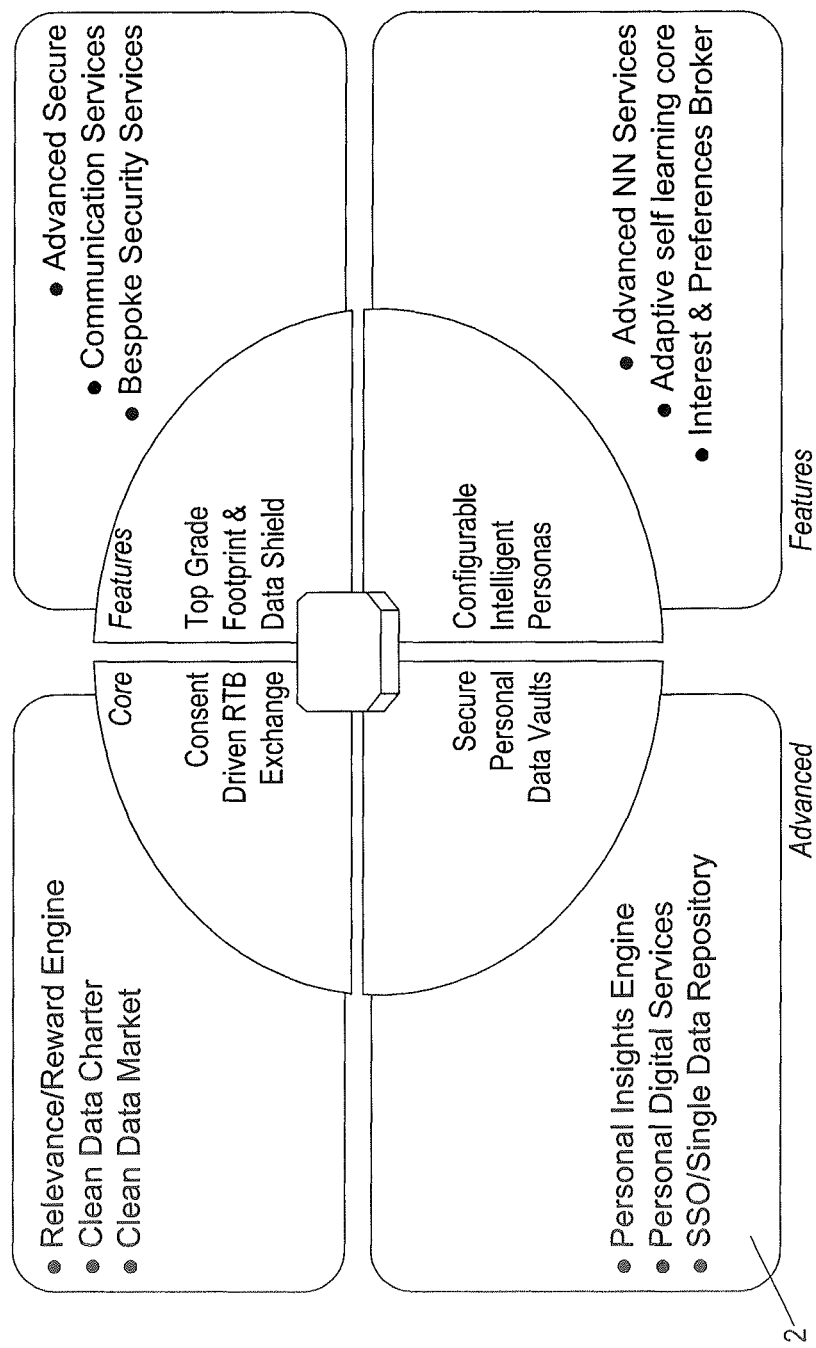
Figure 8:
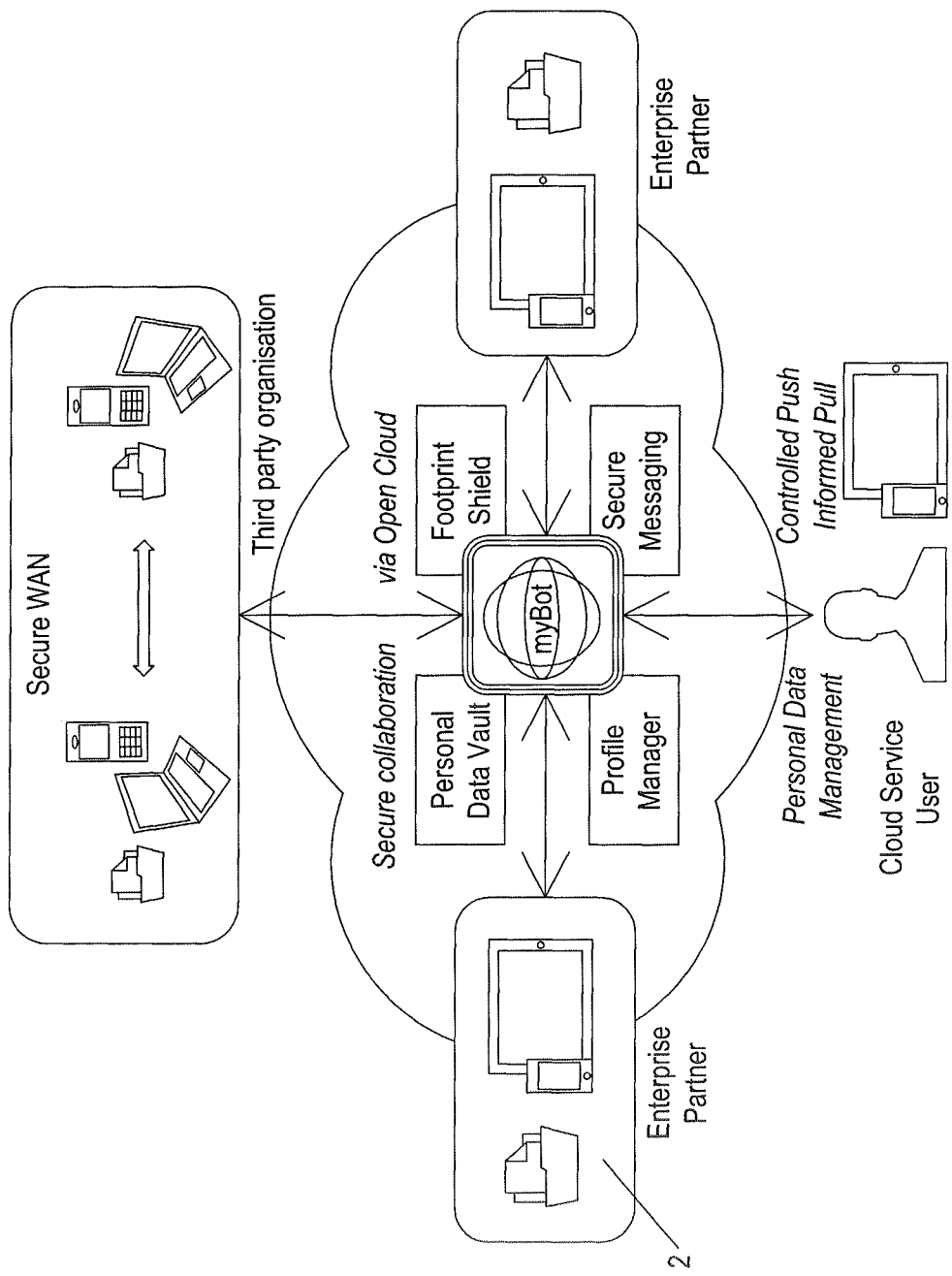
Figure 9:
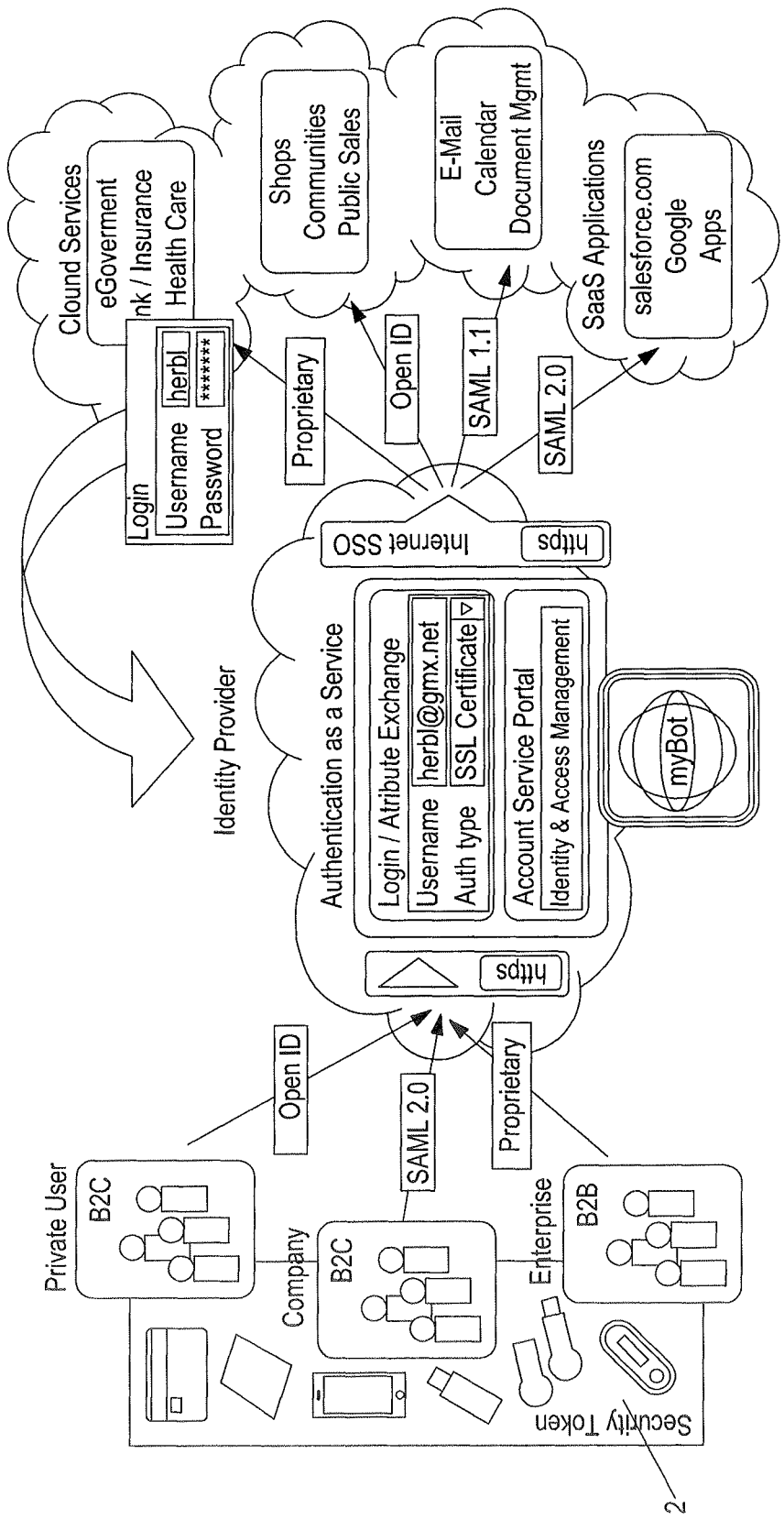
Figure 10:
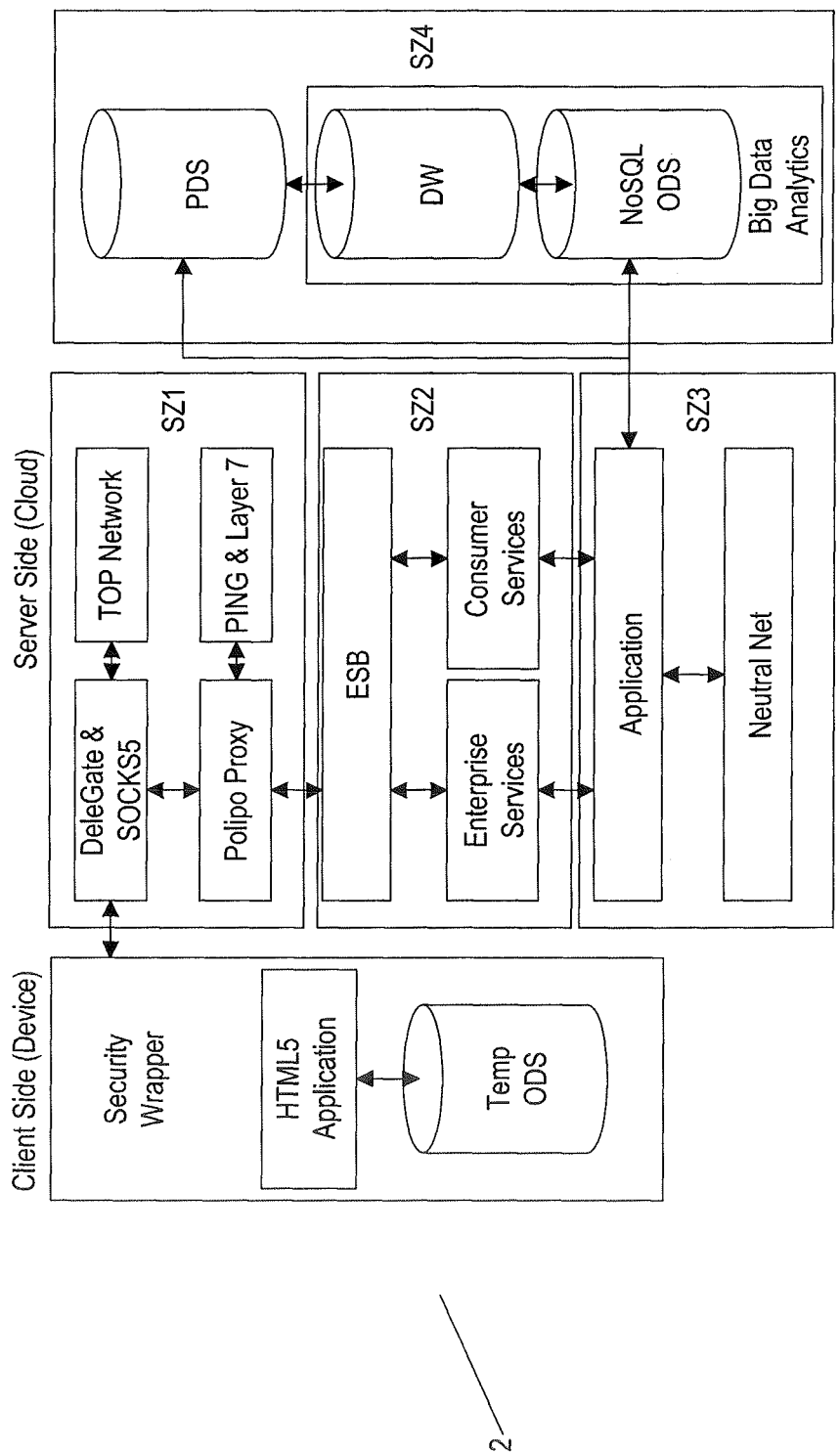

An overview of the system's architecture can be seen at FIG. 5.

The client side consists of a HTML5 web app 200 with a temporary Operational Data Store (ODS) 202 and a persistent security wrapper 204. All client ports 206 are locked down on installation and the client can only communicate with the cloud services 208 by using an encrypted handshaking protocol between the client security wrapper and the cloud Security Zone 1 (SZ1) 210. Every client session executes a Temp ODS that is dispensed with once the session has ended preventing data from being stored on the device for longer than a specific transaction requires.

The server side consists of 4 security zones. SZ1 210 protects the network and transport layer, SZ2 212 protects the service layer, SZ3 214 protects the application layer (including the Neural Network) and SZ4 216 protects the data layer.

Security Zone 1 210 contains the initial cloud gateway (DeleGate & SOCKS5) that handles all device session requests. If a session is valid then a request is made to the Polipo Proxy to validate user identity and permissions via PING and Layer 7. If the session is not valid then the session is terminated with any erroneous attack being logged and potentially quarantined based on the attack vectors detected. SZ1 210 also includes the TOR network access gateway that is switched in or out based on valid user requests permitted by Polipo and DeleGate.

Security Zone 2 212 contains the Enterprise Service Bus (ESB), Enterprise Services and Consumer Services. No session request is permitted by SZ2 212 unless a valid SZ1 210 session has been executed. Once a valid SZ1 session has been authorized by the SZ2 212 handshaking protocol, the session request is queried by the ESB and then routed to consume the service(s) that are relevant to that request.

Security Zone 3 214 consists of the application and neural network. The security handshakes in SZ3 214 work in a similar manner in terms of session permissions to how SZ1 210 and SZ2 212 communicate. The application provides the service layer with the necessary outputs to power the enterprise and consumer services. The neural network sits within SZ3 214 in order to provide real time user and system metrics to the application in the most efficient way possible.

Security Zone 4 216 contains the Personal Data Store (PDS), Data Warehouse (DW), NoSQL Operational Data Store (ODS) and Big Data Analytics Engine. SZ4 216 represents the most hardened security zone that is only accessible via a valid security chain built from the handshaking protocols between SZ1+SZ2+SZ3+SZ4. Once a valid session is permitted a query is routed from the application through SZ3 214 into SZ4 216. Data is fed into the DW from the PDS and NoSQL ODS but never directly from the application. This enables rapid cube processing and the generation of advanced data models including graph and chart data powered by the Big Data Analytics Engine. These data models create multi dimensional views of the user including matrix analysis of consumer and enterprise services that are ever present and ever learning in conjunction with the neural network.

Turning specifically to the technical architecture of the system 2, whilst having regard to the fact that much of the architecture has been constructed using open source principles, the system is a multi threaded OS level application that monitors all system processes via TCP/IP and UDP to protect your data and online profile. The system 2 has been compartmentalized into 5 distinct layers in order to maximize the benefits of the technology that it will use. Each layer represents a separate area of technical functionality and the architecture reflects an enhanced security model in order to protect the user's data and communication when using the system 2.

The user authenticator provides transactional and communication based user authentication for all gateways. This enables single sign on (SSO), auto fill and one click financial transaction processing using secure socket layers and advanced encryption standards.

The data vault uses the Higgins PDS, all personal data is stored in one secure location that is 256 bit encrypted for users protection. This enables auto fill and one click financial transaction processing using secure socket layers and advanced encryption standards.

The profile manager manages Customised profiles, e.g. professional, personal and political profiles enable you to share only the specific information you allow within your professional, personal and political circles. Hand-shaking protocols enable you to share only the information you allow with third parties. Most open social networks (e.g. Facebook, Twitter, etc) now accept account registrations based on the details you enter without validation as to whether your details are in fact real or not. System 2 will enable users to create and manage multiple profiles across multiple social networks. This will further protect the anonymity of your digital communication.

The footprint shield manages who views your data and your online activity. This enables you to manage who has the right to access and use your data. This will also enable you to trade your data for financial reward via System 2 ethical data trading exchange. (System 2 ethical data exchange will not be provided until after the alpha and beta releases.) Stealth and anonymous mode settings can be applied to any of your profiles in order to protect emails and any online activity from being tracked back to you. This gives you an invisible digital footprint in relation to organizations and people with whom you don't want to share your data. Active spam filters shield you from unwarranted messaging. Using the TOR Network your anonymity becomes protected in a way that is untraceable and untrackable.

The content Shield is the element of the system 2 which allows the user to protect his content. This means that any content downloaded via System 2 will only be accessible via an authorised System 2 client. This enables individuals and organisations to control who has access to their content.

A neural network tracks behavior and provides valuable insights for all your online activity. This in turn enables a personalized online experience that is mapped directly to your browsing behavior, your preferences and profile traits.

A real time bidding data exchange will be developed post beta launch. This will enable users to sell access to their data to third parties that assure they will use this data ethically.

These functional areas are delivered through a technical architecture that is defined over five tiers and two (client and server side) configurations.

Figure 11:
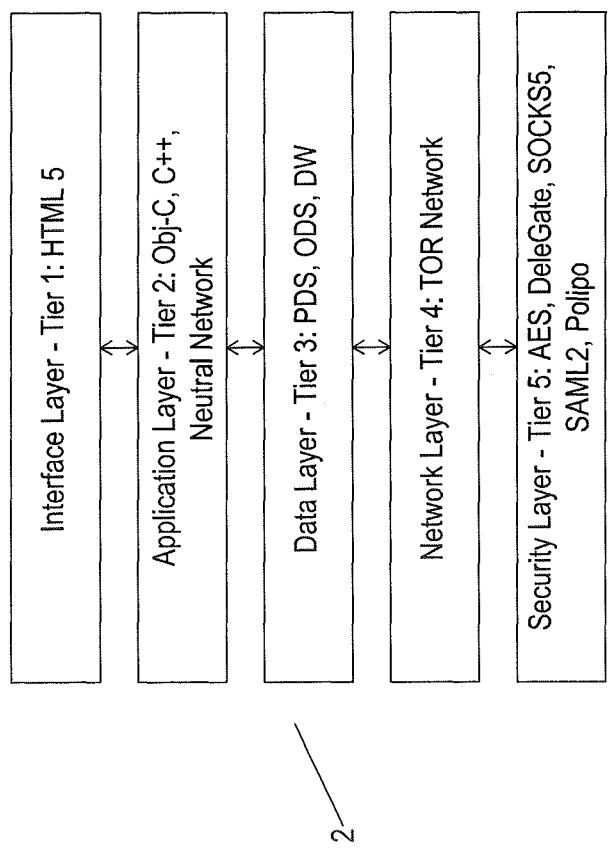

System 2 uses n-Tier architecture in order to be flexible, extendable and scalable. The 5 base tiers consist of the interface Layer, Application Layer, Data Layer, Network Layer and Security layer as shown at FIG. 11.

Figure 12:
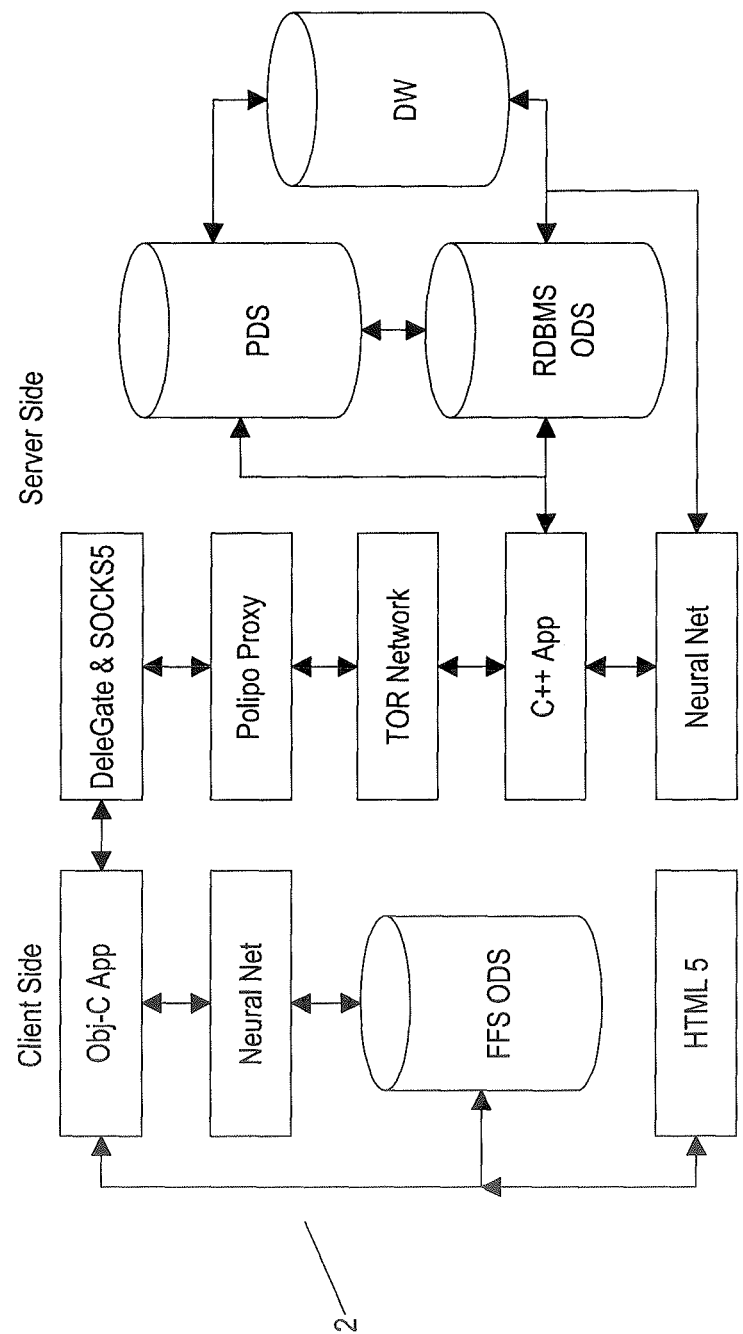

The implementation of the System 2 architecture is further segmented into two parts: Client side and Server side. The high level conceptual architecture is represented by FIG. 12.

Key:
FFS ODS=Flat File System Operational Data Store
Neural Net=Neural Network
Obj-C App=Objective C client side application
Delegate=Application level gateway
SOCKS5=Internet Protocol Packet router
Polipo Proxy=Proxy Server
TOR Network Secure Communication Network
C++ App=C++ server side application
RDMS ODS=Relational Database Management System Operational Data Store
PDS=Higgins Personal Data Store
DW=Data Warehouse Tier 1: Interface Layer: HTML 5 is a new standard that offers significant enhancements to the previous version of HTML and XHTML. It defines a single language that can be written in HTML and XML and attempts to solve issues found in previous versions of HTML and addresses the needs of web applications, an area previously not adequately covered by HTML. HTML 5's web application capabilities means it can be used to develop platform agnostic web apps that can be deployed across multiple devices, and operating systems, e.g. Windows, OS, Linux, iOS, Android, etc.

HTML5 has been selected as the technology to build the user interface for the following reasons:

Open Standard: HTML5 is open source
Platform agnostic: The interface is portable and not tied to any platform
Flexible HTML 5 allows rapid development and fast changes
Lightweight: Small code-base that uses minimal memory
Powerful: Introduces integration for API's & improves markup for documents
Rich visualization: Enables rich interfaces with CSS and JavaScript A key element of System 2 is to enable a fluid and smooth user experience. HTML5 enables the user interface to be built to a high-level design aesthetic while utilizing the rich feature set which in turn fosters interoperable implementations.

4.2) Tier 2: Application Layer

The application layer consists of two distinct implementations: one on the client side and one on the server side. The application layer is separated from the interface layer in order to enable faster back-end processing and enhance security levels. Operating System (OS) level objects can be invoked by virtue of doing this, thus further enabling System 2 to gain access to features of the hardware components of the client device being used.

The technology used to build the application logic on the client side is Objective-C. This is due to Apple's proprietary OSX and iOS being used as the initial platforms for System 2 using the iPhone and iPad. Objective-C is a language based upon C, with a few additions that make it a complete, object-oriented language. Although the differences can fade into shades of grey, Objective-C is different from C++ in the sense that it uses dynamic typing, binding and loading whereas C++ uses the static form. This translates to making Objective-C more flexible.

The server side implementation will be primarily based in C++ with the extension of SAML2 to ensure secure transfer protocols.

Another major reason to use C based languages is that when System 2 is rolled out to other devices, such as embedded systems (e.g. GPS) the code can be ported without significant modifications to the object model.

Separating the user interface from the application logic represents a more secure and robust implementation. The application logic will invoke web services and carry security protocol messaging through the data layer transport. The Objective C client side application provides the application logic for the operation of the System 2 client on the target device.

Figure 13:
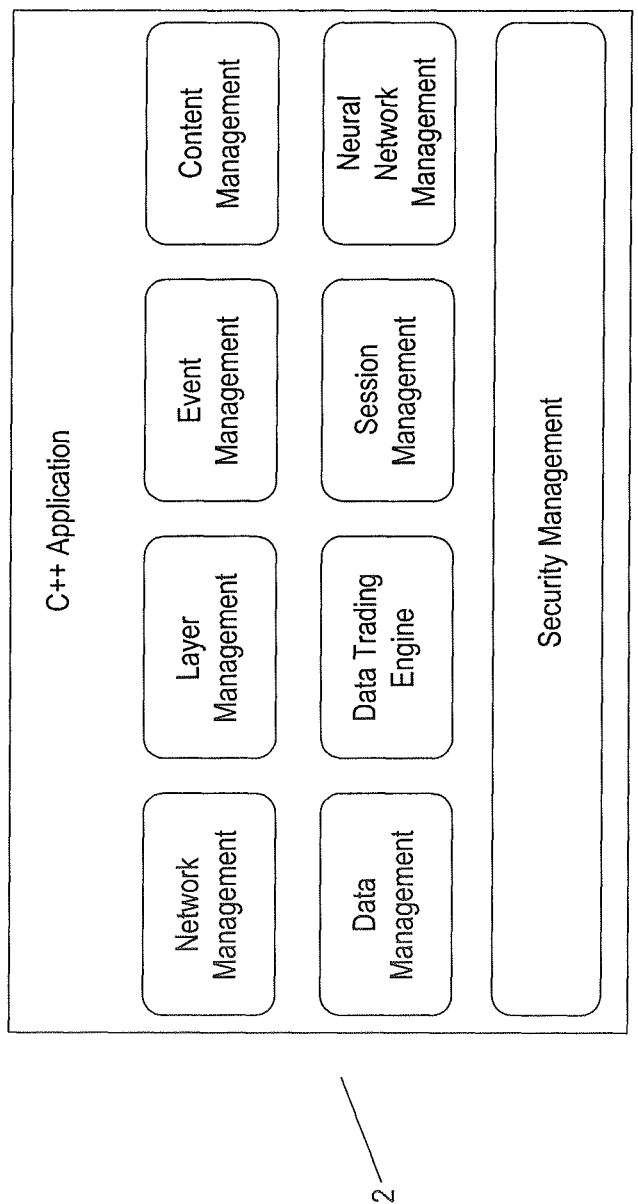
Figure 14:
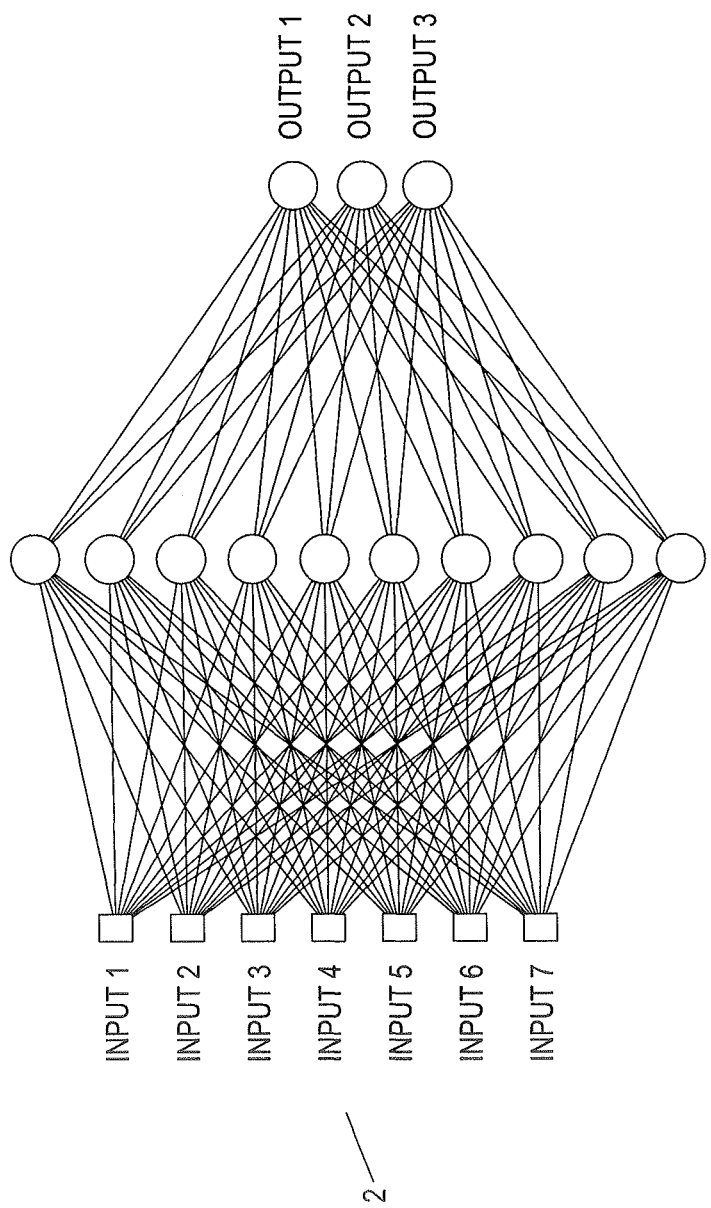

FIG. 13 shows the conceptual architecture of the application layer:

The C++ server side application consists of the following nine components:
1. Network management
2. Layer management
3. Event management
4. Content management
5. Data trading engine
6. Data management
7. Session management
8. Security management
9. Neural Network Management Network management—the logic and functions for managing all communication between the application layer and network layer will reside within the application layer. This will manage and control access to the TOR network.

Layer management—communication between all layers will be controlled within the application layer. Each layer will consist of a defined set of objects that will provide the rules for communication in the Object Oriented Architecture.

Event management—every event executed by the user will be tracked and registered by the application in the ODS in order to power the Neural Network. The learning objects in the neural network will continually consume and analyse the event data.

Content management—this will provide two main functions: a) page level content filter to provide content that is relevant to the particular profile being used; b) content wrapper that encrypts all downloaded content so that it can only be viewed by the specific user when using System 2.

Data trading—a data trading engine will allow the user to trade their personal data regarding any or all of their profiles in an ethical manner on a data trading exchange. This will provide remuneration for the user should their data be used. Alternatively, the user will also be able to swap their data for other data that they require in a similar manner to equity swaps on the stock exchange.

Data management—a centralized data query engine will sit within the application layer to manage all data communication between the application, PDS, ODS and DW.

Session management—each time System 2 is used a new session is generated as a base element of profile and security management.

Security management—control and management of the gateway, proxy, encryption and content wrapper will be performed by the security management component in the application layer.

Neural Network management—the Neural Network algorithms and logic will take the form of a number of functions in the application layer that will control the learning objects.

Neural Network—The neural network will have two distinct implementations: A lightweight client side implementation and a server side implementation within the application layer. The client side elements will represent a number of learning objects that will communicate with the full server side neural network via the proxy server architecture. The server side implementation represents the intelligence behind the application. This will learn about your every move and reflect a deep insight into your digital profile and behavior. The Neural Network will be developed for the beta release. However, an event tracking engine will be used from the outset of the alpha build in order to start generating the profiling data set that will power the learning objects in the Neural Network.

FIG. 13 below represents the conceptual architecture of the Neural Network. It is split into three separate layers: Input, hidden and output. The input layer represents the nodes used to capture user activity. The hidden layer represents the processing of the learning objects and the output layer represents the results of the processing.

Tier 3: Data Layer

PDS—The user data for System 2 will be stored in the Higgins Personal Data Store (PDS), an open source technology dedicated to giving individuals more control over their personal identity, profile and social network data. Project Higgins—which is being managed by the Eclipse open source foundation—is developing software for "user-centric" identity management, an emerging trend in security software. It enables individuals to actively manage and control their online personal information, such as bank accounts, telephone and credit card numbers, or medical and employment records—rather than having institutions managing that information as is the case today. People will decide what information they want shared with trusted online websites that use the software.

A PDS is a cloud-based service that works on behalf of an individual, its purpose is to give individuals as much control as possible over their own personal data. A PDS provides a central point of control for information about a person, including theft interests, affiliations, friends, and so on. The PDS is a place where the user can control data flows between services that provide information about them and services they wish to consume it.

Higgins makes it simple and secure for someone to change an address across all their online accounts with a single keystroke; delegate who can see what elements of their medical records; or change a password across online banking and brokerage accounts. For example, a person can grant their insurance company broad access to their personal information and medical records, while at the same time limiting the amount of data made available to their cable company. In turn, businesses can create new channels of communication with customers—enabling information to be shared securely across networks to deliver targeted, relevant products and services.

Figure 15:
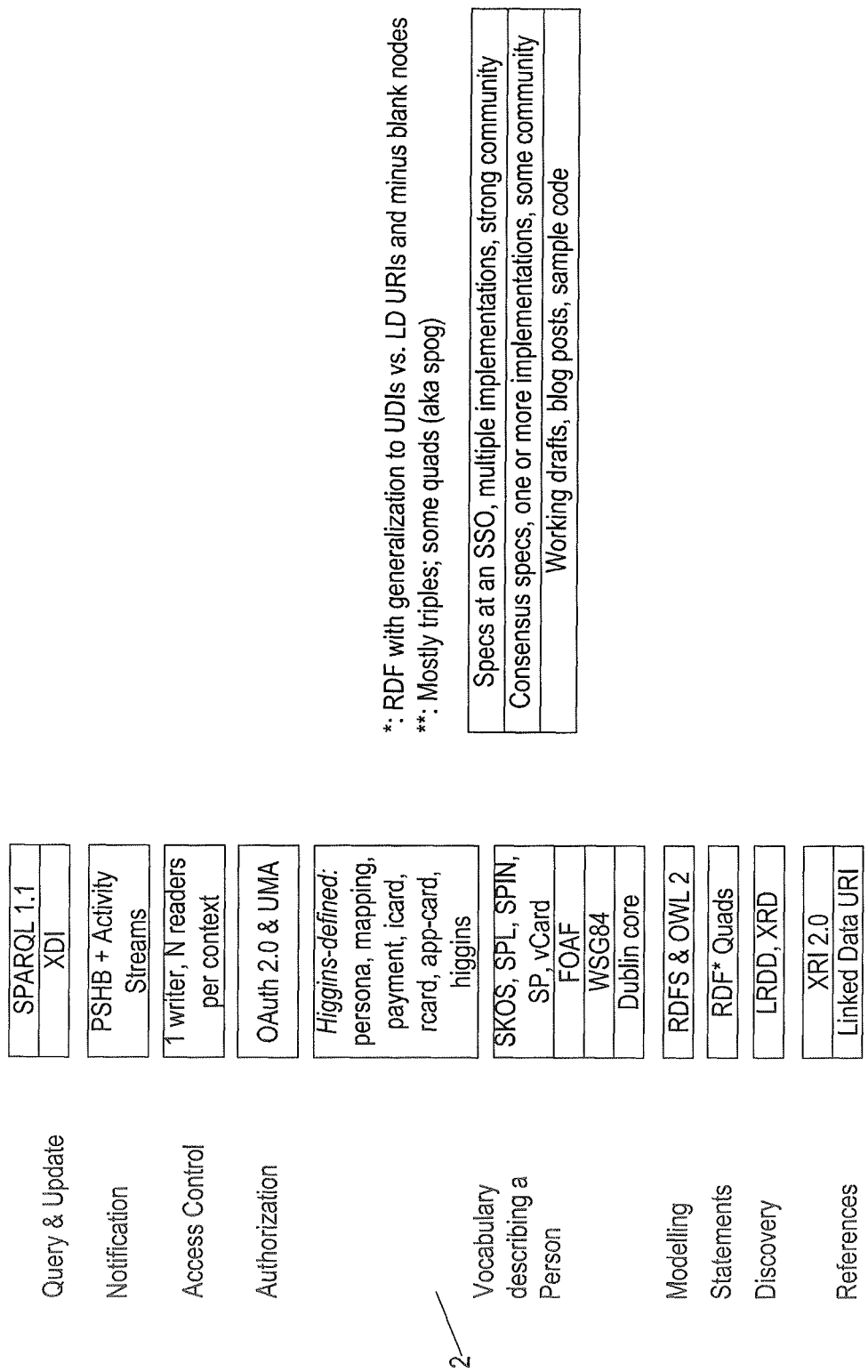

FIG. 15 represents the PDS architecture:

Key:

SSO=Single Sign On|URI=Uniform Resource Identifier

SPARQL=Query Language|XRI=Extensible Resource Identifier

XDI=XRI Data interchange|PSHB=PubSubHubBub messaging notification

OAuth=protected data publishing|UMA=Unlicensed Mobile Access

SKOS=Simple Knowledge Organization System|SPL=Spin Modules Library

FOAF=Friend of a friend RDF schema|WSG84=World Geodetic system

Dublin core=Metadata standard|RDFS=Resource Description Framework Schema

OWL2=Web Ontology Language|LRDD Link Resource Descriptor Discovery

XRD=Extensible Resource Descriptor

ODS—Both the client and server side operational data stores will provide fast and efficient transactional processing and local storage via the data management component. This transactional data will be stored, along with the PDS data in the data warehouse (DW). A Flat File System is used to store and cache all operational data on the client side implementation. This enables event-tracking data to be stored locally on the client to increase processing efficiency and also provide the Neural Network with user profiling data to power the learning objects. A full relational database will store the operational data on the server side. This is separate from the PDS due to the differences between the data generated and needed to run the operational object model being distinct from the personal data model.

DW—The Data Warehouse will consist of a number of data cubes that will contain the measures to map the complex relationships between the PDS and ODS data. This data will be multi-dimensional and be possessed of multi-view states. The DW in conjunction with the ODS will power the ethical data trading engine and Neural Network.

4.4) Tier 4: Network Layer

System 2 will use the TOR network as a secure means of protecting all messaging and browsing. TOR stands for The Onion Router and was originally designed, implemented, and deployed as a third-generation onion routing to project of the U.S. Naval Research Laboratory. It was originally developed with the U.S. Navy in mind, for the primary purpose of protecting government communications. Today, normal people, the military, journalists, law enforcement officers, activists, and many others use it every day for a wide variety of purposes.

TOR Overview

TOR is a network of virtual tunnels that allows people and groups to improve their privacy and security on the Internet. TOR provides the foundation for the System 2 network layer that will allow organizations and individuals to share information over public networks without compromising their privacy.

Individuals use TOR to keep websites from tracking them and their family members, or to connect to news sites, instant messaging services, or the like when their local Internet Service Providers block these. TOR's hidden services let users publish web sites and other services without needing to reveal the location of the site. Individuals also use TOR for socially sensitive communication: chat rooms and web forums for rape and abuse survivors, or people with illnesses.

Journalists use TOR to communicate more safely with whistleblowers and dissidents. Non-governmental organizations (NGOs) use TOR to allow their workers to connect to their home website while they're in a foreign country, without notifying everybody nearby that they're working with that organization.

Groups such as indymedia recommend TOR for safeguarding their members' online privacy and security. Activist groups like the Electronic Frontier Foundation (EFF) recommend TOR as a mechanism for maintaining civil liberties online. Corporations use TOR as a safe way to conduct competitive analysis, and to protect sensitive procurement patterns from eavesdroppers.

A branch of the US Navy uses TOR for open source intelligence gathering, and one of its teams used TOR while deployed in the Middle East recently. Law enforcement uses TOR for visiting or surveilling web sites without leaving government IP addresses in their web logs, and for security during sting operations. The variety of people who use TOR is actually part of what makes it so secure. TOR hides you among the other users on the network, so the more populous and diverse the user base for TOR is, the more your anonymity wilt be protected.

Using TOR protects you against a common form of Internet surveillance known as "traffic analysis." Traffic analysis can be used to infer who is talking to whom over a public network. Knowing the source and destination of your Internet traffic allows others to track your behavior and interests. This can impact your checkbook if, for example, an e-commerce site uses price discrimination based on your country or institution of origin, it can even threaten your job and physical safety by revealing who and where you are. For example, if you're traveling abroad and you connect to your employer's computers to check or send mail, you can inadvertently reveal your national origin and professional affiliation to anyone observing the network, even if the connection is encrypted.

A basic problem for the privacy minded is that the recipient of your communications can see that you sent it by looking at headers. It can authorize intermediaries like Internet service providers, and sometimes-unauthorized intermediaries as well. A very simple form of traffic analysis might involve sitting somewhere between sender and recipient on the network, looking at headers. But there are also more powerful kinds of traffic analysis. Some attackers spy on multiple parts of the Internet and use sophisticated statistical techniques to track the communications patterns of many different organizations and individuals. Encryption does not help against these attackers, since it only hides the content of Internet traffic, not the headers. The solution: a distributed, anonymous network such as TOR.

Tier 5—security layer. The five pillars that represent the security layer are as follows:
Cryptography: Advanced Encryption Standard (AES)
DeleGate: Multi-purpose application level gateway
SOCKS 5: Internet protocol that facilitates the routing of network packets between client—server applications via a proxy server.
SAML2: Security Assertion Markup Language
Polipo: Proxy Server
Cryptography:

In cryptography, the Advanced Encryption Standard (AES) is a symmetric-key encryption standard adopted by the U.S. government. The standard comprises three block ciphers, AES-128, AES-192 and AES-256, adopted from a larger collection originally published as Rijndael. Each of these ciphers has a 128-bit block size, with key sizes of 128, 192 and 256 bits, respectively. The AES ciphers have been analyzed extensively and are now used worldwide, as was the case with its predecessor, the Data Encryption Standard (DES).

AES was announced by National Institute of Standards and Technology (NIST) as U.S. APS PUB 197 (FIPS 197) on Nov. 26, 2001 after a five-year standardization process in which fifteen competing designs were presented and evaluated before Rijndael was selected as the most suitable (see Advanced Encryption Standard process for more details). It became effective as a Federal government standard on May 26, 2002 after approval by the Secretary of Commerce. It is available in different encryption packages. AES is the first publicly accessible and open cipher approved by the National Security Agency (NSA) for top-secret information.

Description of the cipher:

AES is based on a design principle known as a Substitution permutation network. It is fast in both software and hardware. Unlike its predecessor, DES, AES does not use a Feistel network. AES has a fixed block size of 128 bits and a key size of 128, 192, or 256 bits, whereas Rijndael can be specified with block and key sizes in any multiple of 32 bits, with a minimum of 128 bits. The block size has a maximum of 256 bits, but the key size has no theoretical maximum.

AES operates on a 4×4 matrix of bytes, termed the state (versions of Rijndael with a larger block size have additional columns in the state). Most AES calculations are done in a special finite field. The implementation of AES in the architecture adds a further level of security at sender and recipient level communication with a full 256 bit cipher being used.

Protected Content:

An AES/PDS token will be applied within a content wrapper to encrypt all content downloaded while using System 2. This will work in the same manner as any proprietary application based document extension in the sense that unless the user has System 2 installed and the unique user profile Token Key applied; they will not be able to view the content. This will be available from the beta release.

DeleGate:

DeleGate is a multi-purpose application level gateway, which runs on multiple platforms (Unix, Windows, Mac OS X and OS/2). DeleGate mediates communication of various protocols (HTTP, FTP, NNTP, SMTP, POP, IMAP, LDAP, Telnet, SOCKS, DNS, etc.), applying cache and conversion for mediated data, controlling access from clients and routing toward servers. It translates protocols between clients and servers, applying SSL (TLS) to arbitrary protocols, converting between IPv4 and IPv6, merging several servers into a single server view with aliasing and filtering. DeleGate represents the handshaking protocol between the application, data and network layers to harden the transmission of the messaging.

SOCKS 5:

SOCKS is an Internet protocol that facilitates the routing of network packets between client—server applications via a proxy server. SOCKS performs at Layer 5 of the OSI model the session layer (an intermediate layer between the presentation layer and the transport layer). Port 1080 is the registered port designated for the SOCKS server. The SOCKS 5 protocol is an extension of the SOCKS 4 protocol that is defined in RFC 1928. It offers more choices of authentication, adds support for IPv6 and UDP that can be used for DNS lookups. SOCKS 5 enables the Polipo proxy to communicate with the Tor network.

SAM L2:

Security Assertion Markup Language 2.0 (SAML 2.0) is a version of the SAML OASIS standard for exchanging authentication and authorization data between security domains. SAML 2.0 is an XML-based protocol that uses security tokens containing assertions to pass information about a principal (usually an end-user) between an identity provider and a web service. SAML 2.0 enables web-based authentication and authorization scenarios including single sign-on (SSO). The usage of SAML2 will enable enhanced security between data and application layers.

Polipo Proxy Server:

Polipo is a fast and lightweight, forwarding and caching proxy server and computer software daemon. By virtue of being a compliant HTTP 1.1 proxy, Polipo has all the uses of traditional web proxies. It features HTTP 1.1, IPv4 & IPv6, traffic filtering and privacy-enhancement. Polipo supports HTTP 1.1 pipelining and simulating multiplexing by interleaving multiple segments to reduce communication latency. Polipo will protect all communication throughout the users browsing and messaging usage of System 2 by cloaking the data at the transport layer.

Figure 16:
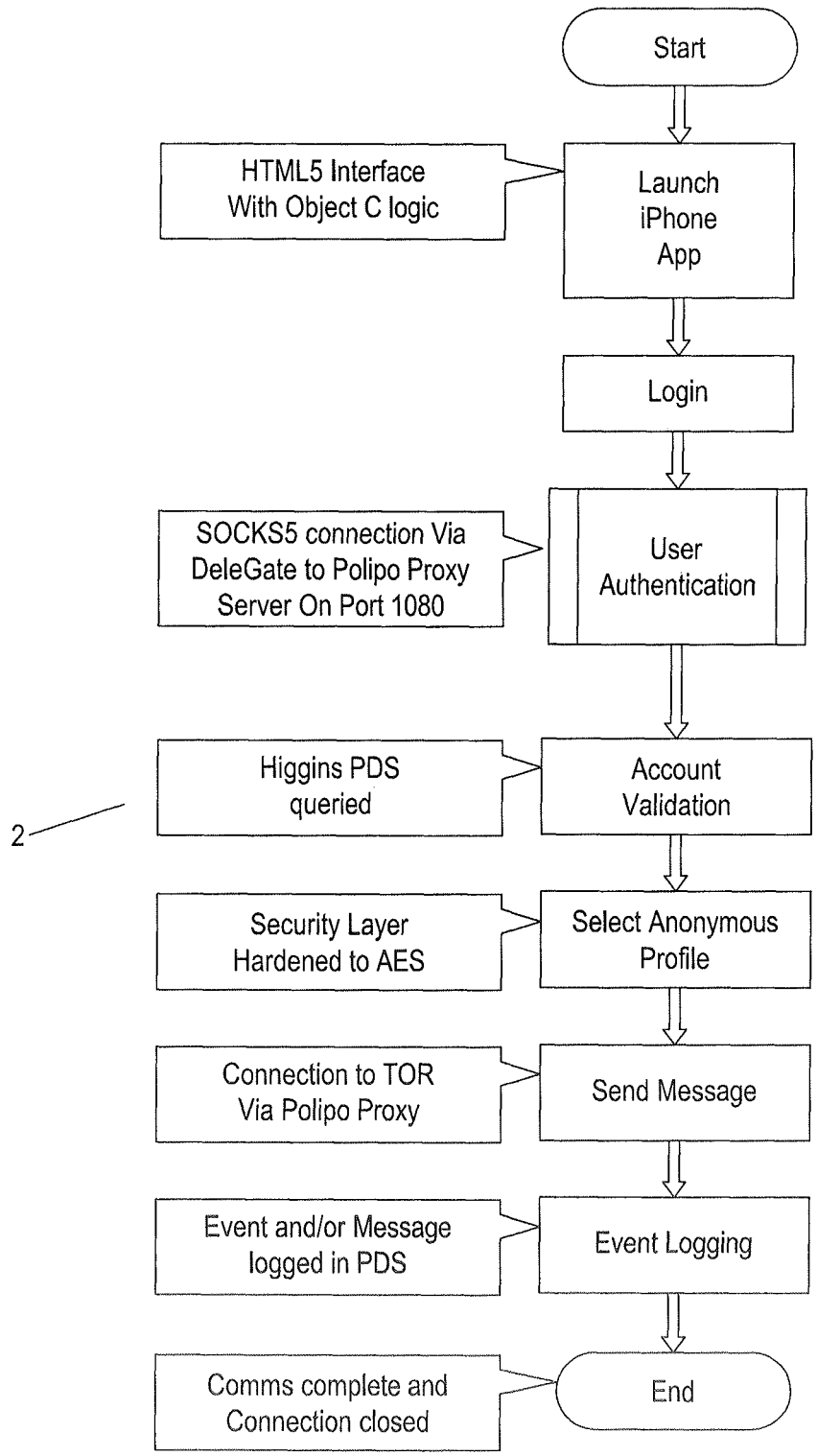
Figure 17:
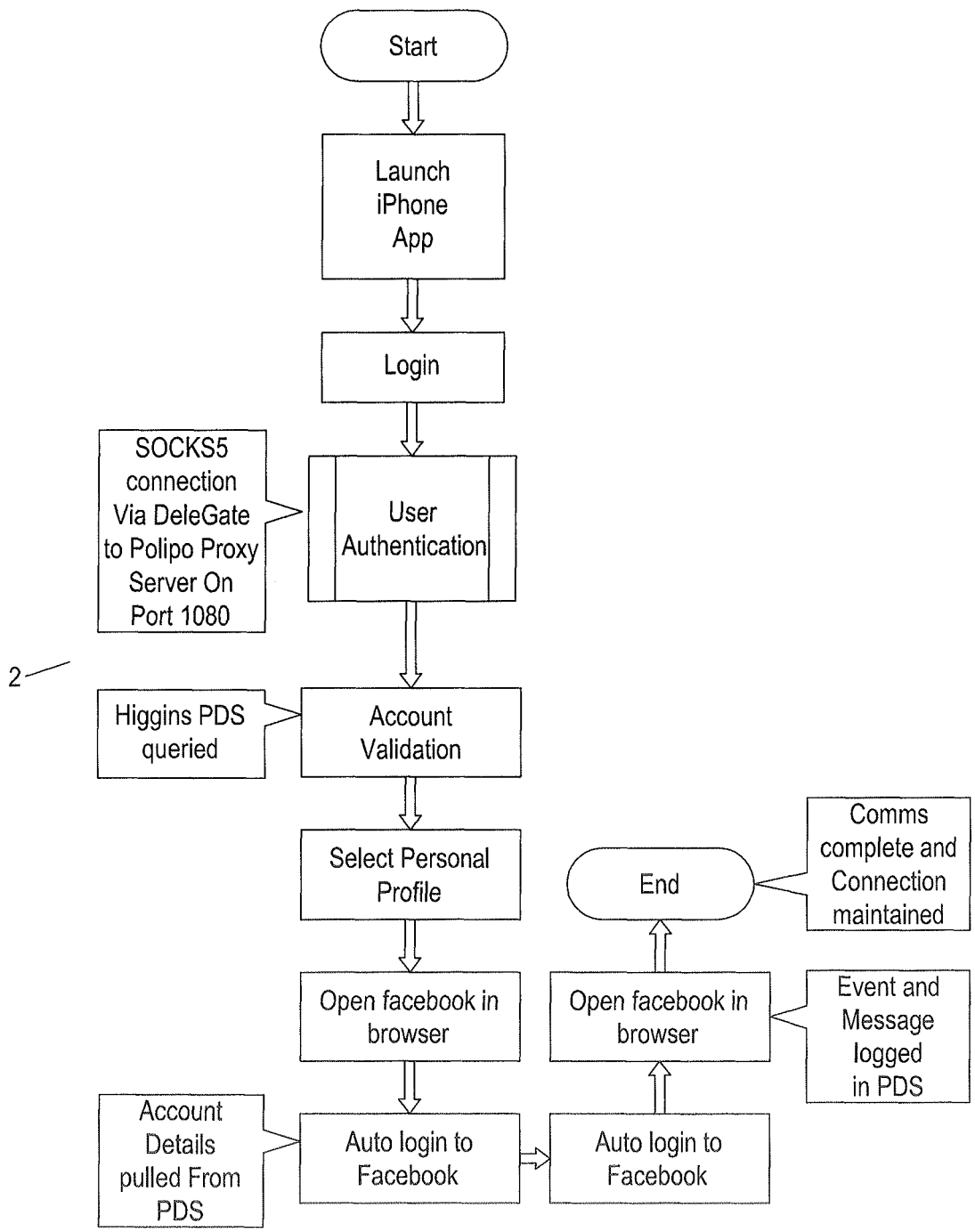
Figure 18:
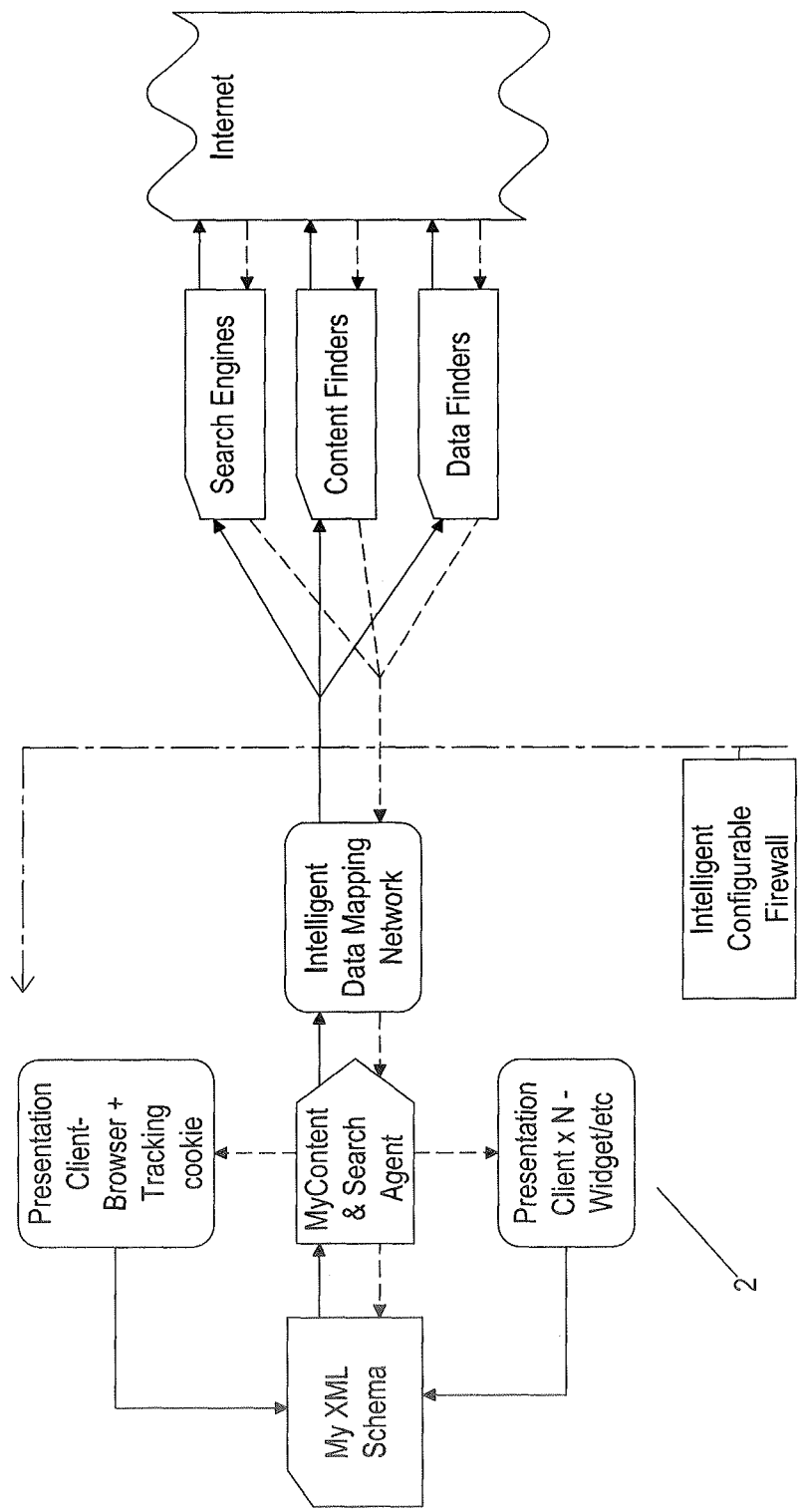
Figure 19:
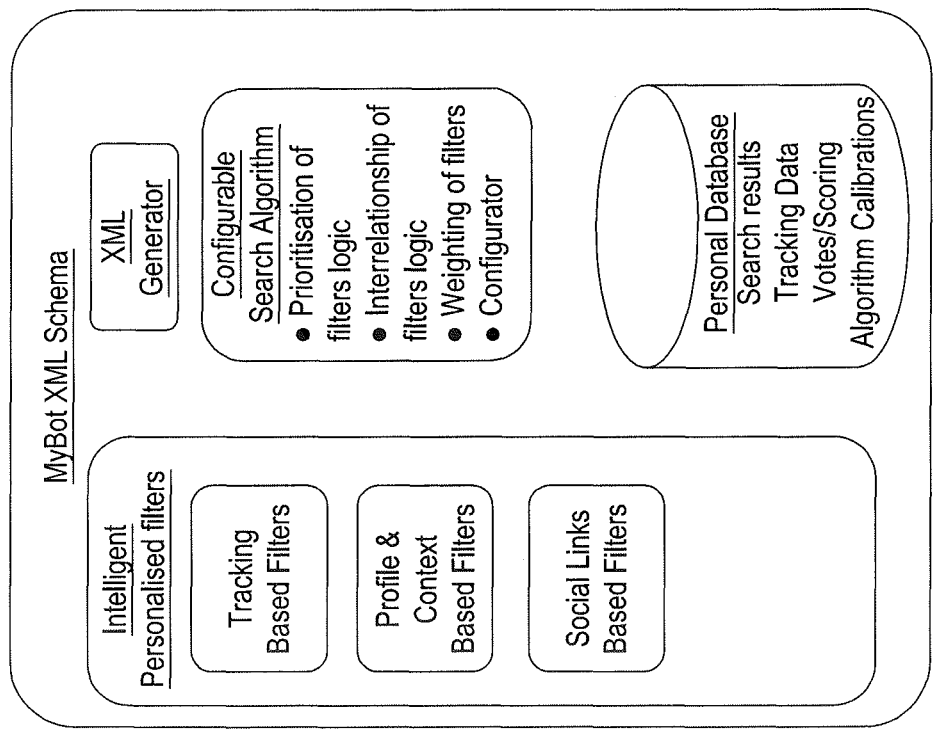
Figure 21:
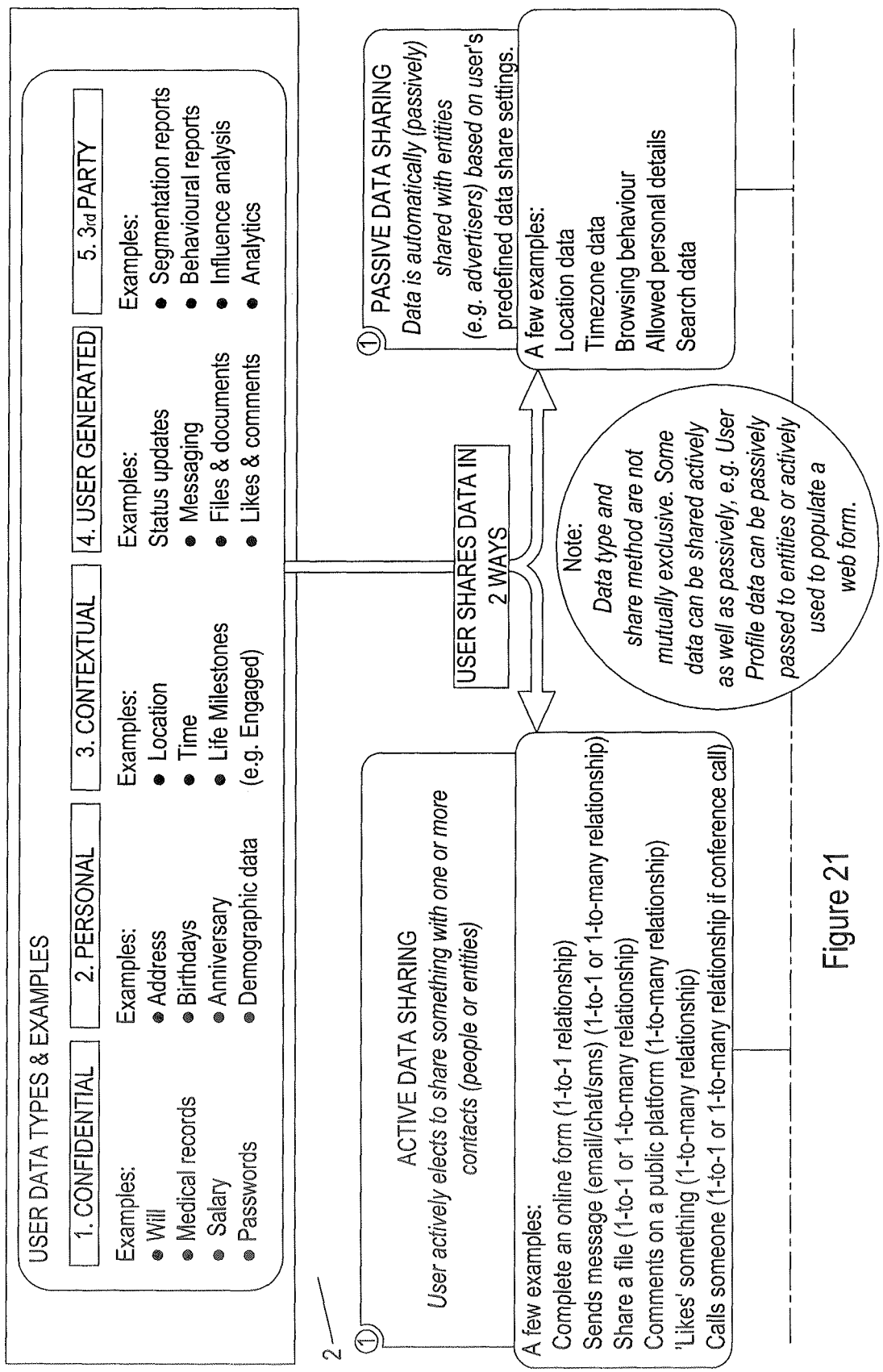
Figure 21:
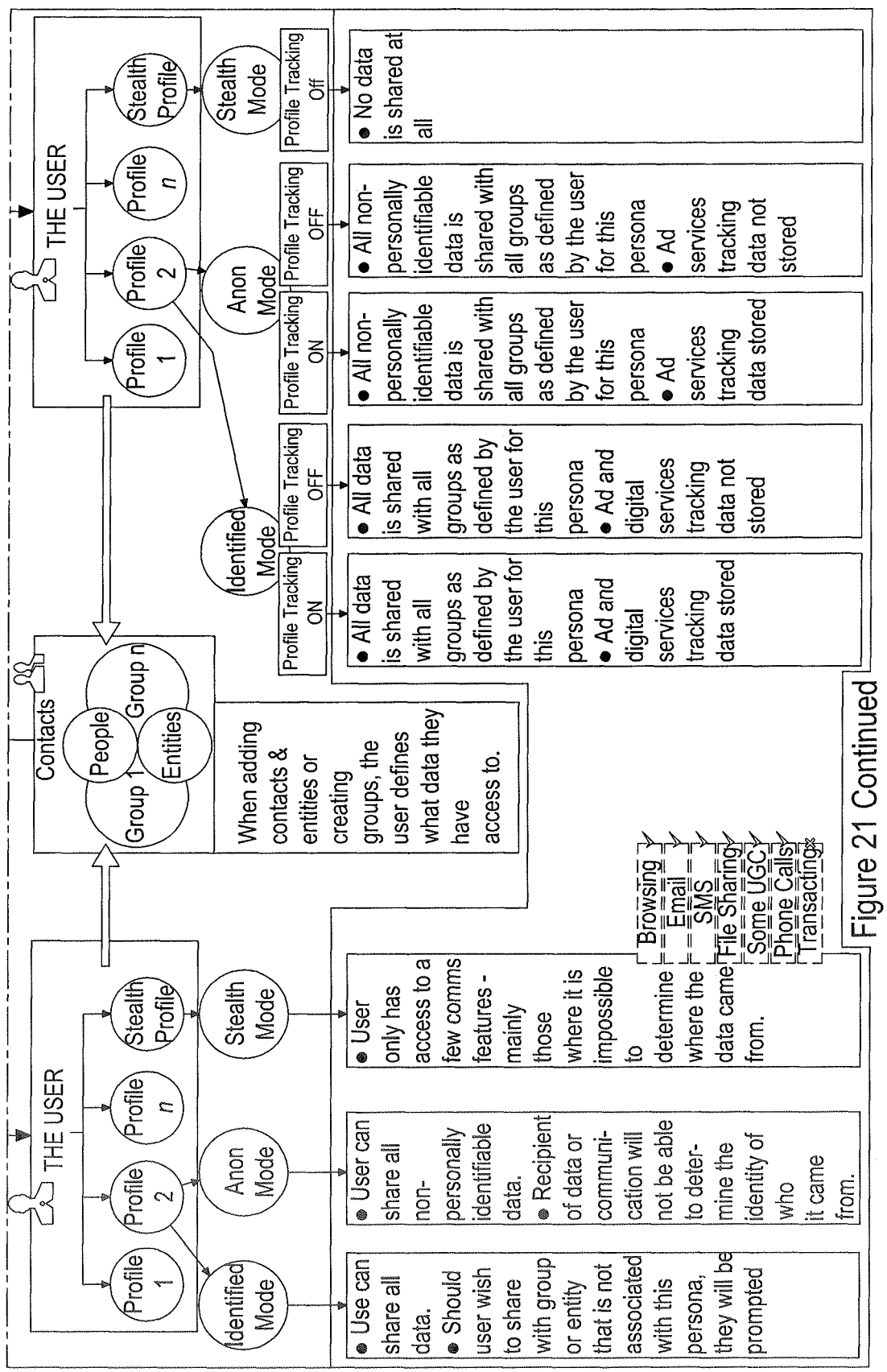
Figure 22:
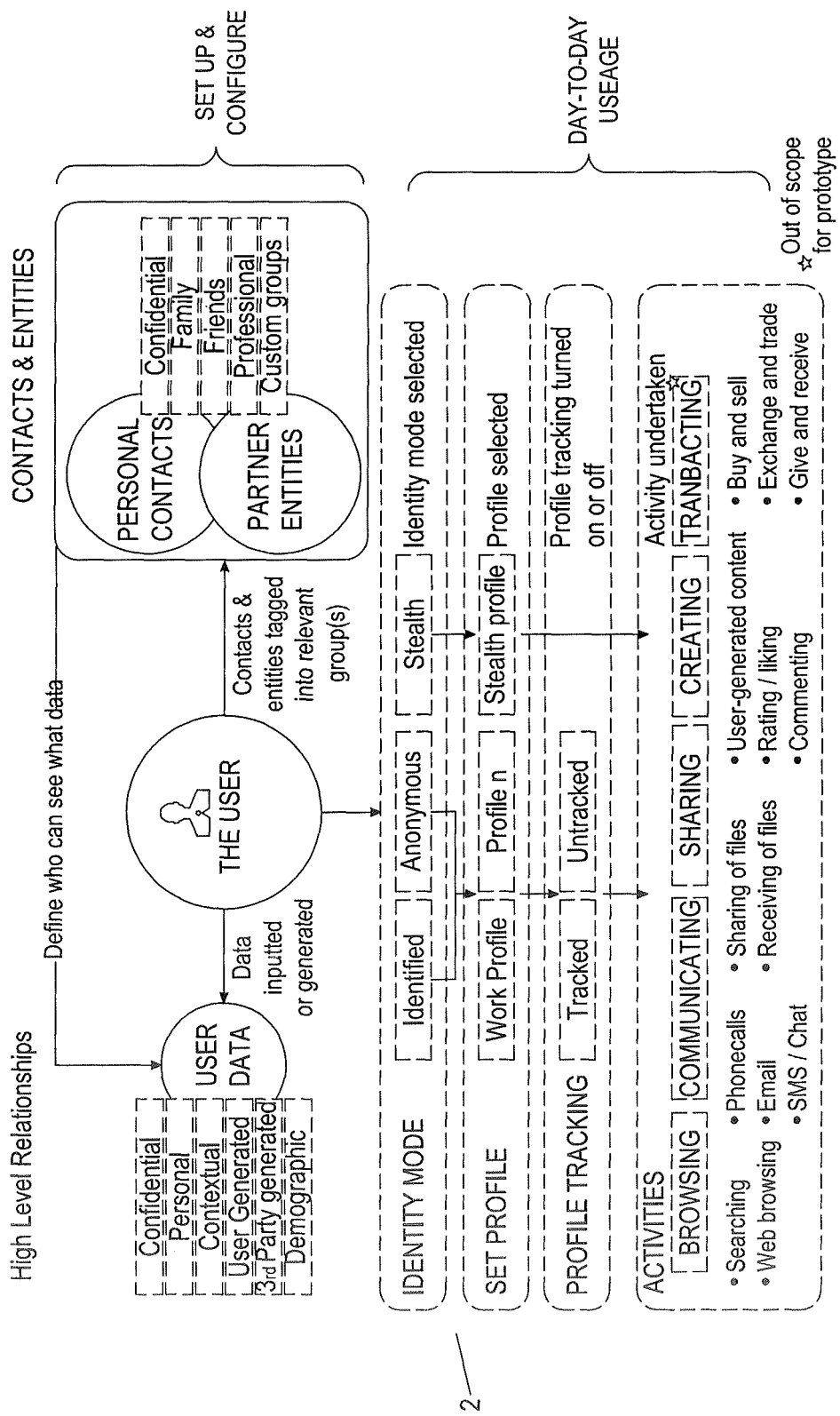
Figure 23:
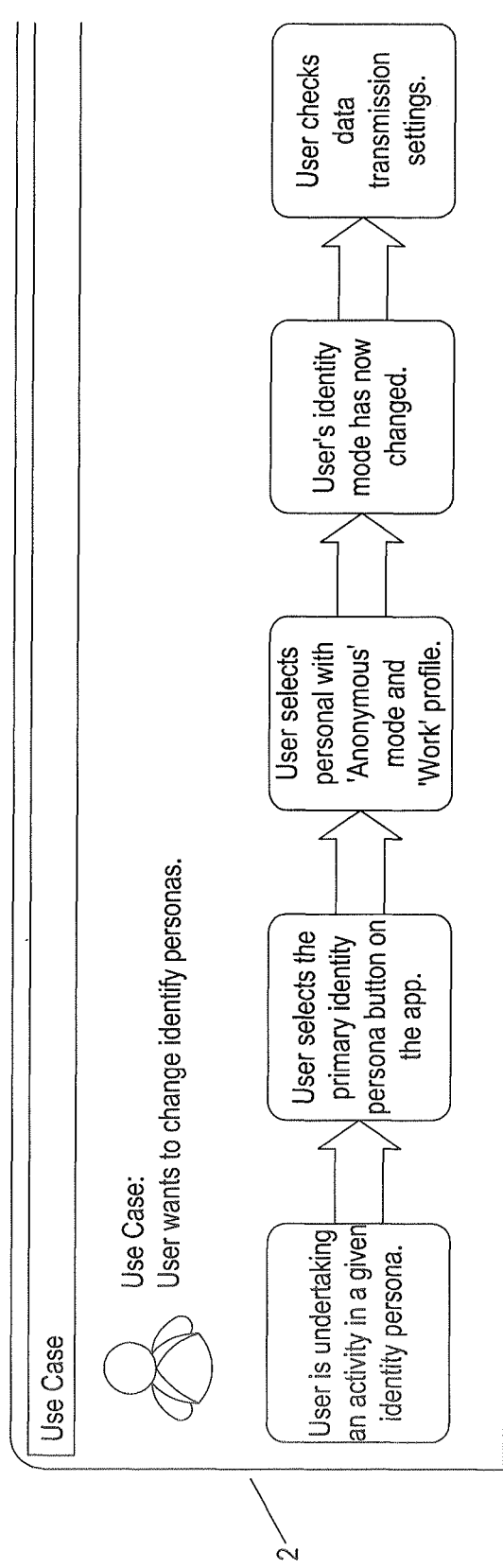
Figure 24:
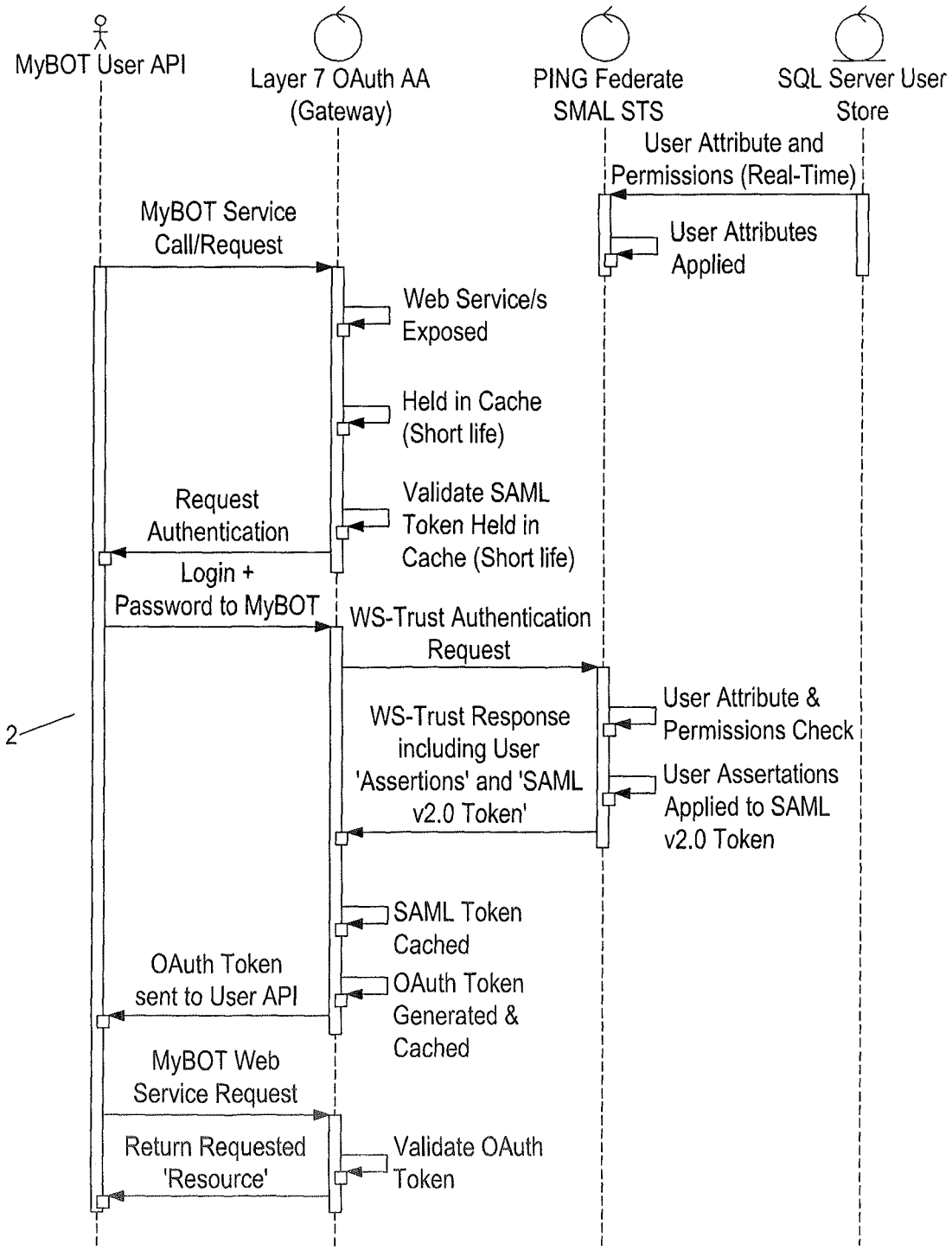
Figure 25:
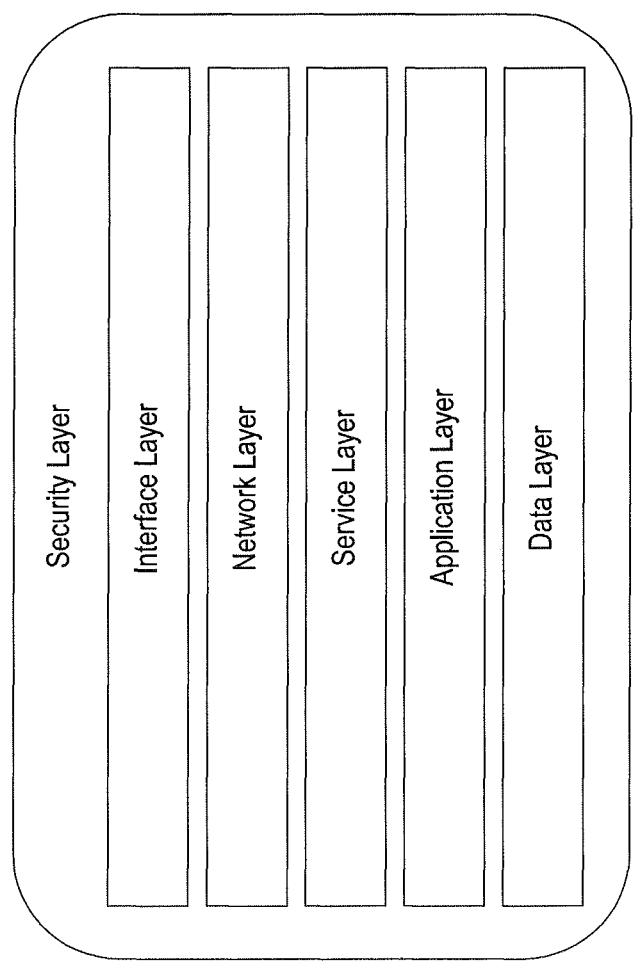
Figure 26:
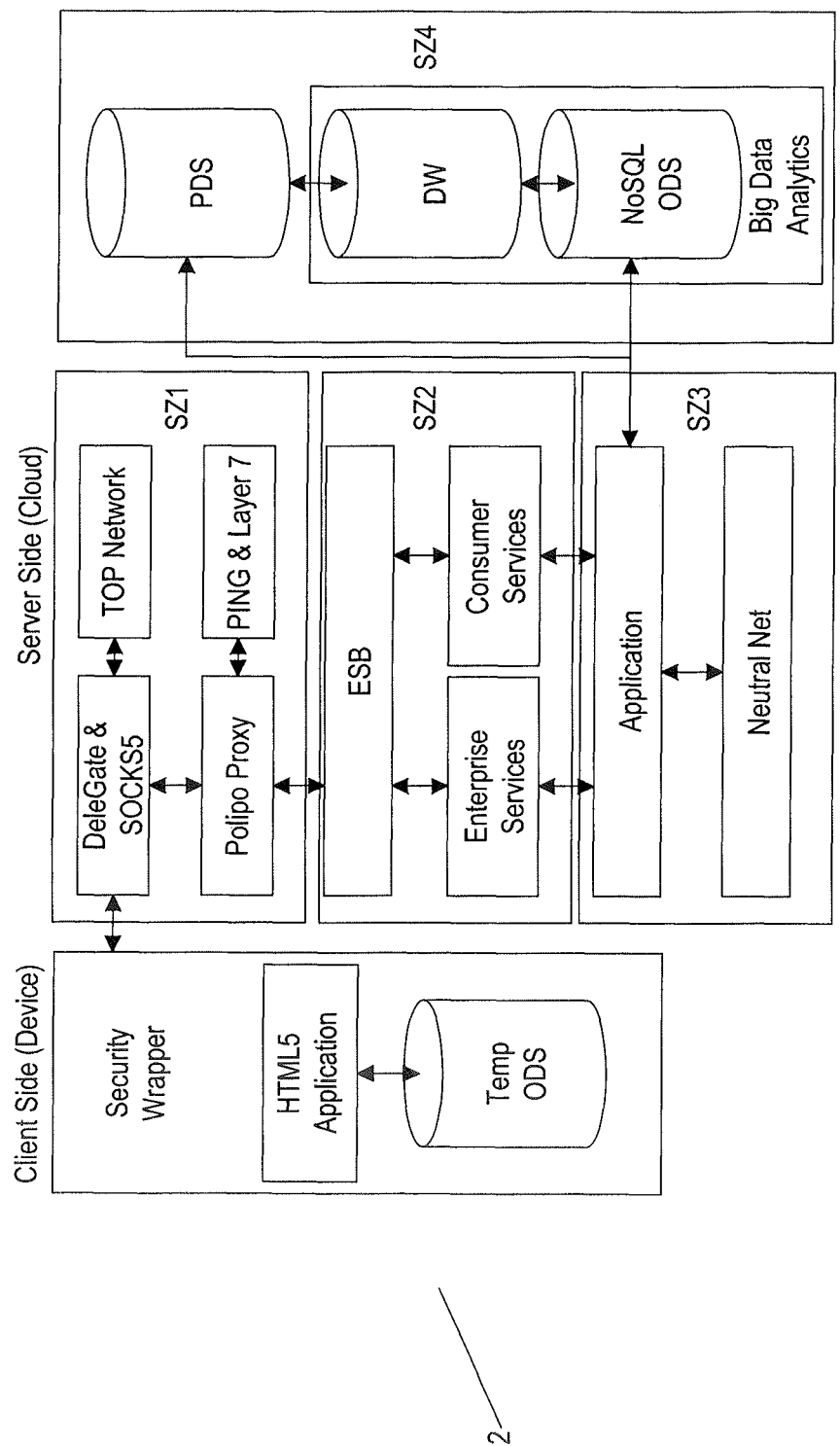
Figure 27:
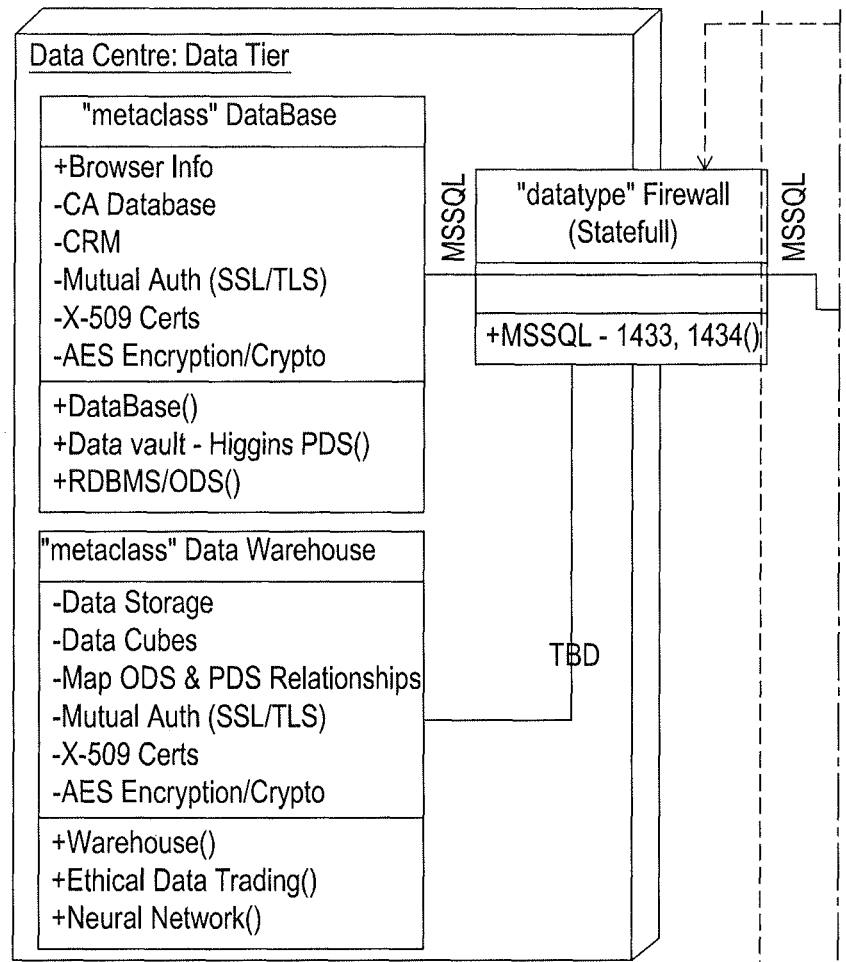
Figure 27:
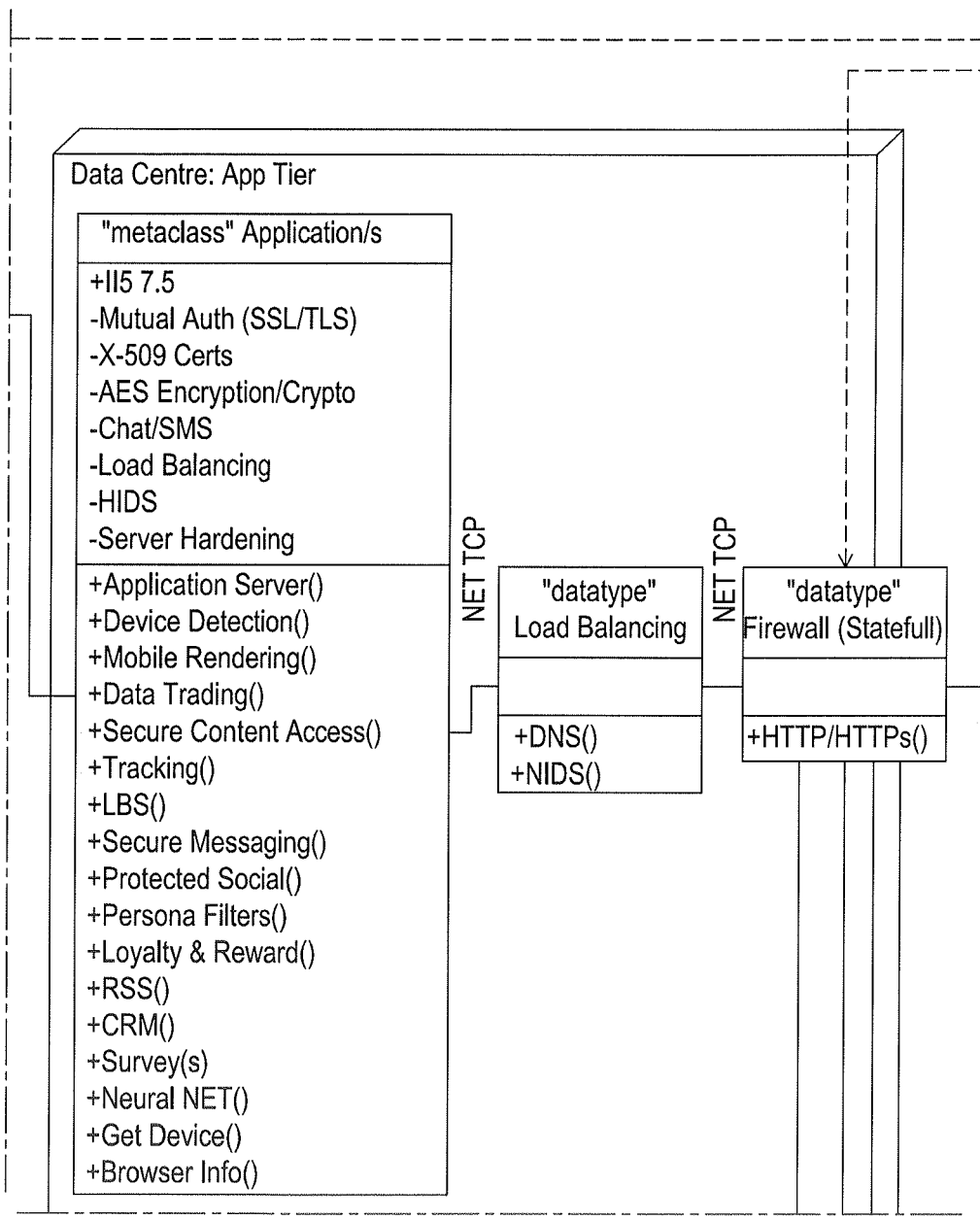
Figure 27:
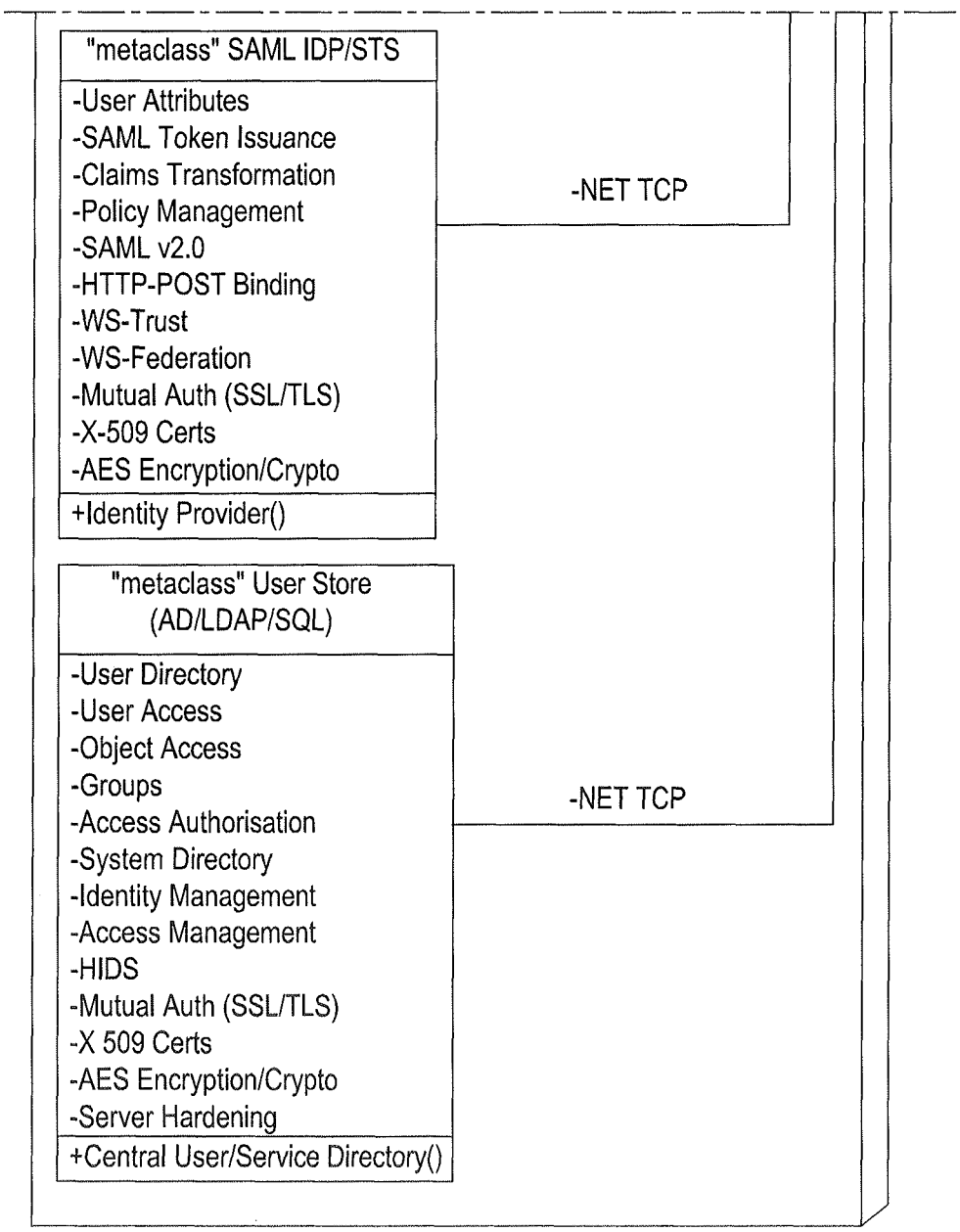
Figure 27:
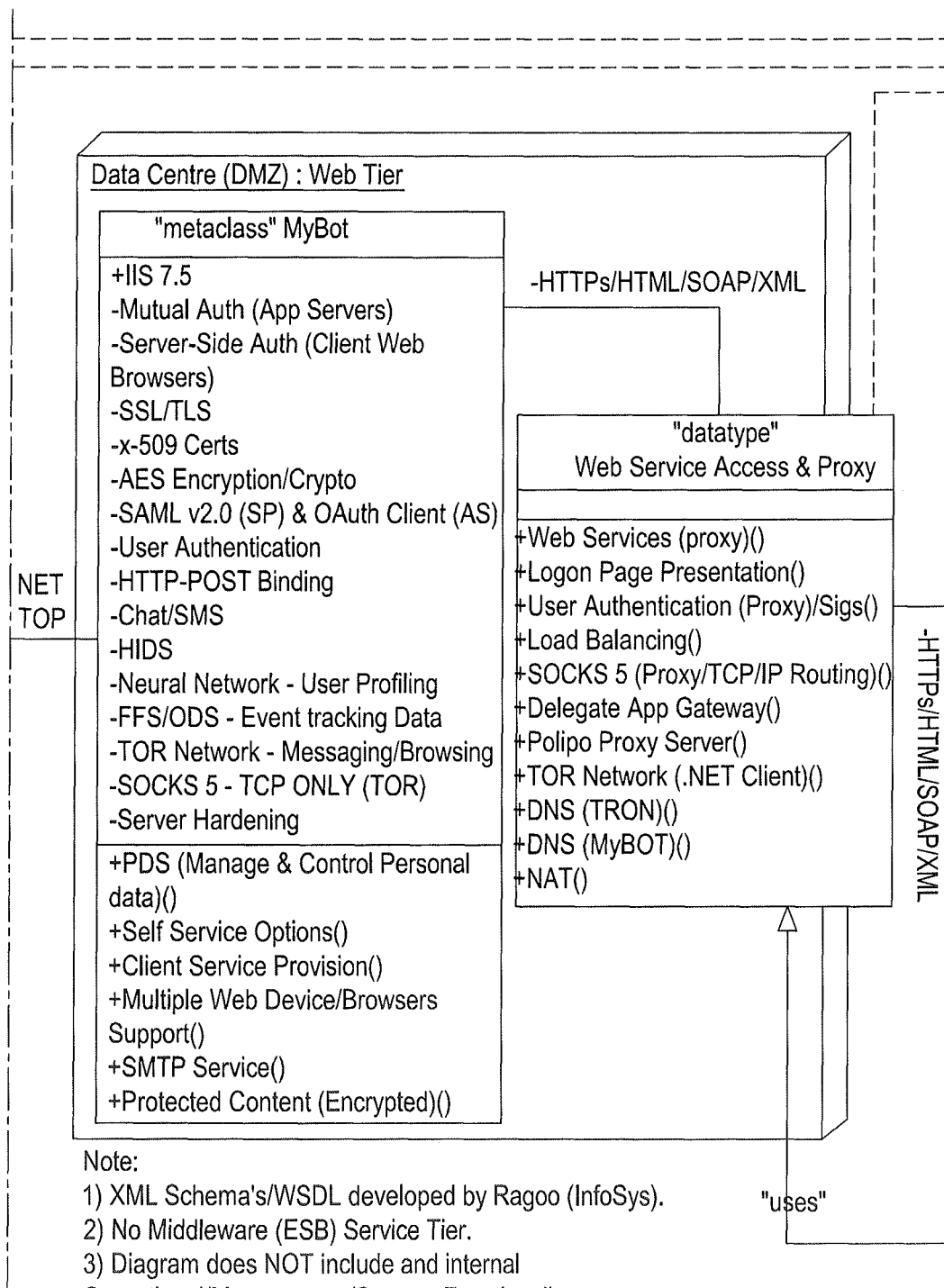
Figure 27:
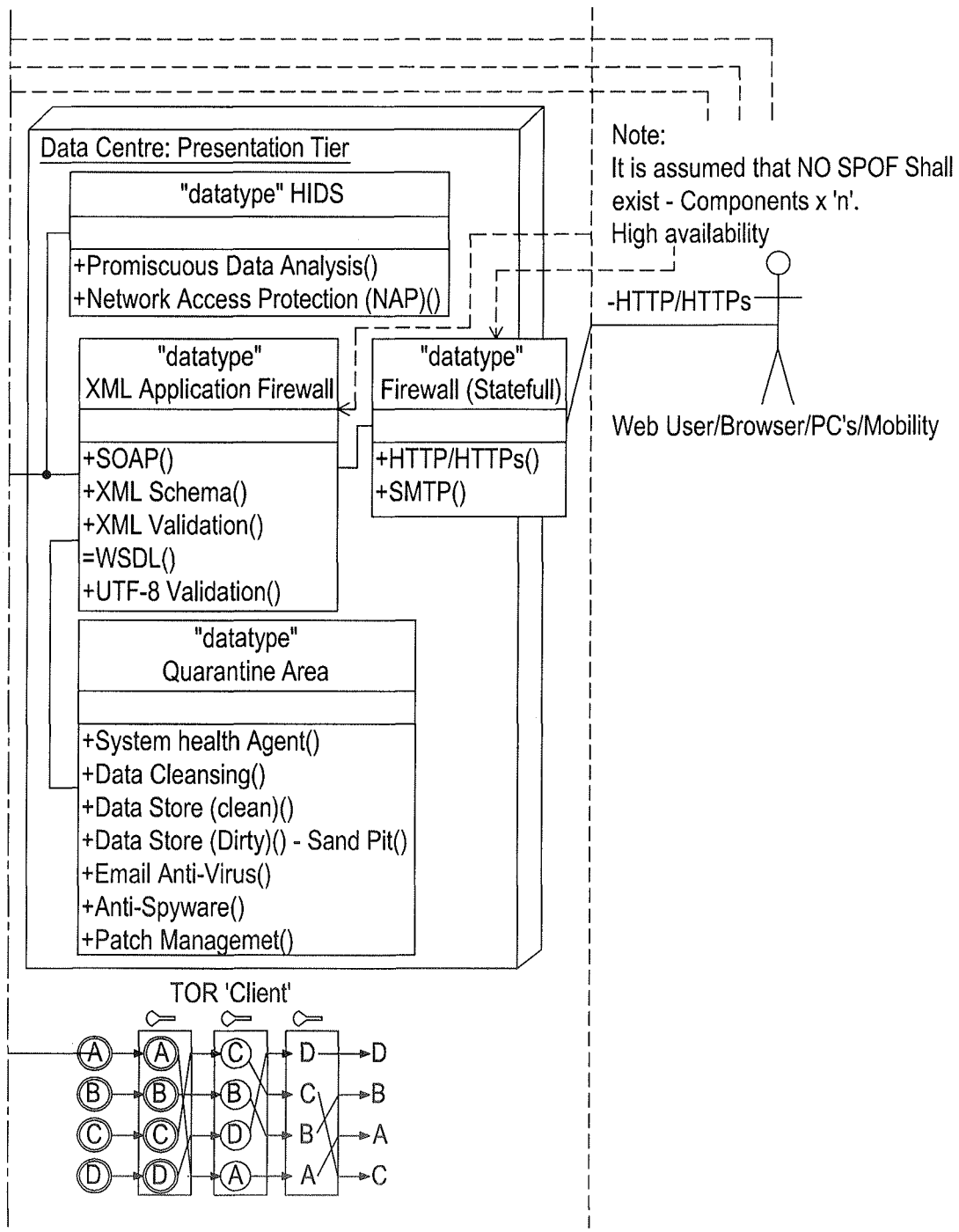
Figure 28:
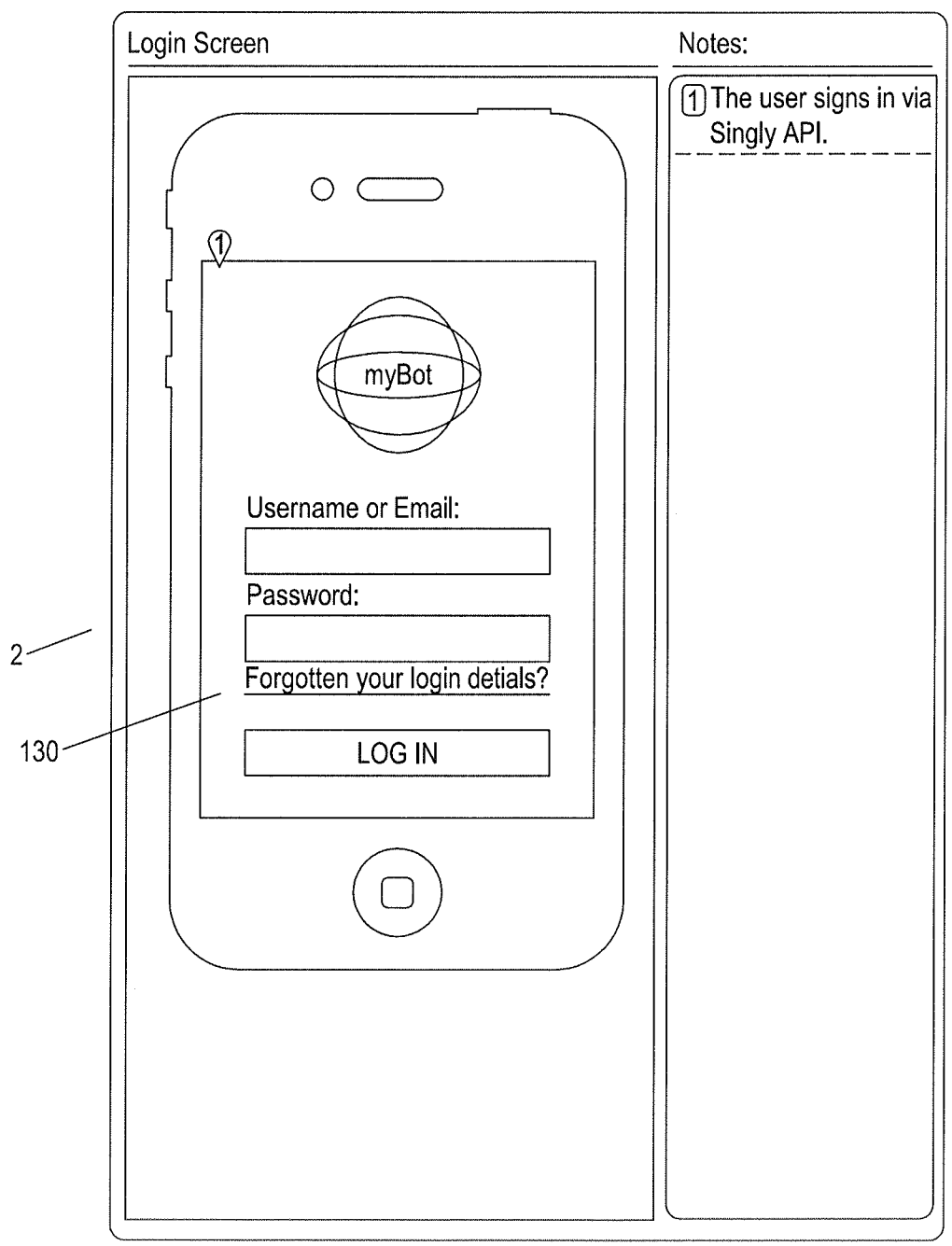
Figure 29:
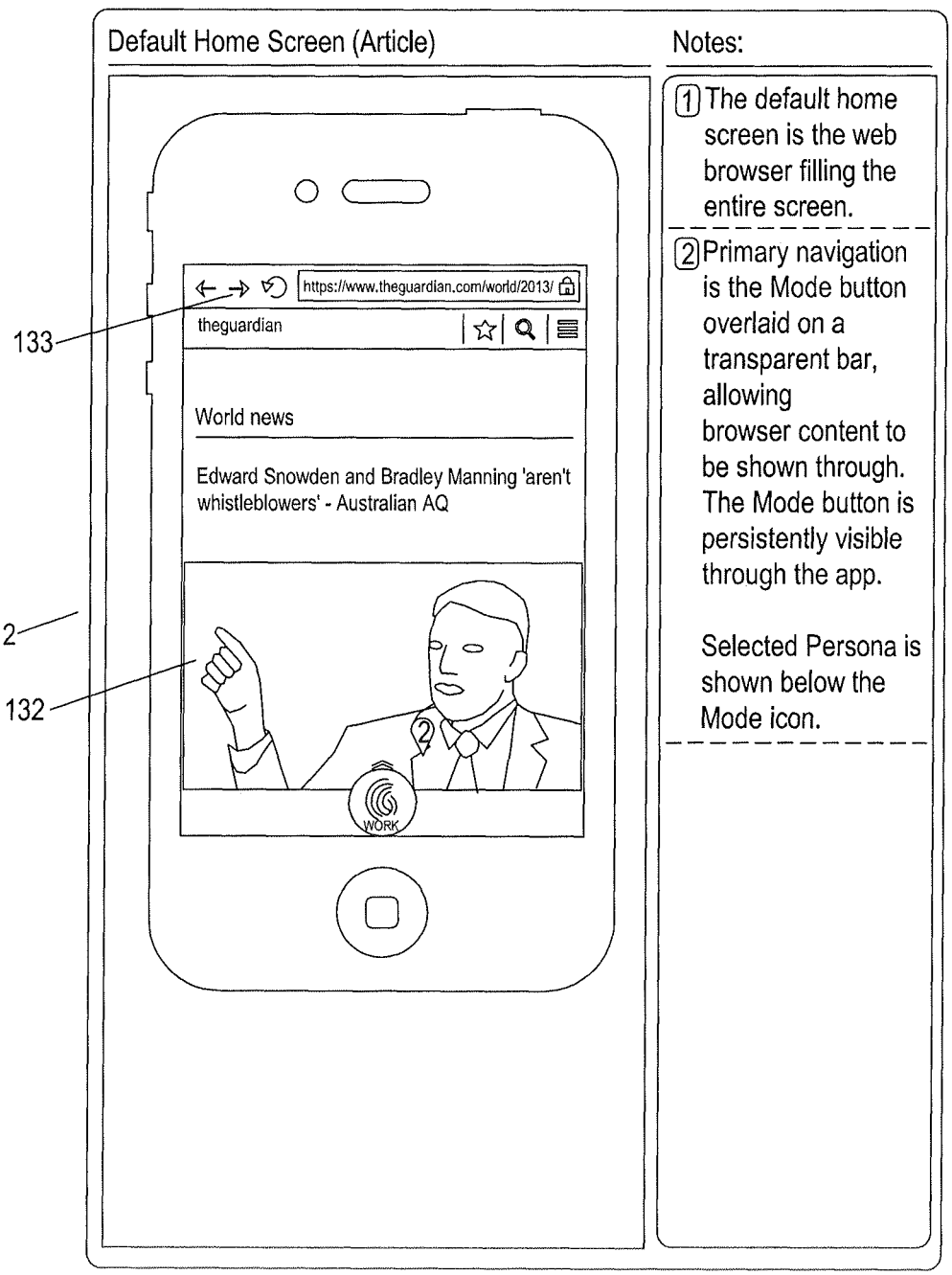
Figure 30:
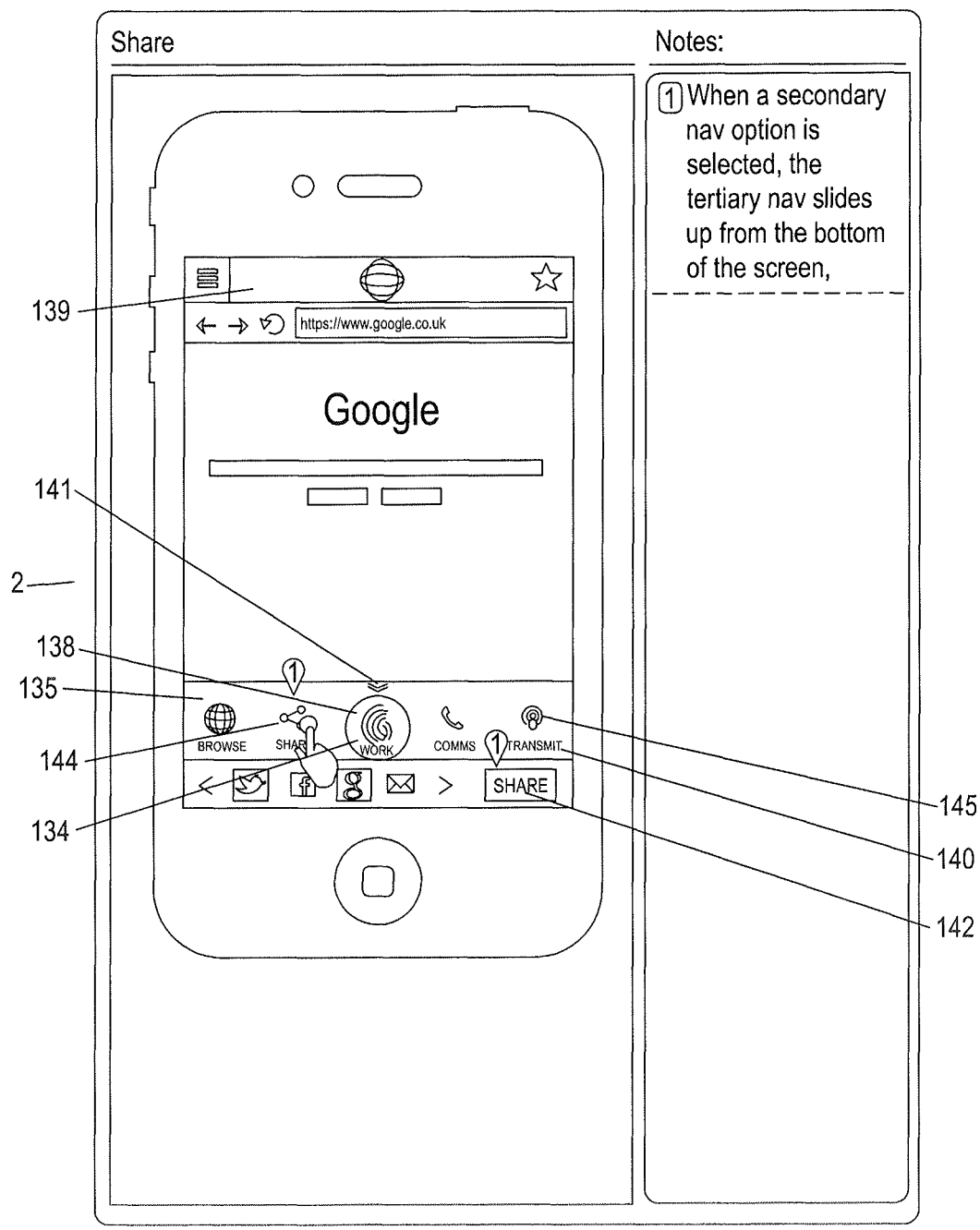
Figure 31:
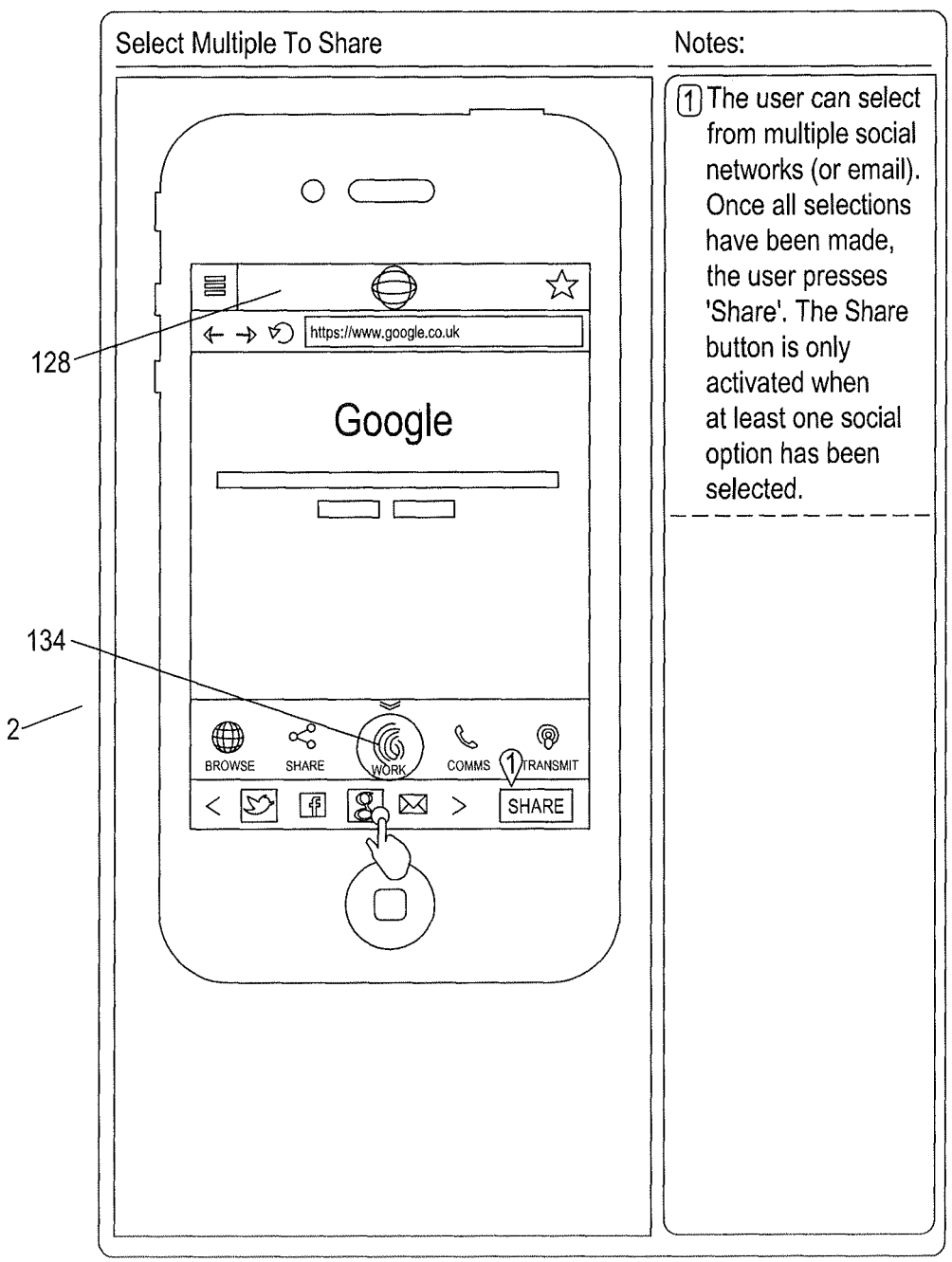
Figure 32:
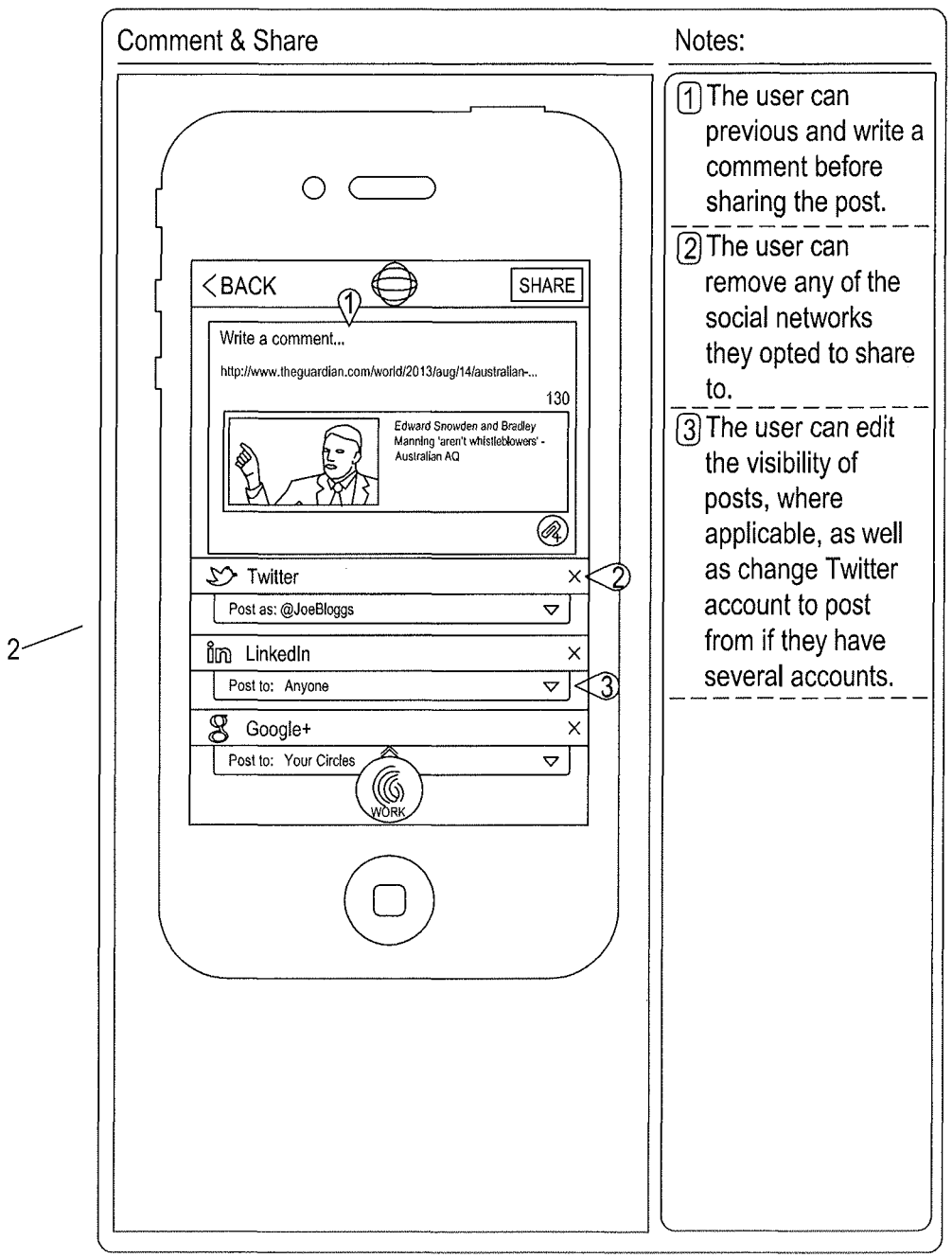
Figure 33:
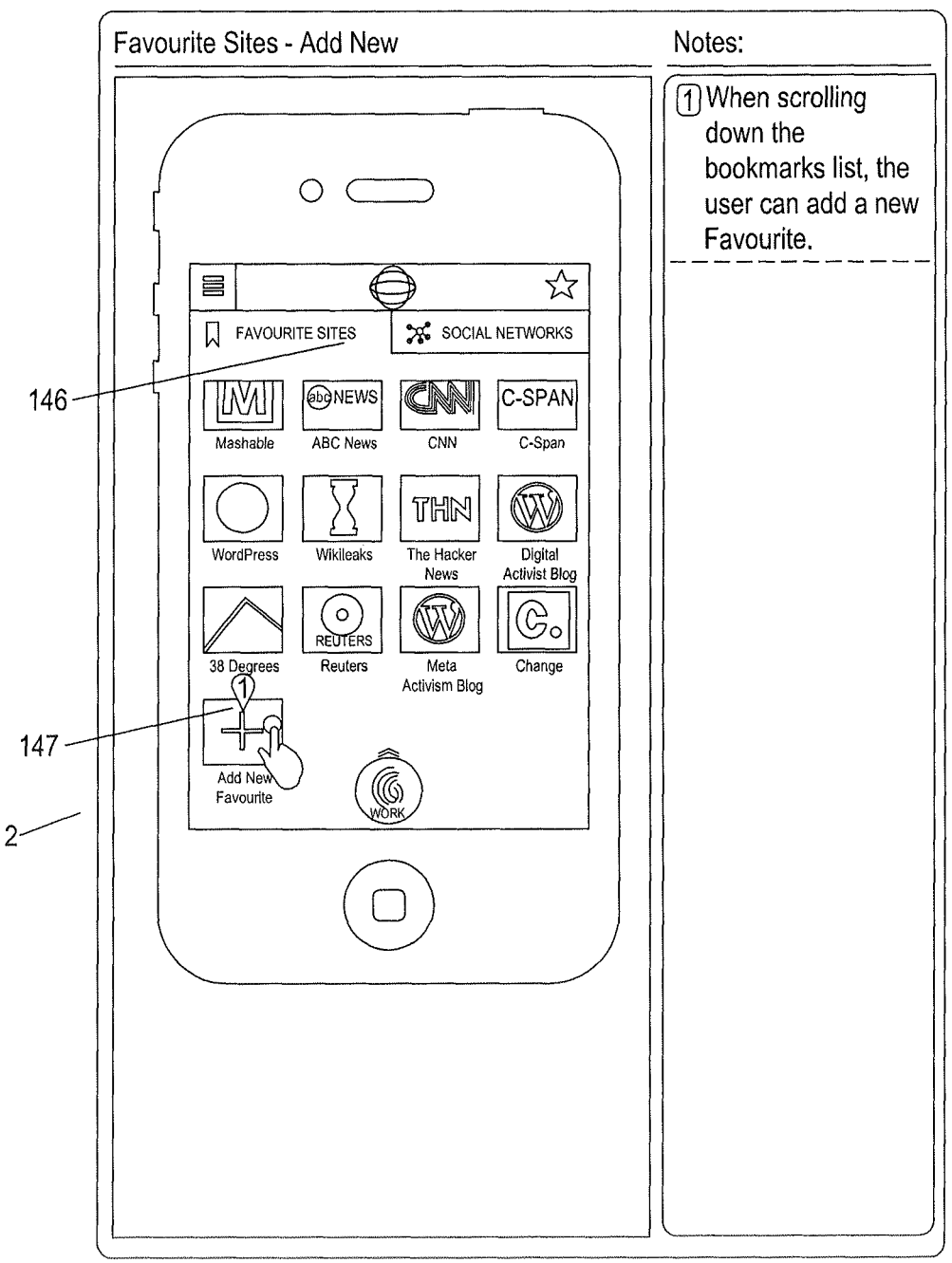
Figure 34:
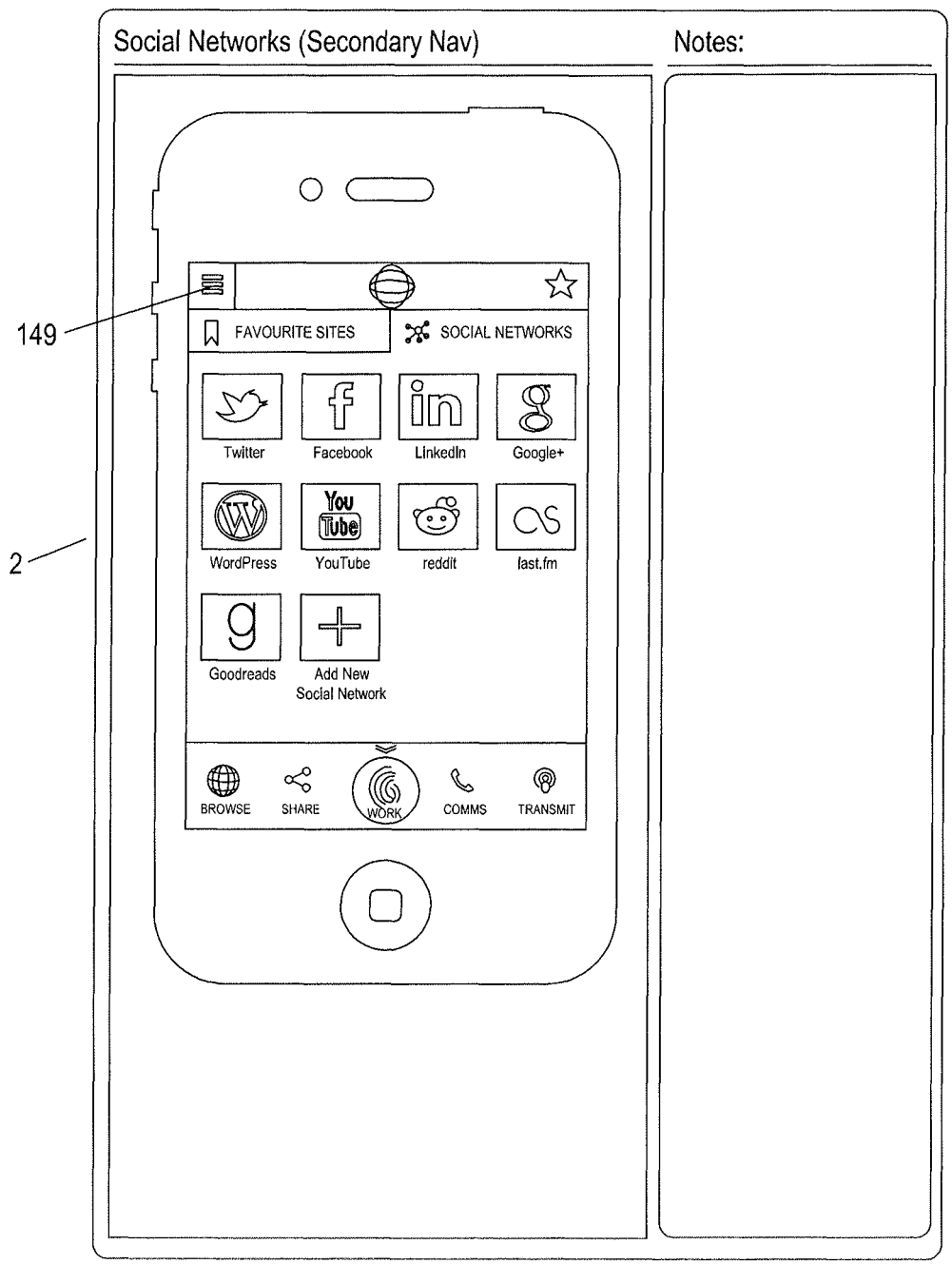
Figure 35:
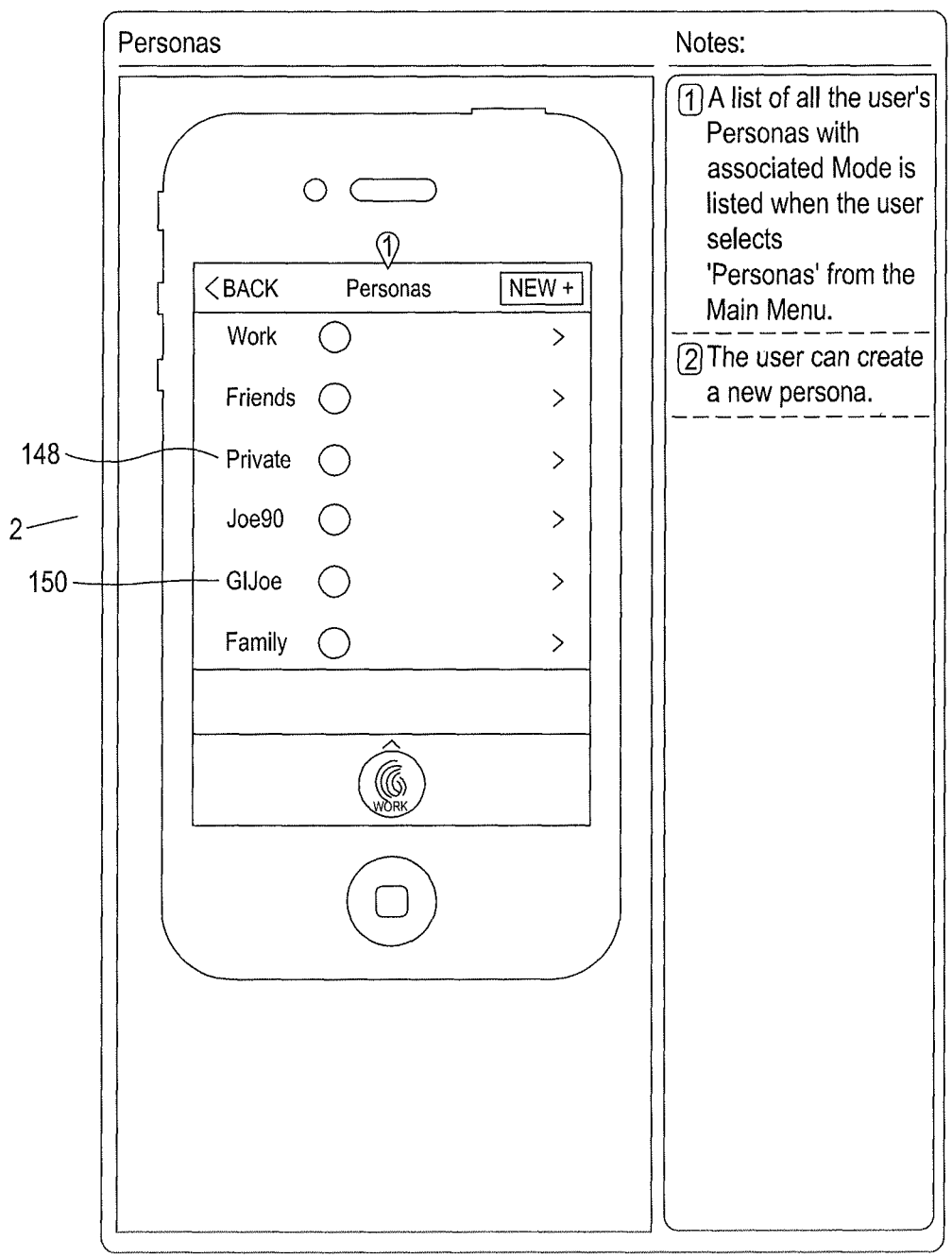
Figure 36:
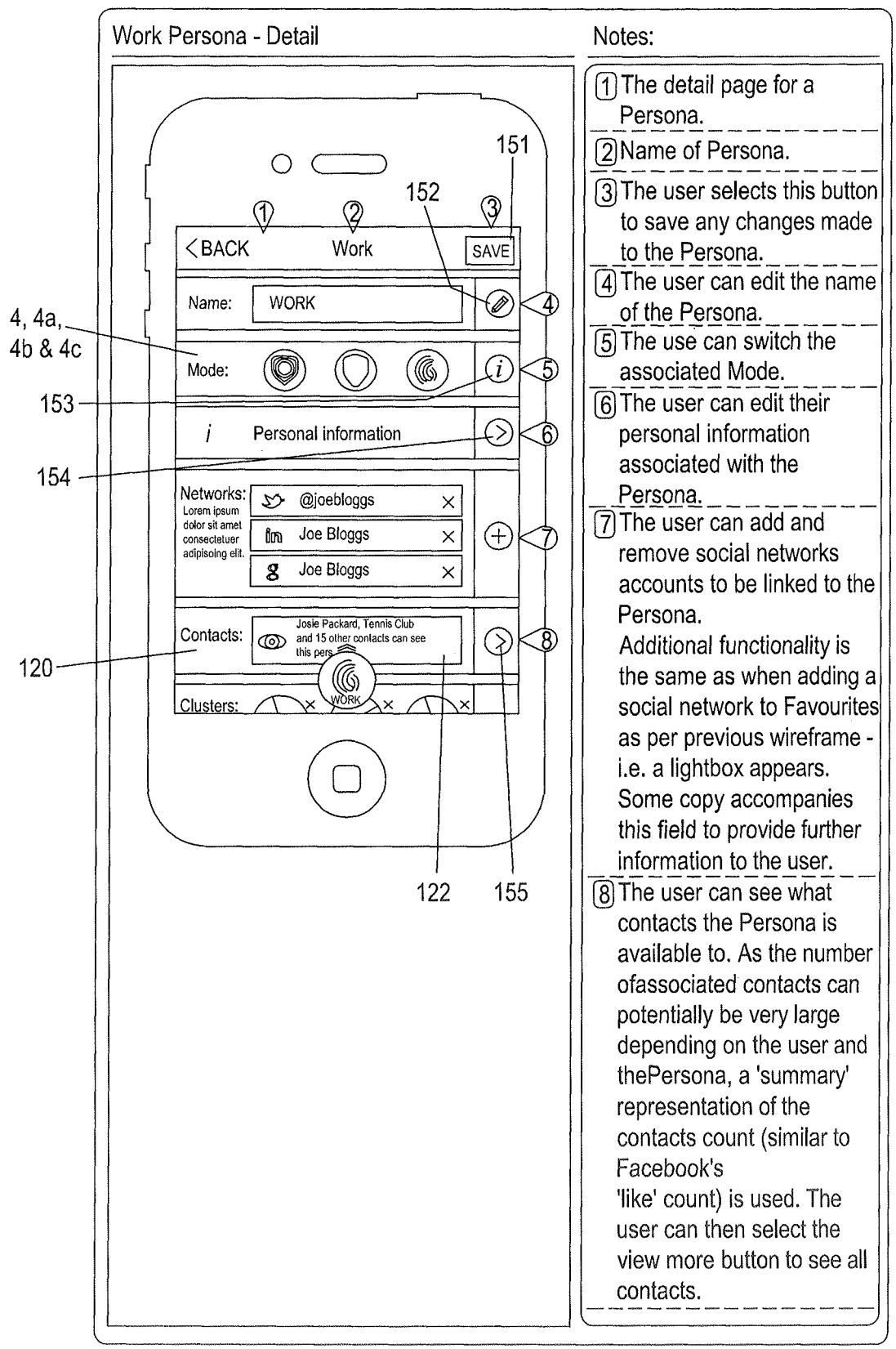
Figure 37:
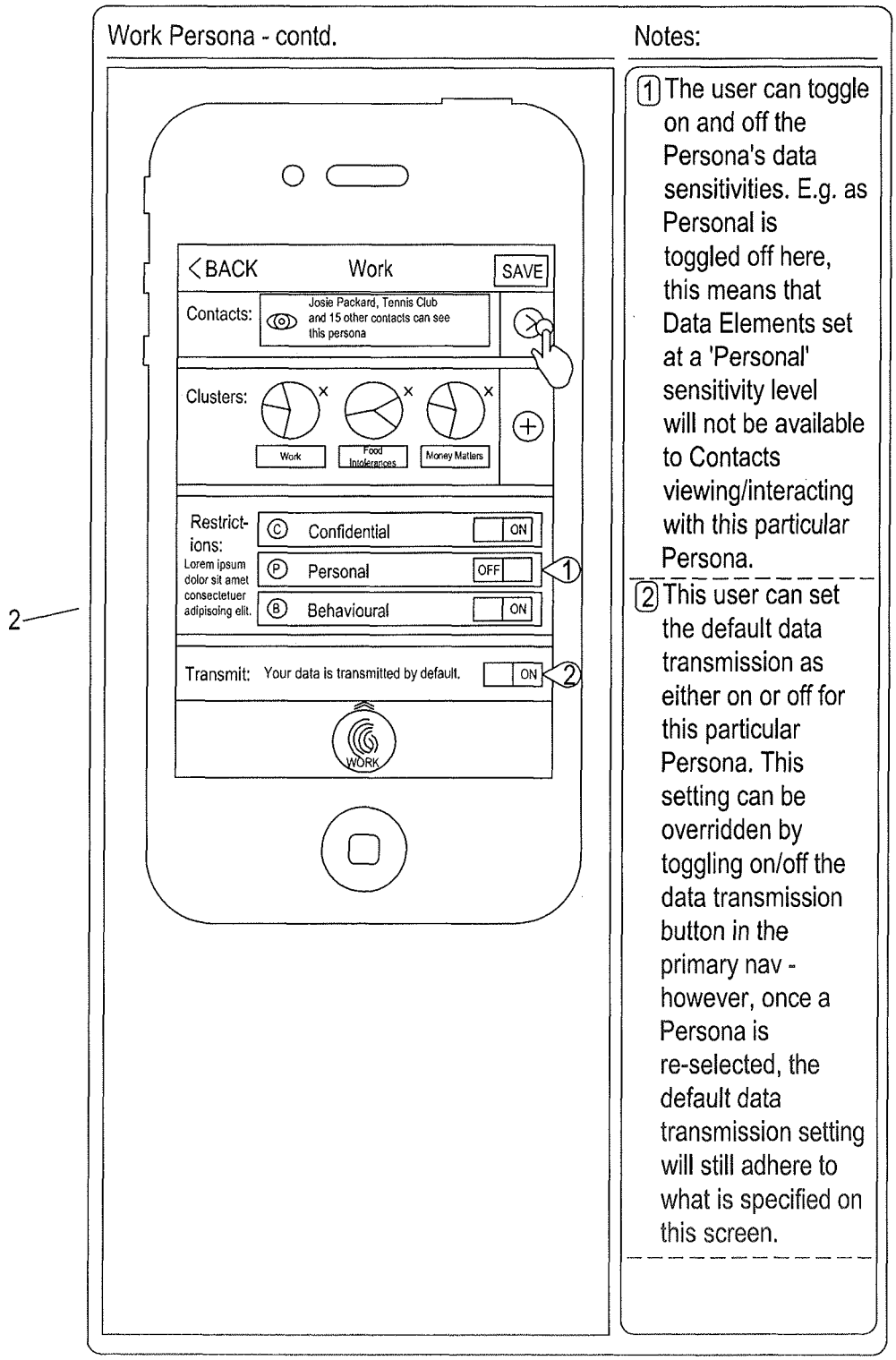
Figure 38:
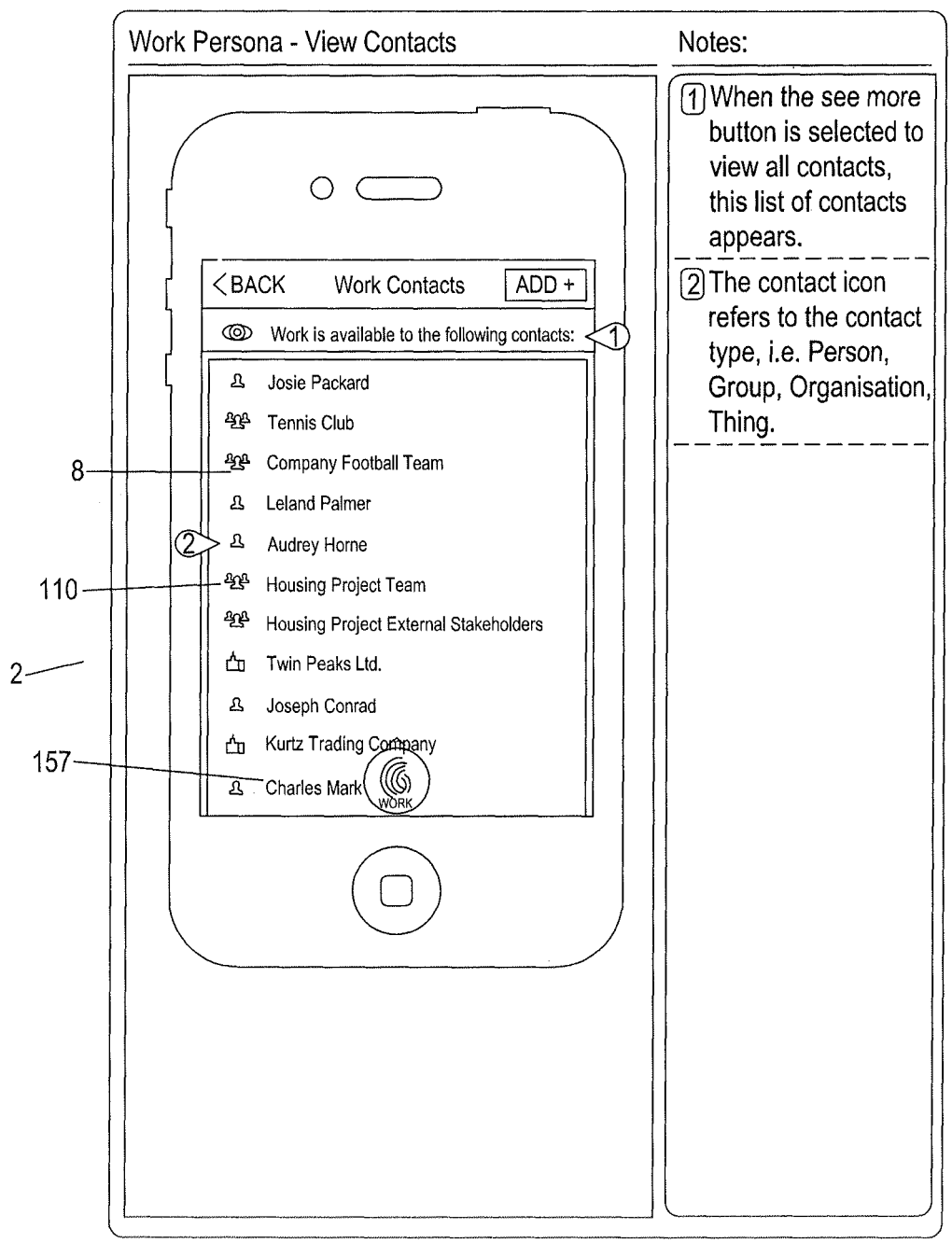
Figure 39:
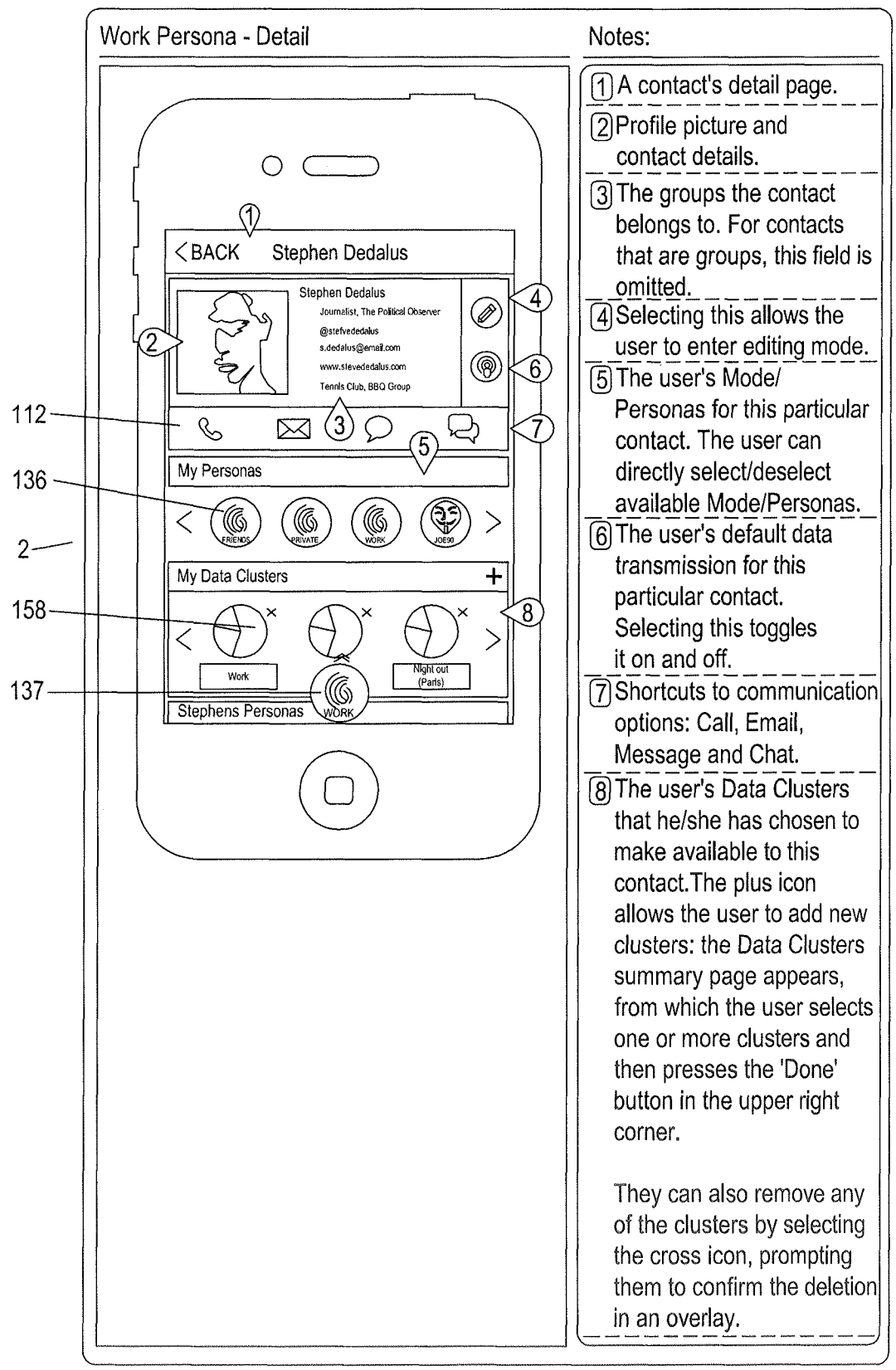
Figure 40:
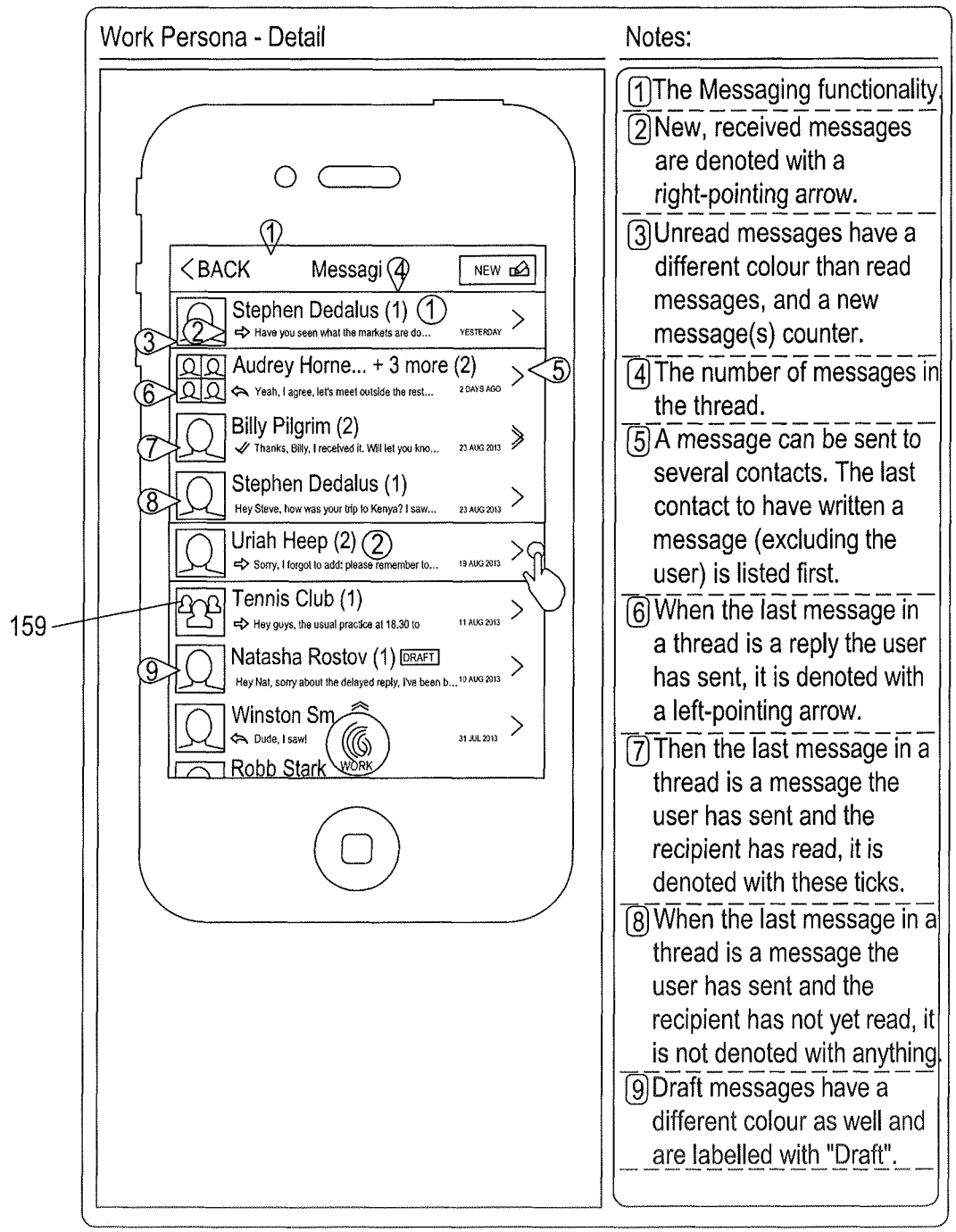
Figure 41:
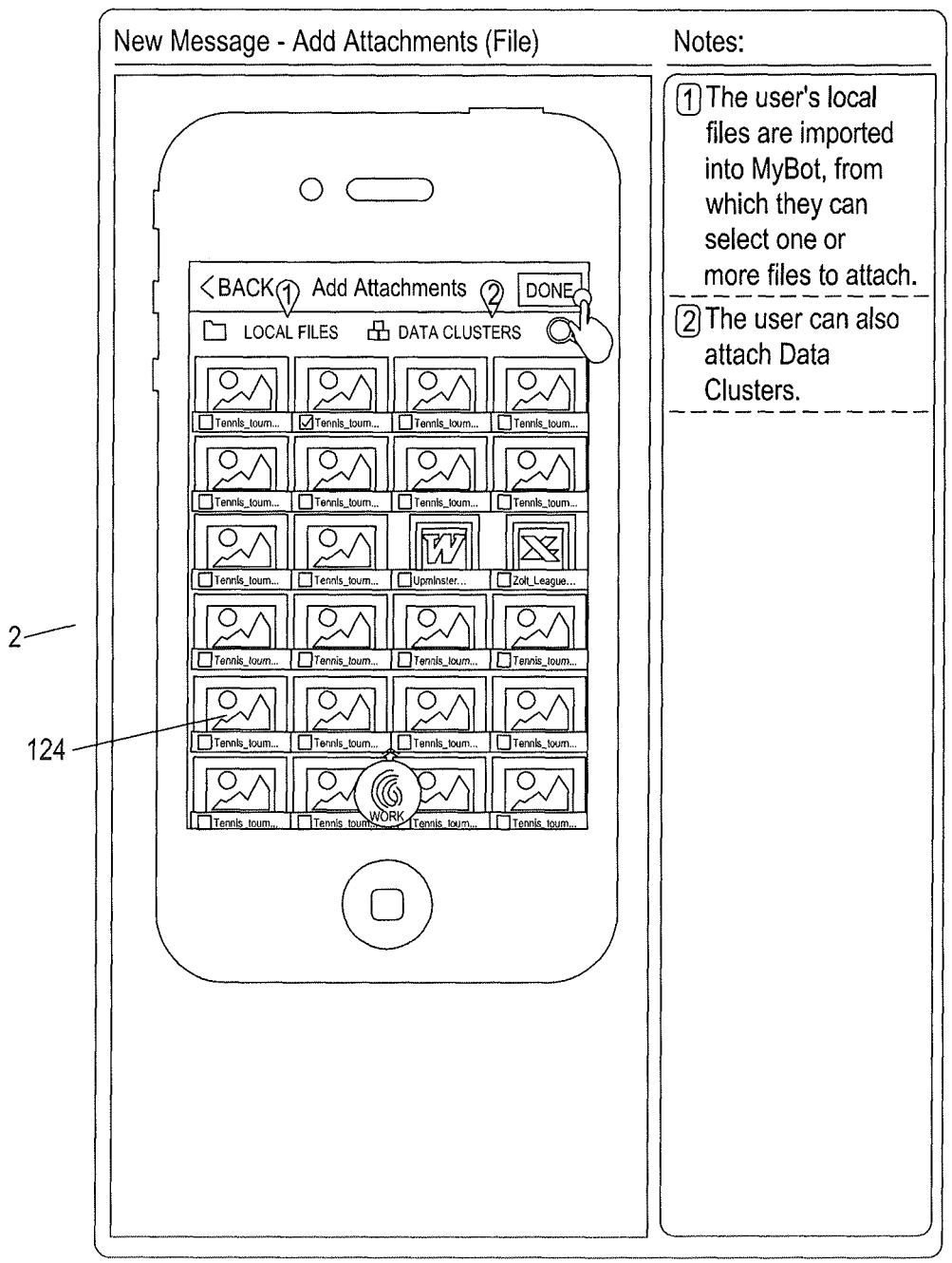
Figure 42:
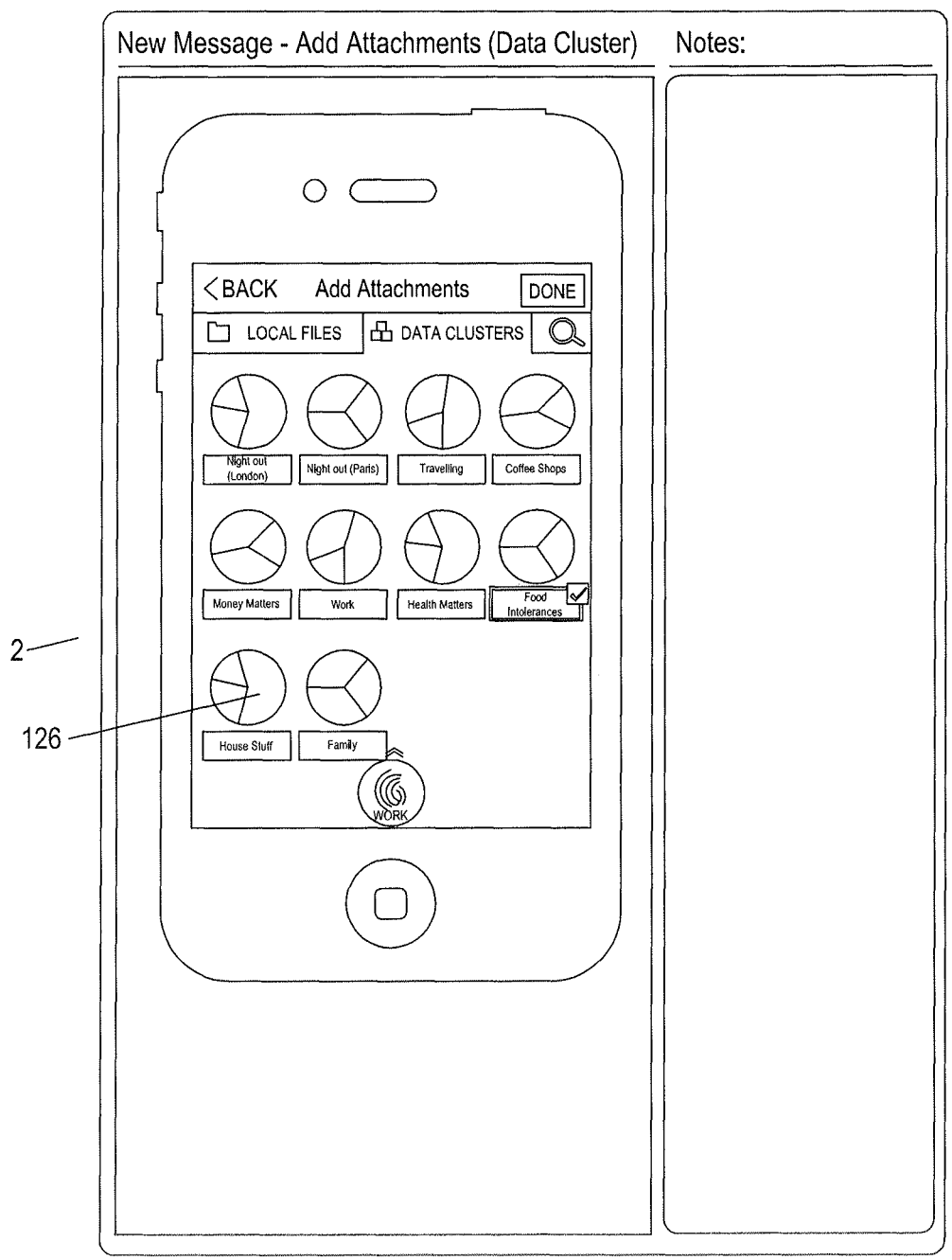
Figure 43:
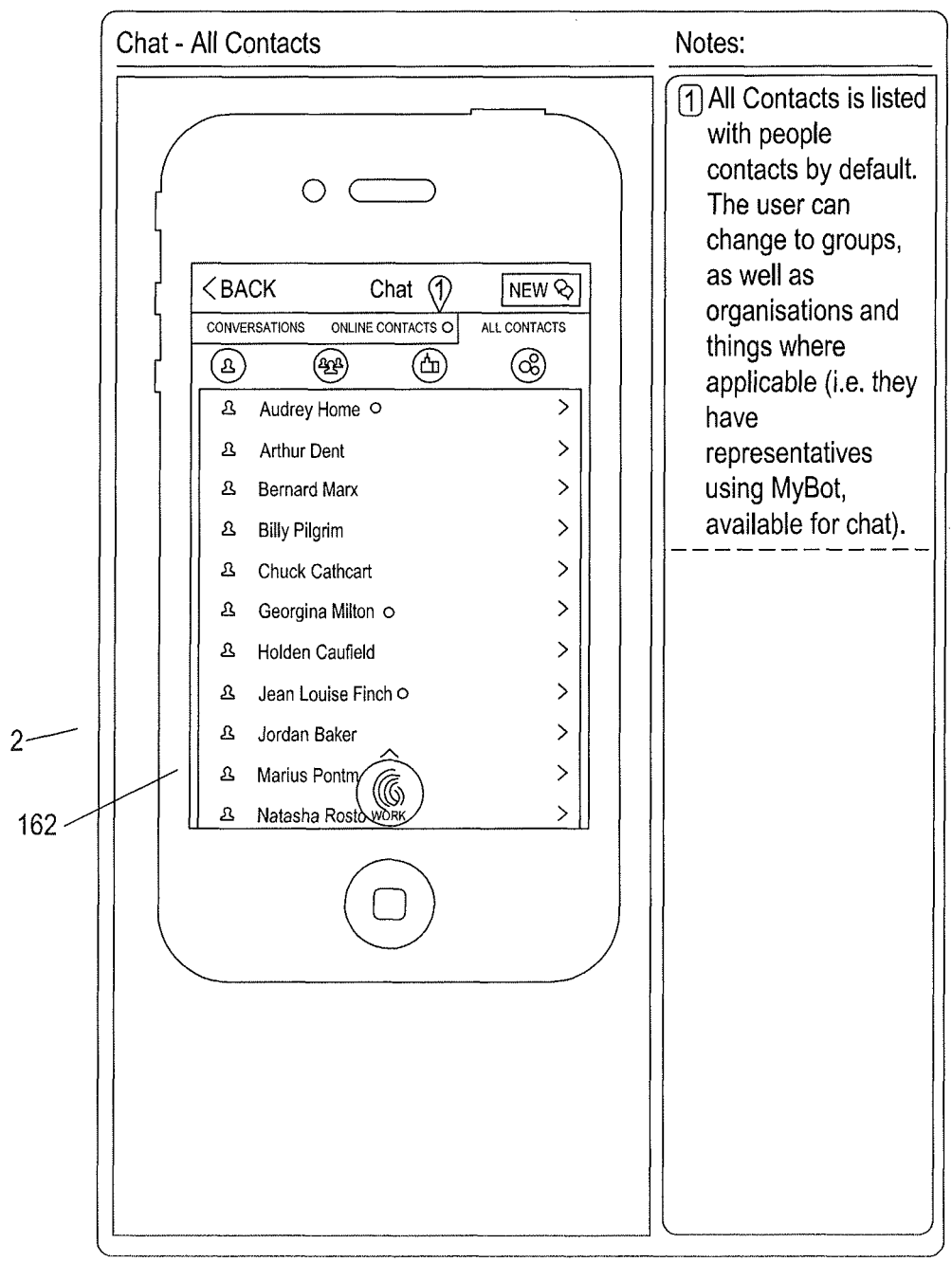
Figure 44:
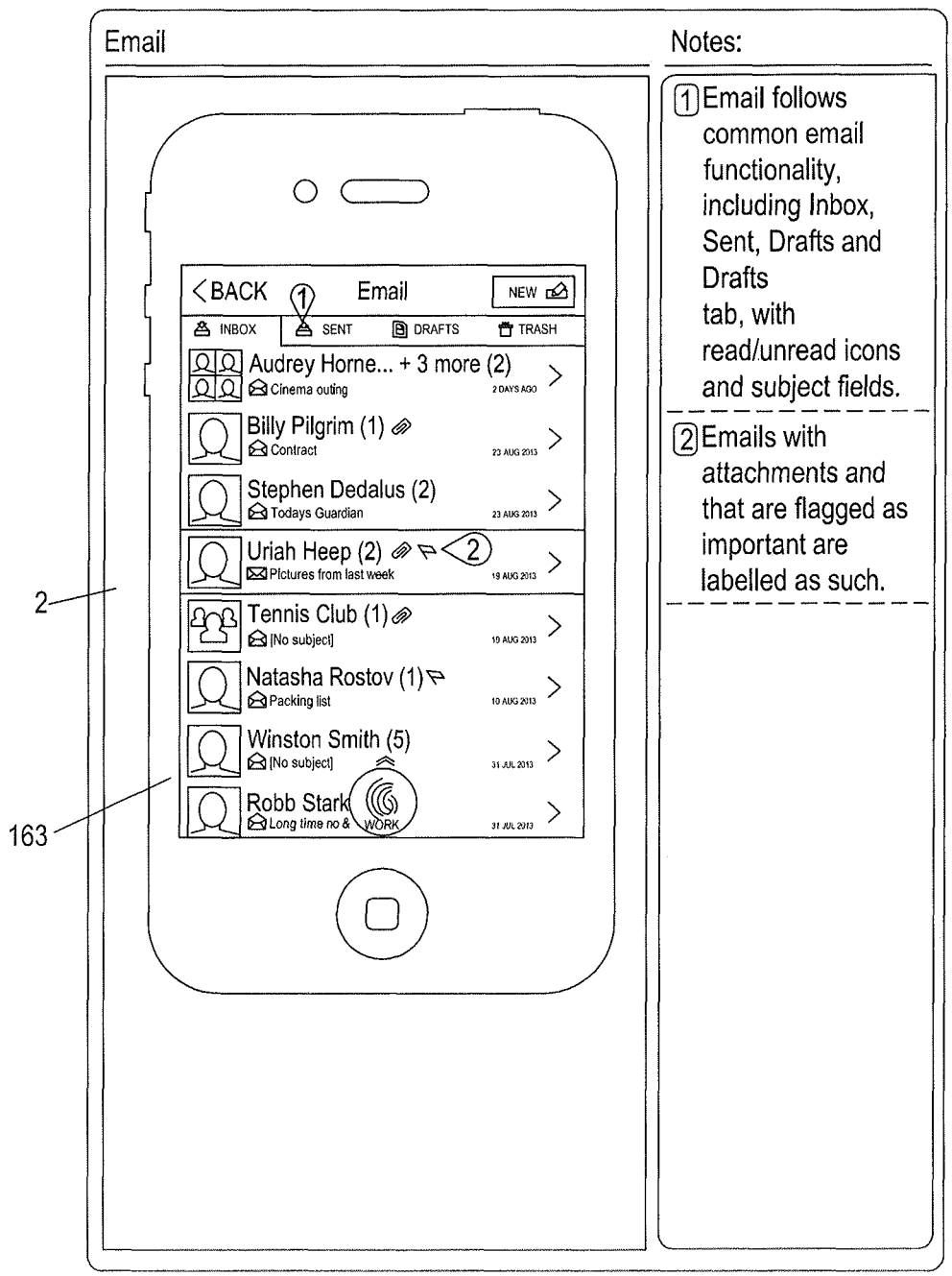
Figure 45:
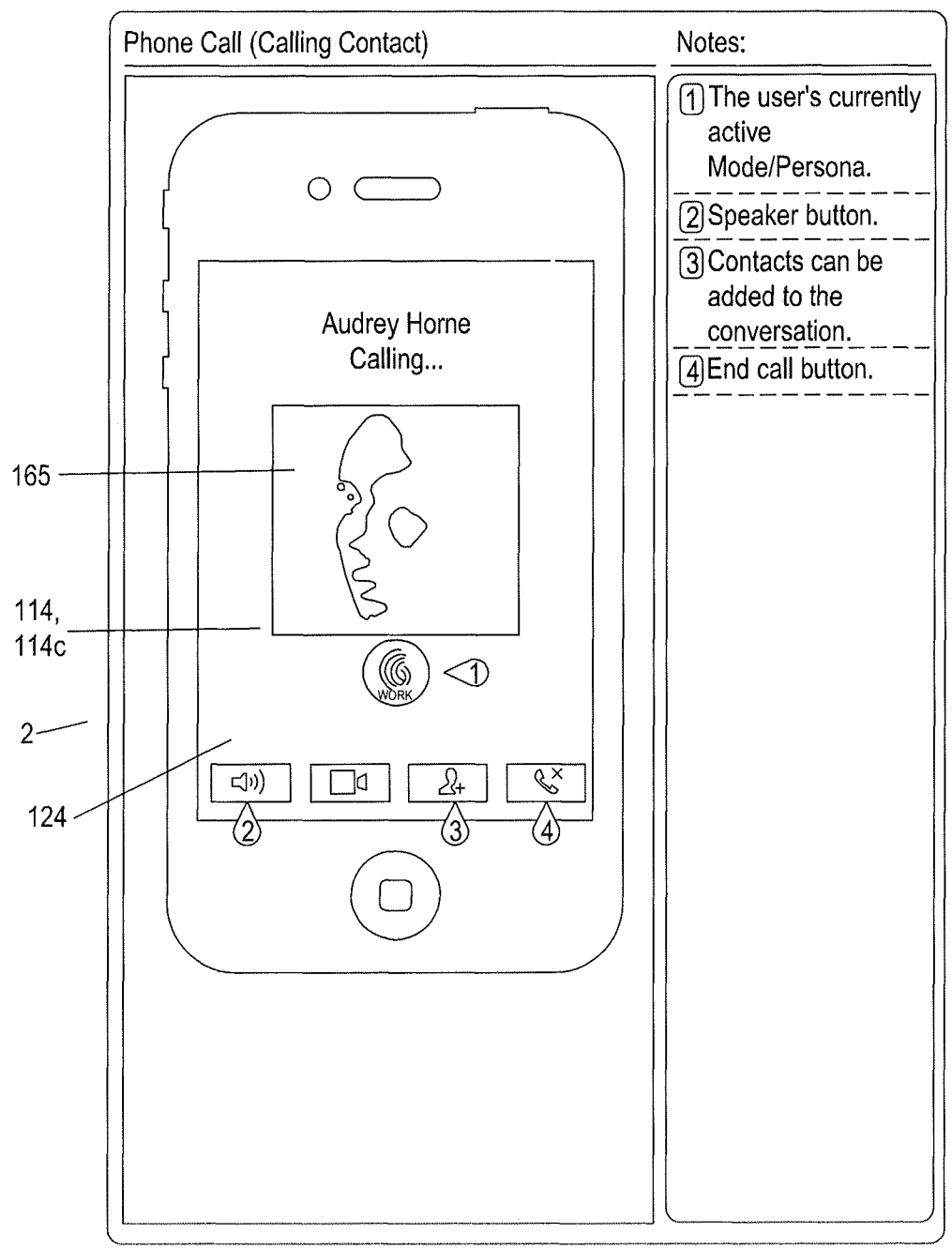
Figure 46:
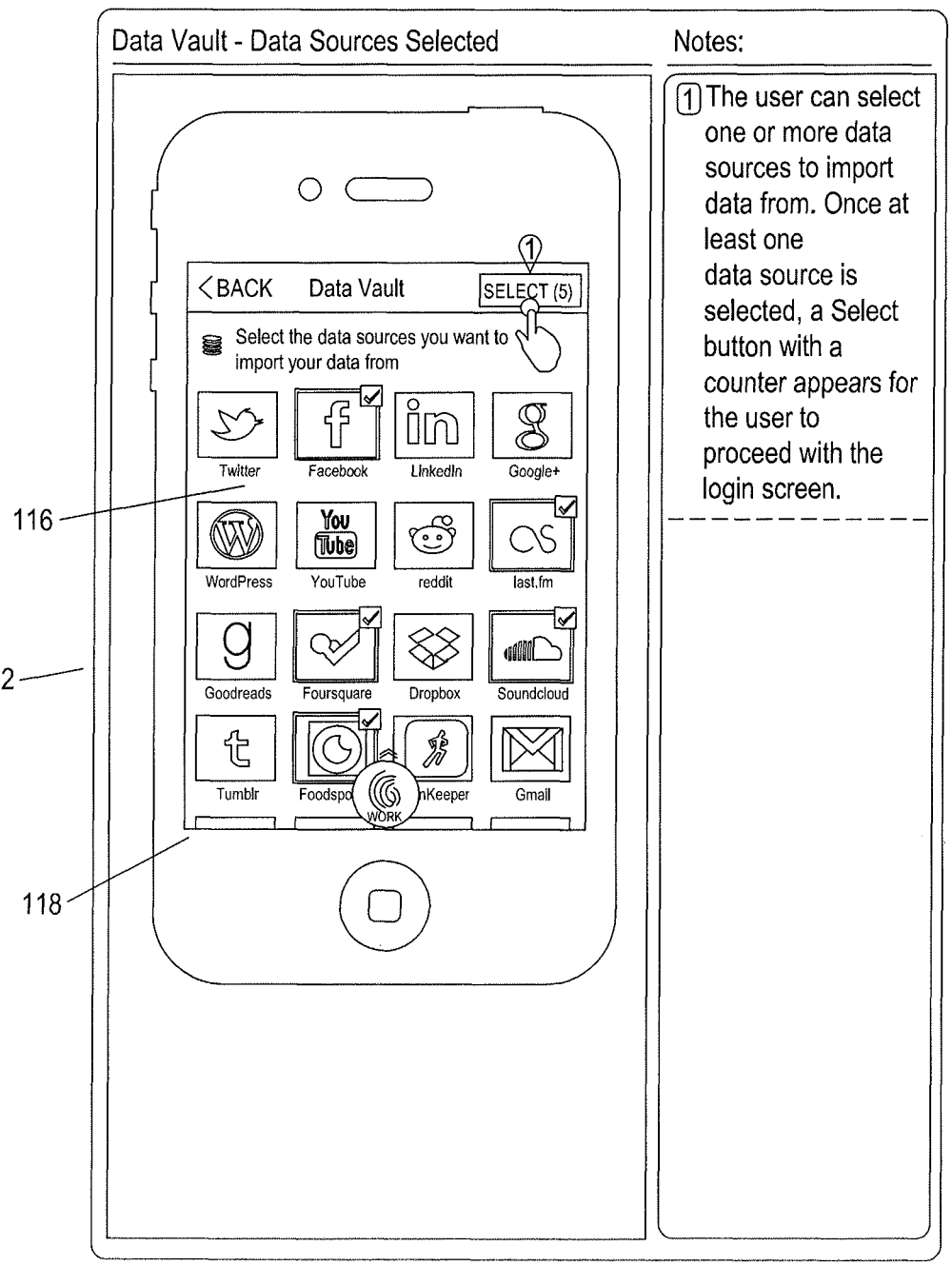
Figure 47:
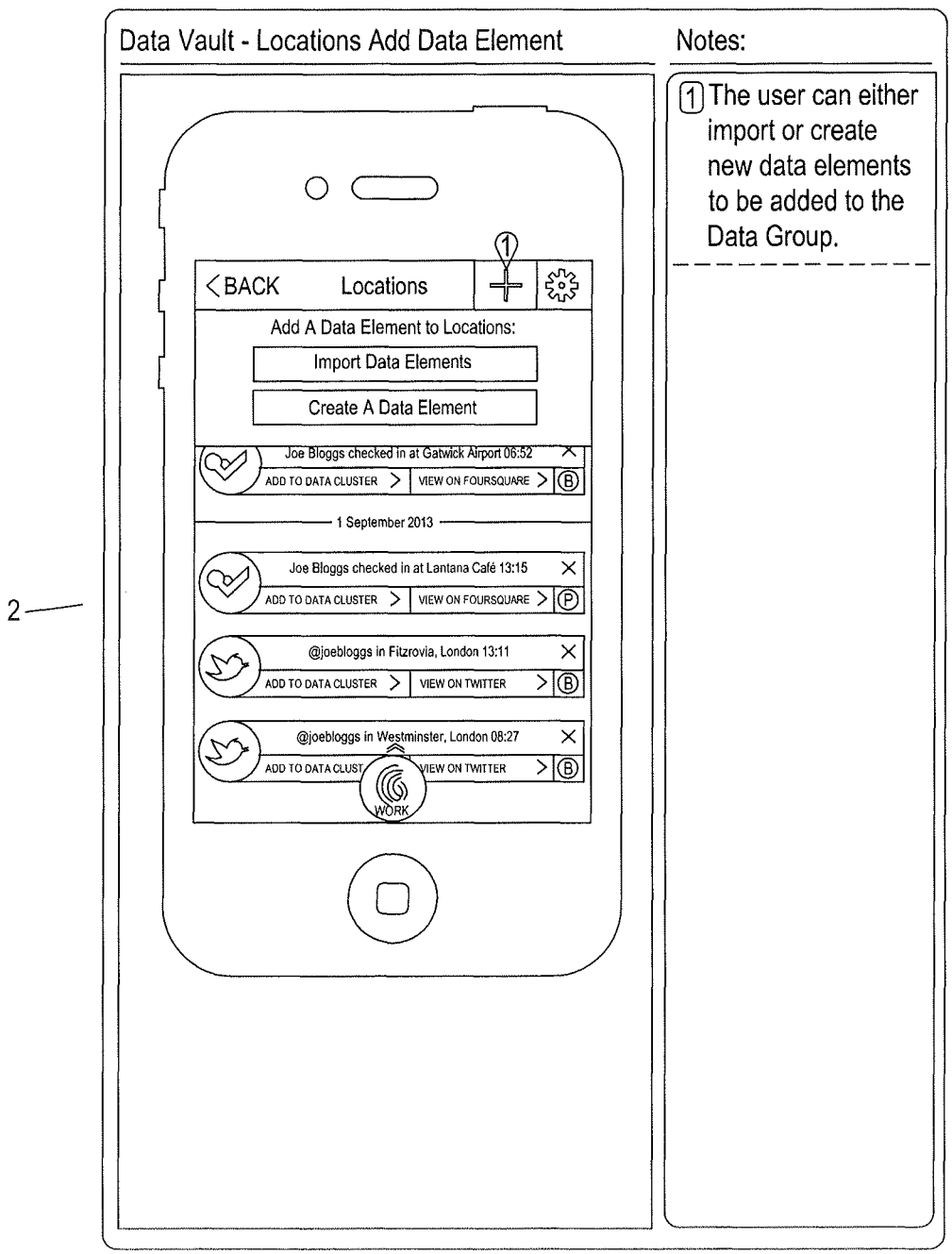
Figure 48:
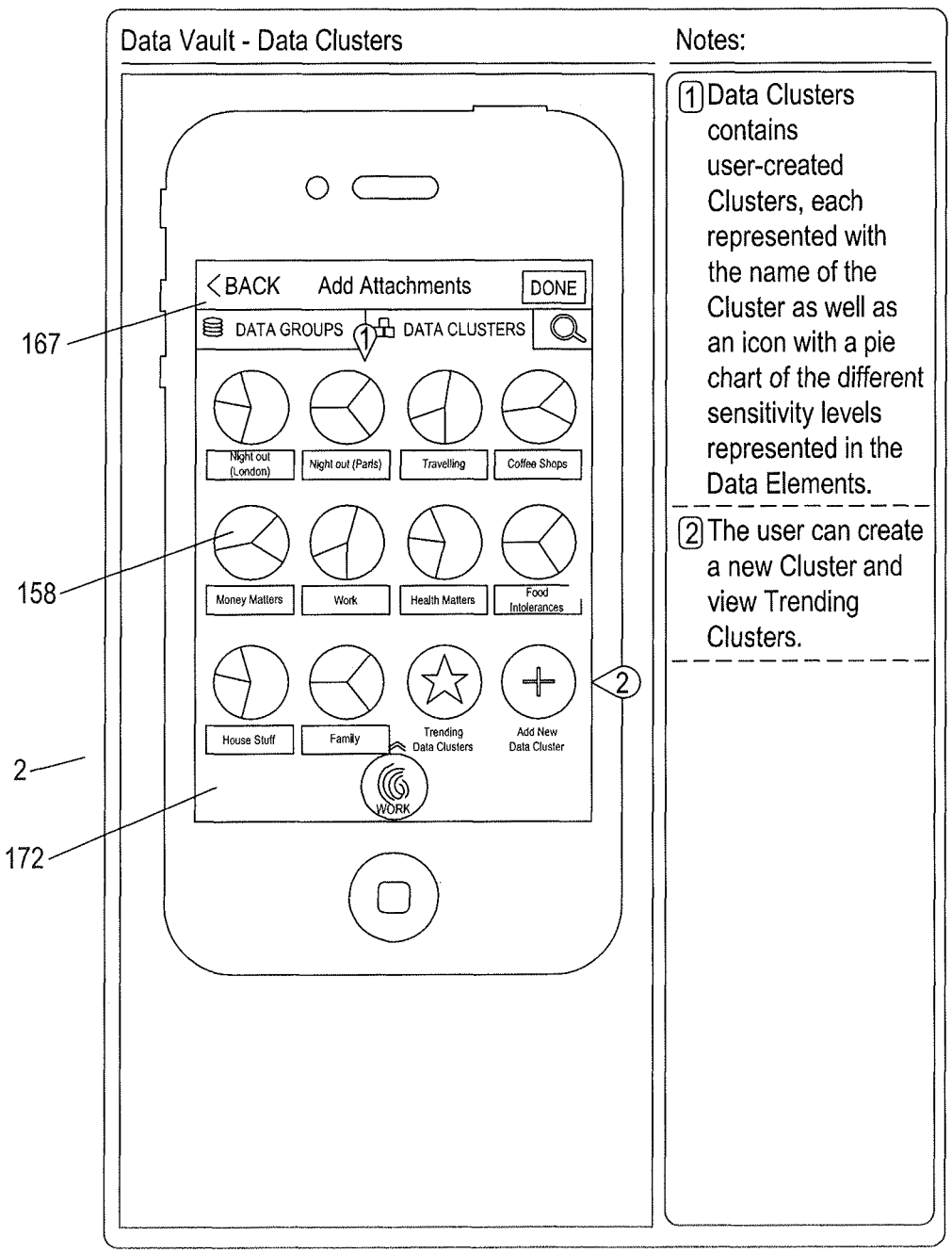
Figure 49:
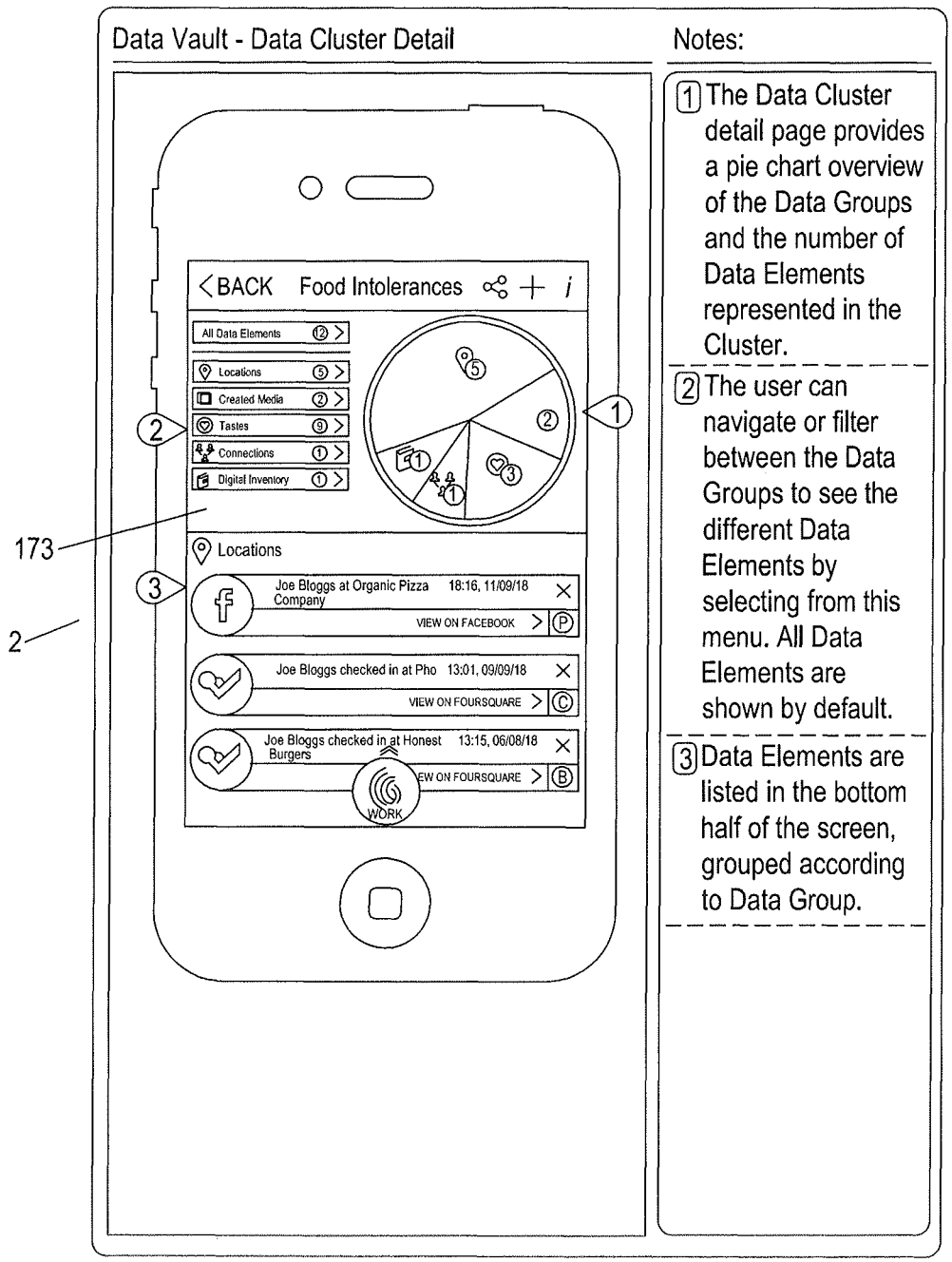
Figure 50:
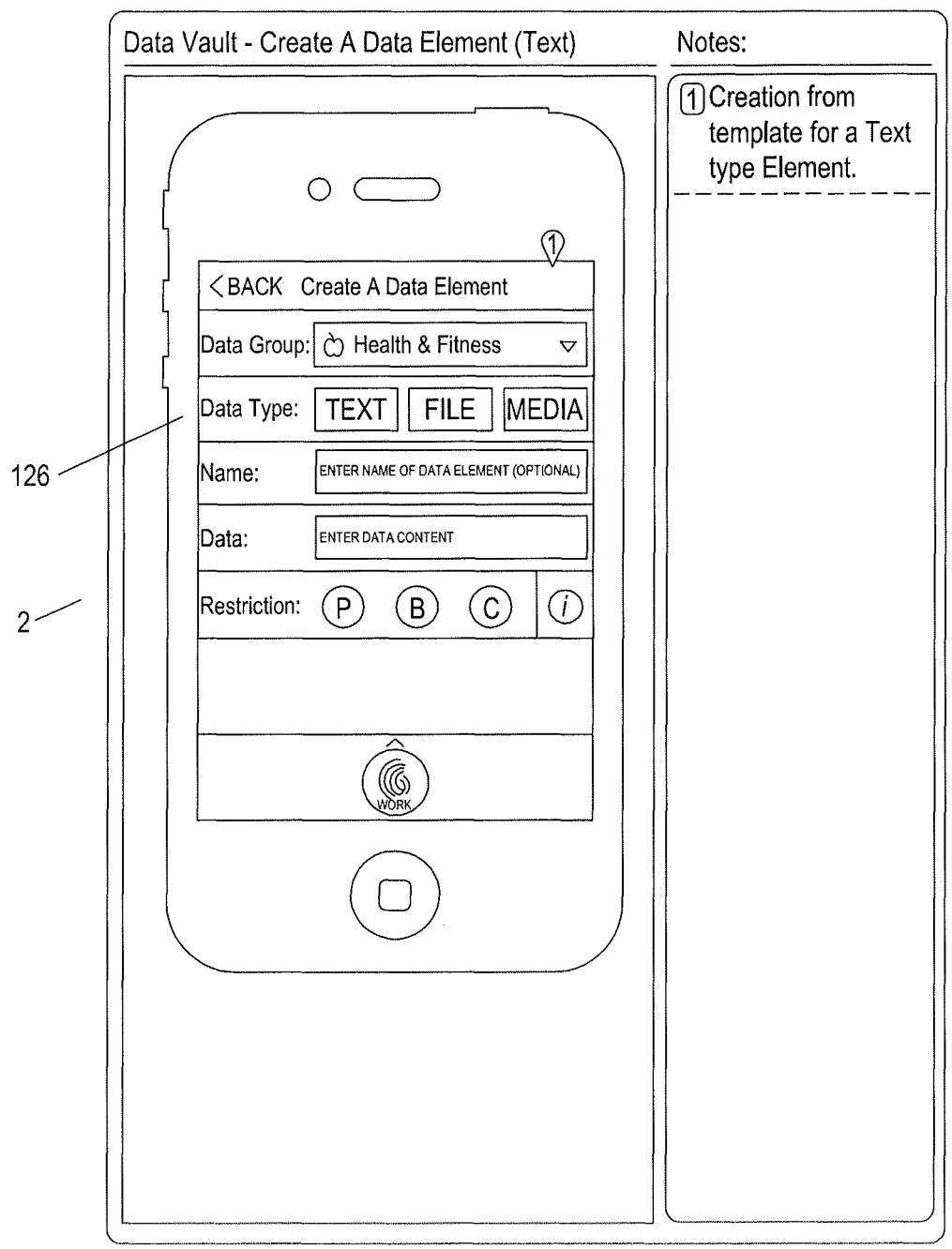
Figure 51:
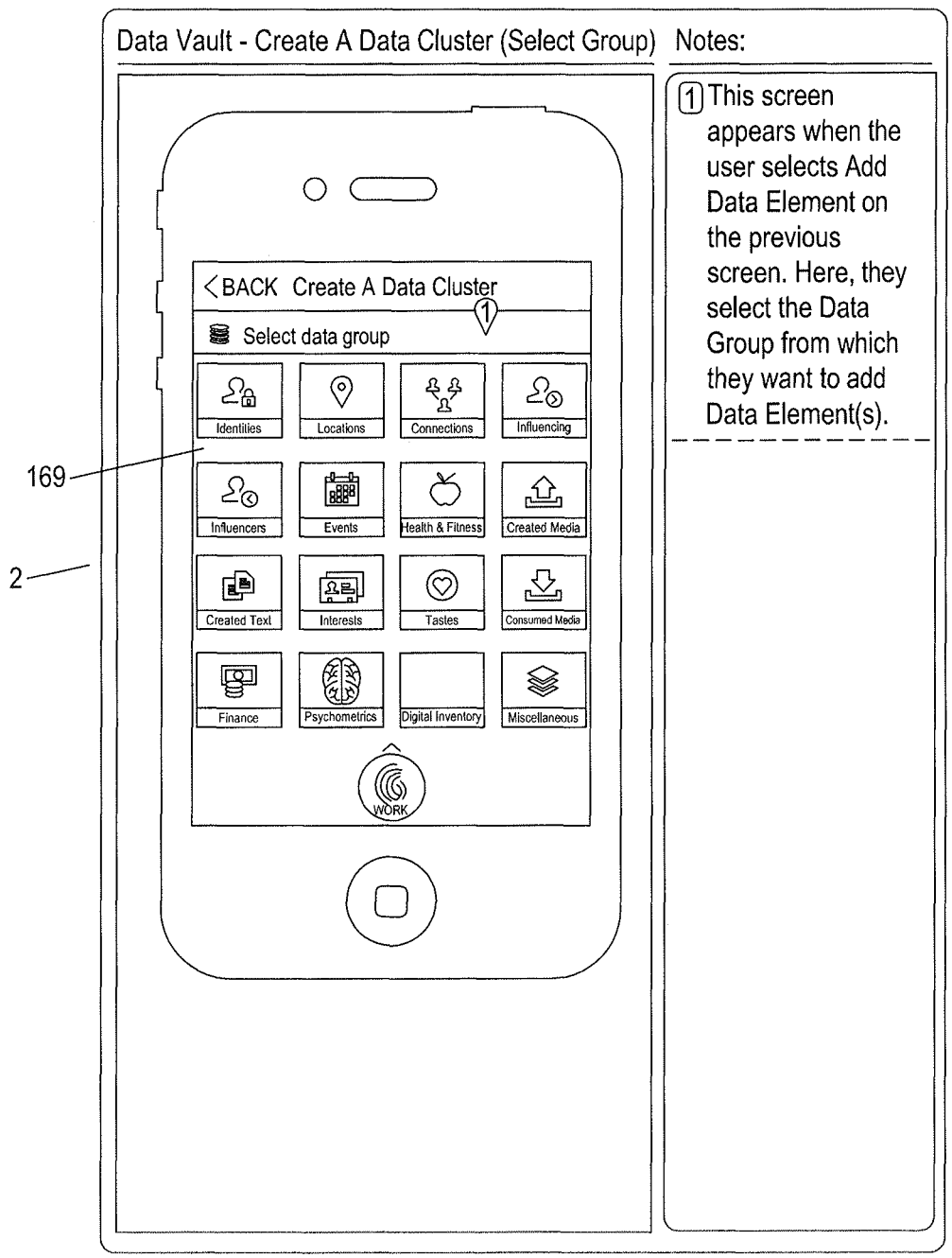
Figure 52:
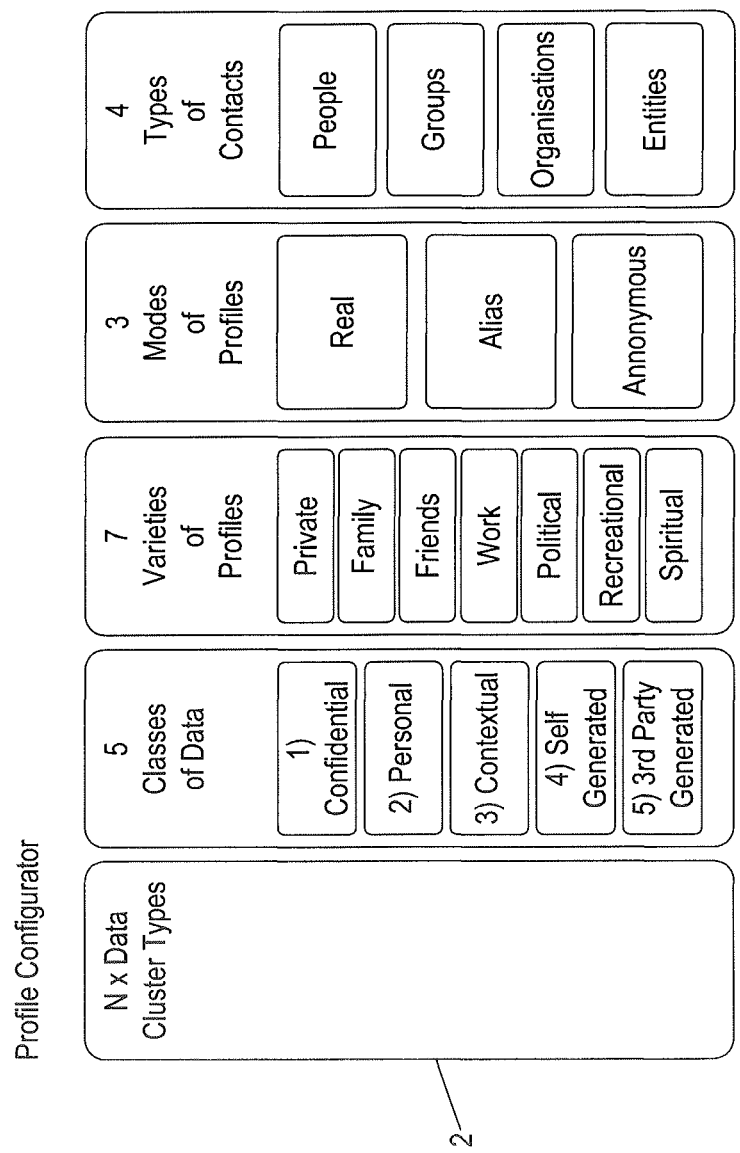
Figure 53:
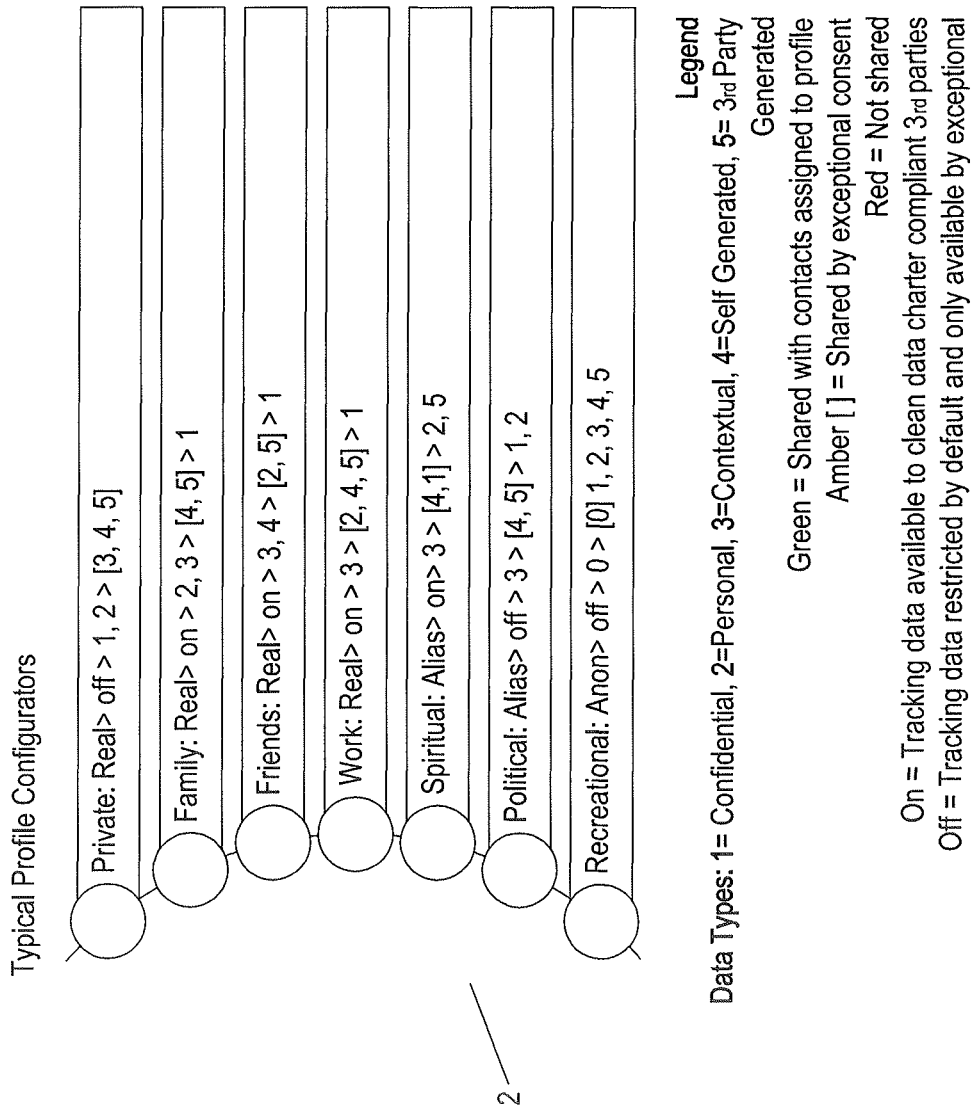
Figure 54:
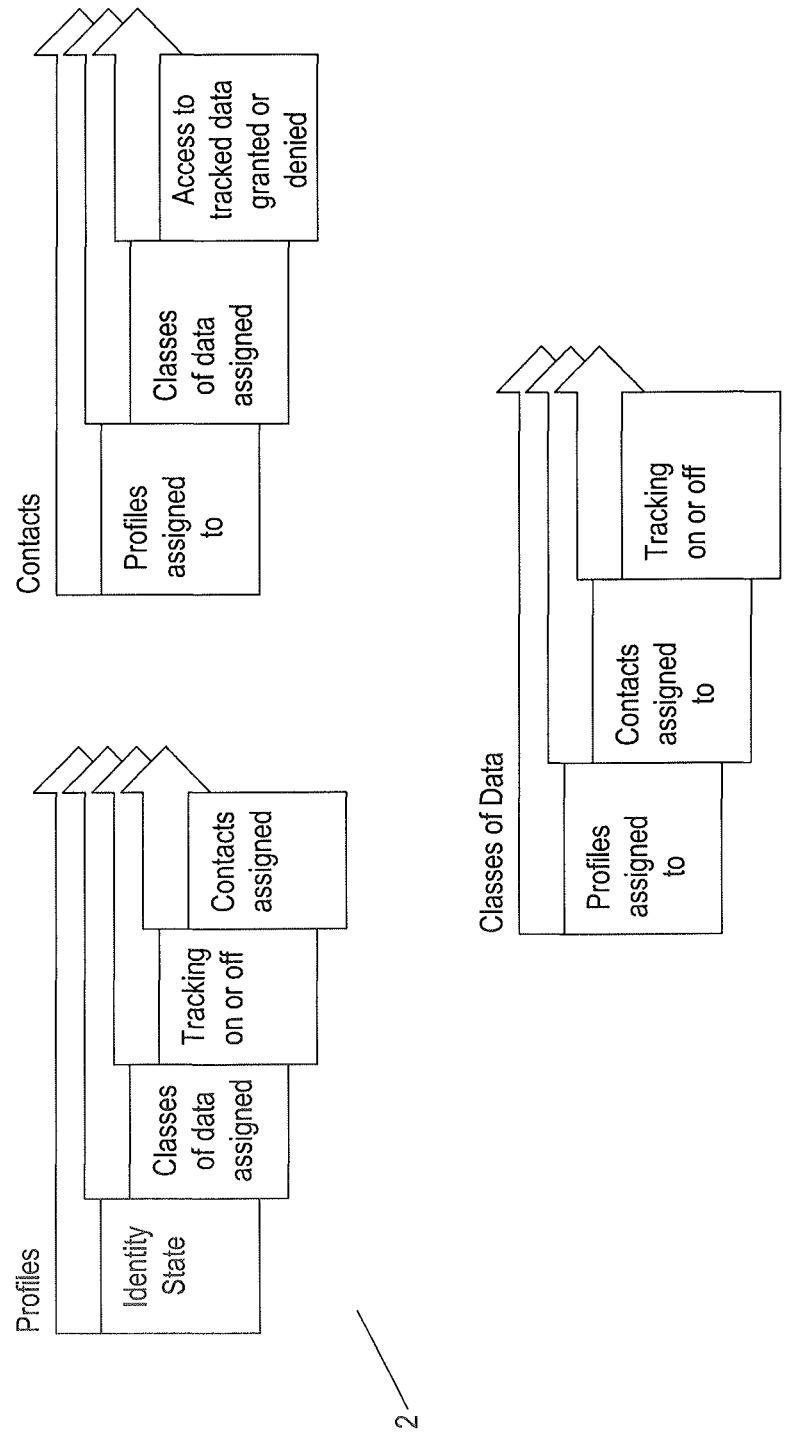
Figure 55:
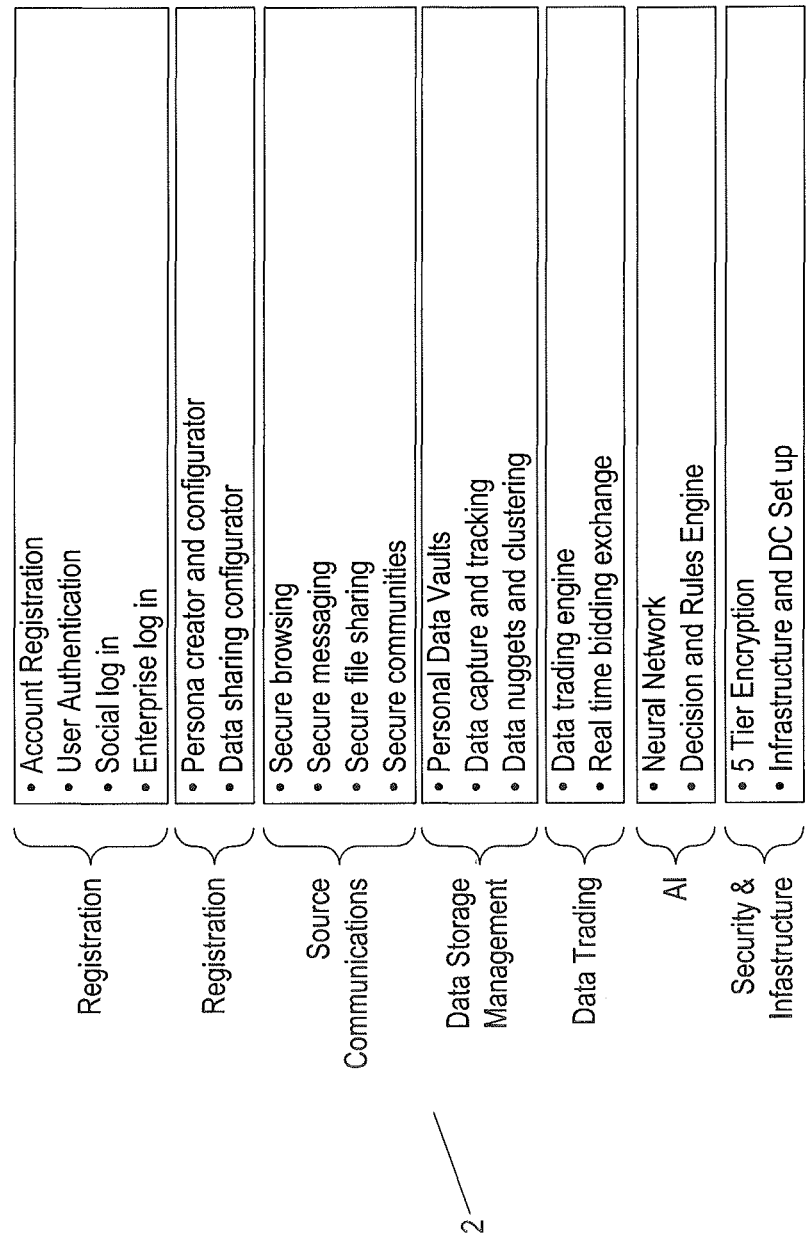

A first user journey—Anonymous Messaging flow example is illustrated at FIG. 16 and a second user journey Visible Profile Posting flow example is illustrated at FIG. 17.

Below is table 1, showing features of the system 2 and benefits by function.

| Function | Features | Benefits | Release | Technology |
|---|---|---|---|---|
| User Authenticator | Single Sign on mechanism for multiple applications & websites. Intelligent 'Need-to-know basis' sign on system. Biometric and password authentication. Dynamic auto fill. | A single application for accessing any website or digital application. Authentication by proxy without sharing sensitive information. Multiple/flexible authentication datasets and formats. Automatic form filling. | P/A/B | AES PDS Obj-C C++ |
| Data Vault | Comprehensive, cloud based Personal Data Store. Multi-tiered/persona based data store with configurable security protocols for encrypted data sets. Owned by Independent Trust. | Comprehensive single repository of user's data. Ability to set different security protocols to different data sets according to sensitivity of data. Independent, consumer centric ownership. | P/A/B | Higgins PDS Open Source Identity Framework |
| Profile Manager | Multiple persona based profile generator and manager Integrated social network account generator across multiple social networks per persona Customisable security and privacy settings easily managed by personas Simple intuitive user interface Data Cleansing | Simple means of creating multiple digital personas and accounts. Ability to control interaction with different groups based on personas. Ability to have different types of conversations with different groups across multiple social networks without fear of spillage. Easy to understand and use. Ability to share content with different groups. Identity management. Ability to remove unwanted data associations. | P/A/B | PDS ODS Obj-C C++ DW |
| Footprint Shield | Digital footprint shield with multiple anonymity levels and stealth capabilities. Encrypted network layer, device connection and data transport protocols Data packet transport scrambling Modular tiered architecture | Ability to set protection levels of digital footprint by personas. Ability to prevent online activity from being traced back to a user, device or location. Ability to swap layers or components as new technologies emerge. Protection from data exposure. | A/B | AES DeleGate SOCKS5 Polipo Proxy TOR Network SAML2 C++ ODS PDS DW |
| Content Shield | Content wrapper that encrypts all content downloaded and consumed through | Ability to block viewing, reading and writing access of content for everyone | B | AES ODS PDS SAML2 |

| Function | Features | Benefits | Release | Technology |
|---|---|---|---|---|
| | System 2. | except the System 2 user. (BP1) Specific content can be shared with other System 2 users on a permissions authentication basis. (BP2) | | C++ |
| Artificial Intelligence | Intelligent learning engine Multi dimensional object model spread over client and server side implementations Matrix n to n relational data model Reverse cookie tracking Self Healing System (SHS) | Increased system intelligence with use and numbers of users. (A) Rapid performance and continuous data streaming capacity. (BP1) Intelligent targeting, personalisation and profile development. (BP1) Hyper-rich, effective and multi-faceted targeting. (BP2) Behavioral analysis and autosuggestion event triggers. (BP2) Trend mapping. (BP2) Intelligent system health check monitor | A/B | Neural Network Obj-C C++ ODS PDS DW |
| Ethical Data Exchange | Real time bidding data exchange based on ethical data trading principles Configurable remuneration application for data trades | Ability to deliver messaging and content to users in real time. Provides users with control of how they are remunerated for their data's use by third parties. Tracking of data usage. Reporting on data use/spread with value types. | Post B | PDS ODS DW C++ Obj-C |

Key:
P = Prototype, A = Alpha, B = Beta, BP1 = Beta Phase 1, BP2 = Beta Phase 2

In summary, the system provides a means whereby individuals or data subjects can appear as unique data sets that can be grouped together into clusters whereby the datasets of those groups of people can be subject to the contextual access control rights and sharing rights as per any other cluster. This would be done using algorithms and artificial intelligence to dynamically assign users to groups based on context and changing data sets such as location, rules, changing context, etc.

This means groups of people's data can be shielded from access collectively by way of including them and all their associated data records within a cluster with restricted access rights.

This in turn enables cyber communities of dynamic changing personal datasets of the communities members or personas of the community members to be created and managed based on the data clusters of community members and the rules of the cyber community. This could be managed using smart contracts managed through distributed ledgers with systems such as the ethereum system.

The system in question could allow users to have a complete, accurate and up to date account of who has accessed their data, when under what context by using an open distributed ledger system such as the block chain to keep a record of every time a user's data cluster is accessed.

In preferred embodiments, the system 2 uses algorithms, machine learning and artificial intelligence to automatically assign a level of data sensitivity and identity exposure risk to a cluster of information based on the changing context of its use and the changing circumstances of the data subject or user in question.

In preferred embodiments, the system 2 uses algorithms, machine teaming and artificial intelligence to automatically assign access and security rules to a cluster of information based on the changing context of its use and the changing circumstances of the entity or entities associated with the cluster in question.

In preferred embodiments, the system 2 uses algorithms, machine learning and artificial intelligence to automatically assign a level of authenticity and reliability to a cluster of a data subject's personal identity data to establish to differing degrees of accuracy the prospects of the authenticity of the subject's information.

In preferred embodiments, the system 2 uses algorithms, machine learning and artificial intelligence to automatically establish the minimum levels of information required to assign levels of authenticity and reliability to a data subject's personal identity data cluster allowing entities to establish to differing degrees of accuracy the prospects for authenticity of the subject's information and creating such clusters to enable users to authenticate themselves with the minimum levels of personal data exposure necessary for the context in question.

The system 2 can be used to enable users to access different types of services, e.g. financial, municipal, healthcare, etc dynamically and automatically by sharing the minimum information required via clusters dynamically generated to authenticate users with the minimum information necessary based on the context of the access request and the circumstance of user or access requester in question.

The system 2 can be used to automatically design, create or combine clusters to enable a data subject or entity to provide the minimum amount of data required to meet the information requirements of a requesting entity's data request while enabling the minimum level of data sharing by the sharing data subject.

Within the said system 2, clusters of data with cryptography that enables them to be shared on 3rd party networks and in the open internet outside of the native system in which they were created, while retaining their security and access rights, thus enabling authorised access only even if the cluster appears or is shared via another network platform open Internet system such as a social networking platform or a messaging system.

In preferred embodiments, the system 2 may create smart clusters that evolve to add or remove data records from themselves or combine themselves with other clusters and that modify their security and access protocols according to the context and circumstances of their use.

The system 2 can use a unique resource locator such as an entity name and a unique cluster identifier to identify a specific cluster of information from a specific entity. For example using the @ symbol to identify an entity and the ~ symbol to identify a cluster type we could describe John Smith's business card as @johnsmith~bizcard. Using this model John Smith might be able to share an electronic business card with third parties by simply giving them his unique identifier or name. e.g. @johnsmith. The recipient could then simply search for John Smith in a third party social platform and send him a copy of his @recipient~bizcard business card and request for Mr Smith's @johnsmith~bizcard. John Smith could then decide whether to accept the request for his business card or not. If he does accept then the recipient would gain access to John Smith's business card cluster containing his business contact information. The smart cluster could also assign John Smith's details to his contact list in his phone, in his personal data store and even connect him with John Smith on third party social networks.

Another example of a Smart Cluster that the system outlined could enable would be a cluster of favourites, films for example. A cluster could be used to enable a user to group their favourite films into their top 10, top 20, top 50 ad top 100 films. The groups would be fluid enabling the end user to drop films in and out of one group to another as they watch new films or change their mind. This cluster could then be shared with various service providers to enable them to have an insight into the end user's entertainment taste. The advantage would be that the cluster would evolve and change according to the end user's changes. All parties that the end user granted access to this cluster would thus be able to adjust and adapt to the end user's changes in real time.

The system 2 also has the following capabilities:
Peer to peer cluster sharing and design;
Using different personas to share different personas. The system allows for entities to share different clusters of information with third parties based on a number of factors. One primary factor that the system will enable people to use to filter and manage cluster sharing rules will be personas. The system will allow end users to create multiple personas. Each persona will be able to set up its own data sharing rules and conditions. This will enable people to switch between complex data sharing conditions and protocols very easily by simply switching between personas;

Such personas will be centralised in the end user's personal data store only and shared with third parties only as allowed by their owner. As such people will be able to use personas to control which of their clusters are associated with which of their personas enabling them to control what visibility third parties can have of different aspects of their lives.

The system as such can be used to enable high levels of privacy and citizen control of data sharing and access management while enabling rules to be built into its fabric that allow for overrides under contexts and circumstances outlined in law such as emergencies or when lives are at risk for example. Additionally the system allows for data to be shared with municipal authorities or government services with varying degrees of anonymity and identity disclosure as needed potentially accelerating digital participation in civic affairs by citizens such as e-voting for example while enabling and accelerating the adoption of new data protection legislation such as the imminent new General Data Protection Regulations of the EU.

The system will use its private-public key cryptography to control which entities have access to which clusters and its distributed ledger to monitor enabling the system to prevent third party from associating a particular cluster from one persona with another persona even if both personas are the same person, if that person does not want both personas integrated or aligned. The system will prevent alias personas from being tracked any further than the IP address of our data center and will prevent anonymous personas from being tracked at all by using the TOR network to distribute the end user's chain of connectivity.

A system where offers can be made from one entity (a brand for example) to another (a consumer for example) for the second entity to share a cluster of data and where the relevance of the offer can be calculated using an algorithm that weighs up the target audience that the rand wants to reach with interests and intentions that the other entity has declared.

The system in question can enable end users to broadcast interests and intentions to third parties by using a cluster to share specific information related to context. For example an end user could observe that she has an important dinner date to attend in a few days time and that she needs an outfit for it. A cluster with details of the appointment could be gathered bringing in data from her diary along with her vital statistics, apparel purchases in the last 3 months and other relevant information. The system could be used to share this information with third parties only under certain circumstances, such as when she is in a shopping center/mall or when discounted offers are sent to her from some of her favourite brands.

In this manner the system outlined can be used to provide a wide variety of personal concierge services to people by using their personal data in tightly controlled clusters to share it with product and service providers in the right context maximising safety, privacy and convenience for the the data owner.

In a more technical manner, the invention can be summarised as a PIDM eco-system managed and filtered by persona profiles giving complete security of users and their internet connected devices and other electronic services; a private by design identity and personal data ecosystem that enables individual users to establish a secure personal internet that allows them to interact with their connected Internet of Things devices in a secure way and with other third parties based on contextual dynamic rules that change automatically or when manual requested by users. This ecosystem consists of the following components:

a. A DNS server, this will interrupt DNS requests from a proxy, the system will then check for local records before either routing to local records, ICANN or the Darknet b. A PNS (Personal Name Server) this server both allows personal information to be queried by secure $3^{rd}$ parties as well as providing the primary platform for the user to manage their personal information and becomes the gateway to the data marketplace.

c. An ANS (Actual Name Server) this server allows logical names to be given to devices that route through the DNS, PNS such as my.email.device or i.domain.device.

d. The proxy allows any computer or device to connect to our DNS system without any system modifications or software; it will also provide a security layer. This proxy may also dynamically provide open IP proxies in a predictable way to reduce $3^{rd}$ party service interruptions.

e. ALP (Application Layer Packagea) are a suite of products wrapped in a virtual machine, this application contains a secure browser, P2P DNS server and a dummy-proof webserver.

f. The cluster engine outlined below and in previous documents.

g. The persona engine outlined below and in previous documents.

h. The Neural Network, Machine Learning and Artificial intelligence engine outlined below and in previous documents.

i. The Clean Data Marketplace using real time bidding technology as outlined below and in previous documents.

j. The distributed ledger data access tracking and audit system outlined in previous documents.

k. The security and components and models outlined below and in previous documents.

l. The data matrix outlined below and in previous documents.

A Neural Network that will be used to iprovide artificial intelligence to organise data, sugest clusters, manage security, math users with data clusters and offers for data, monitor intrusions and dentify of false positives through behavioral and system based Threshold Learning Units (TLUs) utilising back propagation.

The system has been designed to use a Multi-Layer Encryption (MLE) security model. This represents a significant advance in combatting any attack vectors used in comprehensive hacking. For example, if one layer of encryption is penetrated, it would be relatively easy for a hacker to surface any other keys issued in relation to the session in progress thereby potentially exposing the user's data. MLE uses an 'Onion' approach that enables extremely secure protection of data as it is impossible to hack multiple layers without the intrusion detection system closing down the active session and kicking out the hacker.

Degree Matrix Cryptology. DMC is a completely new, bespoke and proprietary type of Cryptography. The solution involves the random creation of a session based matrix that holds anywhere between 360 and 720 numbers. These numbers are not sequential and are mapped to each character of the cipher to which they are applied. In simple terms this means that if one had a character such as the Letter 'A' in Ascii or UTF-8 and applied a degree of 45 to the character, the Letter 'A' would rotate 45 degrees in a clockwise or anti-clockwise manner. The resulting cipher would then cease to be recognisable by any attack vector as any external system would effectively view the character as complete garbage which would be un-processible.

A quantum entanglement based session security model which delivers two simultaneous data streams to the end user's primary data access point. This is a new type of session based security that manages parallel sessions inline with the principles of Quantum Entanglement. In the event that the system detects an intrusions through its Host Intrusion Detection System (HIDS) and its Network Intrusion Detection System (NIDS) to the feed being consumed by the end user the system shuts down the feed being consumed in the session, then transfers data transmission to the second parallel data stream and creates a new parallel feed for the session. This ensures that two parallel data streams are always running and reduces the risk of session interruptions. The system's neural network and artificial intelligence engine is used to track and monitor data from the intrusion and then assimilate that into the security engines knowledge base and machine learning algorithm enabling the system to continuously learn from intrusions and be better equipped at preventing them in the future.

An intelligent security system that improves and becomes more resilient with increases in violation attempts.

An identity and personal data eco system that continuously rewards end users as they use it and share data with third parties.

Continuous context based identity and personal data security.

Configurable personas with varying degrees of openness.

A content, identity and personal data mapping Neural Network using semantic meta data and semantic intelligence to organise data and determine data access rights for end users dynamically based on a variety of contextual criteria.

An application that Integrates multiple authentication protocols and authenticates users intelligently based on contextual intelligence.

Platform independent consumer centric identity and personal data management.

A consent driven identity and personal data market exchange that enables users to share clusters of data in a real time bidding based auction market place enabling multiple third parties to bid for access to that data based on pre-set and dynamically changing contextual rules.

A system that provides users with comprehensive insight into their online behaviour through analysis of multiple data clusters enabling insights to be honed or constrained to contexts and various rules.

An application that enables organisations, people and entities to create demarcated and restricted relationships between users, entities and content across third party applications and services.

A system that enables an entity to be identified and allowed access to other entities or content in 3rd party locations/sites/applications based on contextual awareness and approved protocols.

A user engagement and identity and personal data sharing eco system that allows rewards to be traded and shared across platforms and organisational boundaries.

A user, entity, organisation and content data sharing system that enables organisations to share information in real time across boundaries in the open web.

An application that allows organisations to extend their firewall boundaries with different levels of security and openness dynamically based on rapidly changing contexts.

An application that allows organisations to extend their boundaries into third party platforms with some controls.

An application that enables organisations to establish second party relationships with data from third parties by rewarding first party data subjects to share this third party data with them.

A clean data trading market that enables people and organisations to share, buy and sell data in a responsible and sustainable manner that enables new and potentially pending data protection legislation such as the EU's GDPR.

Persona driven security controls.

Configurable personas.

Mapping data cluster access rules to configurable personas.

Personal online data stores that collect all users digital activities and digital assets from multiple sources and then organise them into data groups and sub groups automatically using a combination of machine learning, artificial intelligence and social intelligence that can easily be navigated and understood by end users.

A data protection robot which is ever present and which operates at the individual entity and data packet (cluster) level rather than at the network level.

Data cleansing system that reverses cookies to seek out personal identity data on third party sites and requests for it to be removed through opt out and remote wipe instructions.

Persona driven identity, personal data and content interpretation.

Persona driven identity, personal data and content navigation.

Dynamic relations between persona, content, entities and context that is navigated and presented with complex personalisation algorithms.

Intelligent assignment of data clusters to contacts, persona/profile types and rules.

Intelligent alignment of content/information to persona types identities and rules.

Browsing the internet with multiple levels of security and openness to being tracked.

Browsing the internet with different levels of security and openness to being tracked being managed by different personas.

Intelligent personae.

Application for aggregating ail of a user's online and offline activities.

What is claimed is:

1. A personal data sharing system comprising a server side and a user device providing an interface layer; said system comprising an application layer which is separate from said interface layer; said user device comprising an operating system with operating system level objects enabling the system to gain access to hardware components of said client device; said server side comprising a personal data store within which resides an aggregator for aggregating data from a plurality of disparate sources and for categorizing said aggregated data into discrete groups of data, said interface layer providing a platform configured to enable the assignment of an access permission level for each one of said discrete groups of data by allowing the user to configure said access permission level; said platform being further configured to permit access to a discrete group of data dependent upon said access permission level.

2. A personal data sharing system according to claim 1, wherein said aggregator is configured to aggregate discrete groups of data in a personal single data store.

3. A personal data sharing system according to claim 1, wherein said discrete groups of data comprises one or more data clusters and/or one or more data elements; and said discrete groups of data are tagged and/or mapped by assigning a description to at least one data cluster and/or at least one data element.

4. A personal data sharing system according to claim 1, wherein said discrete groups of data comprises one or more data clusters.

5. A personal data sharing system according to claim 4, wherein said data clusters comprise one or more data elements.

6. A personal data sharing system according to claim 1, wherein said aggregator is configured to dynamically connect to disparate sources of data in order to push data notifications.

7. A personal data sharing system according to claim 1, wherein said aggregator is configured to wrap a shell of encryption around a discrete group of data.

8. A personal data sharing system according to claim 1, further comprising a tool for allowing a user to curate the data; and means for recording a level of data curation; whereby said aggregator aggregates said data dependent at least in part on said level of data curation.

9. A personal data sharing system according to claim 1, further comprising means for notifying third parties of changes to a discrete group of data.

10. A personal data sharing system according to claim 1, further comprising a record of an event of access when a third party has accessed a discrete group of data.

11. A personal data sharing system according to claim 1, further comprising means for automatically assigning an access permission level taking into account at least one of the following: the changing context of the user of the discrete group of data; the changing circumstances of the subject of the data; and a characteristic of the particular user.

12. A personal data sharing system according to claim 1, further comprising means for automatically assigning a level of authenticity and/or reliability to a discrete group of data.

13. A personal data sharing system according to claim 1, further comprising means for allowing a user to assign a level of authenticity to a discrete group of data.

14. A personal data sharing system according to claim 1, further comprising means for importing data relating to contacts from a plurality of sources; and only enabling access to a discrete group of data if a user grants access for contacts to said discrete group of data.

15. A personal data sharing system according to claim 1, further comprising a user interface for presenting during the process of adding data a plurality of options to a user to allow a user to select which third party or third party grouping can access said data.

16. A personal data sharing system according to claim 1, wherein said discrete groups of data are categorized in two or more of the following categories: confidential, personal, contextual, user generated, and third party generated.

17. A personal data sharing system according to claim 1, further comprising a user interface which presents the user with a plurality of N user profiles and allows the user to select one of said user profiles; and any data transmission from and/or to said system is affected by said selection.

18. A method of sharing personal data in a personal data sharing system; said system comprising a server side and a user device providing an interface layer; said system comprising an application layer which is separate from said interface layer; said user device comprising an operating system with operating system level objects enabling the system to gain access to hardware components of said client device; said server side comprising a personal data store; the method comprising the steps of aggregating data from a plurality of disparate sources; said aggregated data residing in said personal data store and categorizing said aggregated data into discrete groups of data, assigning an access permission level for each one of said discrete groups of data by allowing the user to configure said access permission level; and permitting access to a discrete group of data dependent upon said access permission level.

19. A method of sharing personal data according to claim 18, by aggregating discrete groups of data in a personal single data store.

20. A method of sharing personal data according to claim 18, by providing one or more data clusters and/or one or more data elements; and tagging and/or mapping by assigning a description to at least one data cluster and/or at least one data element.

21. A method of sharing personal data according to claim 18, wherein said discrete groups of data comprises one or more data clusters.

22. A method of sharing personal data according to claim 21, wherein said data clusters comprise one or more data elements.

23. A method of sharing personal data according to claim 18, by configuring said aggregator to dynamically connect to disparate sources of data in order to push data notifications.

24. A method of sharing personal data according to claim 18, by wrapping a shell of encryption around a discrete group of data.

25. A method of sharing personal data according to claim 18, by recording a level of data curation; and aggregating data dependent at least in part on said level of data curation.

26. A method of sharing personal data according to claim 18, by notifying third parties of changes to a discrete group of data.

27. A method of sharing personal data according to claim 18, comprising the further step of recording an event of access when a third party has accessed a discrete group of data.

28. A method of sharing personal data according to claim 18, by automatically assigning an access permission level taking into account at least one of the following: the changing context of the user of the discrete group of data; the changing circumstances of the subject of the data; and a characteristic of the particular user.

29. A method of sharing personal data according to claim 18, further comprising the step of automatically assigning a level of authenticity and/or reliability to a discrete group of data.

30. A method of sharing personal data according to claim 18, by allowing a user to assign a level of authenticity to a discrete group of data.

31. A method of sharing personal data according to claim 18, by importing data relating to contacts from a plurality of sources; and only enabling access to a discrete group of data if a user grants access for contacts to said discrete group of data.

32. A method of sharing personal data according to claim 18, further comprising the step of presenting during the process of adding data a plurality of options to a user to allow a user to select which third party or third party grouping can access said data.

33. A method of sharing personal data according to claim 18, by categorizing said discrete groups of data in two or more of the following categories: confidential, personal, contextual, user generated, and third party generated.

34. A method of sharing personal data according to claim 18, further comprising the step of presenting the user with a plurality of N user profiles and allowing the user to select one of said user profiles; and any data transmission is affected by said selection.

\* \* \* \* \*